US008797364B2

(12) United States Patent
Matsuki

(10) Patent No.: US 8,797,364 B2
(45) Date of Patent: Aug. 5, 2014

(54) DISPLAY DEVICE AND DISPLAY CONTROL METHOD

(75) Inventor: Yoshitaka Matsuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 958 days.

(21) Appl. No.: 12/908,996

(22) Filed: Oct. 21, 2010

(65) Prior Publication Data

US 2011/0096097 A1 Apr. 28, 2011

(30) Foreign Application Priority Data

Oct. 23, 2009 (JP) ................................ 2009-244862
Oct. 23, 2009 (JP) ................................ 2009-244865

(51) Int. Cl.

| | |
|---|---|
| ***G09G 5/00*** | (2006.01) |
| ***G06T 11/00*** | (2006.01) |
| ***G09G 5/26*** | (2006.01) |
| ***G06K 9/32*** | (2006.01) |
| ***G06K 9/54*** | (2006.01) |
| ***G06F 3/048*** | (2013.01) |
| ***H04N 1/00*** | (2006.01) |
| ***G03G 15/00*** | (2006.01) |

(52) U.S. Cl.

CPC ....... *H04N 1/00469* (2013.01); *H04N 1/00413* (2013.01); *H04N 1/00482* (2013.01); *H04N 1/00506* (2013.01); *H04N 1/00474* (2013.01); *H04N 1/00411* (2013.01); *G03G 15/5016* (2013.01)

USPC ........... 345/671; 345/581; 345/619; 345/660; 345/684; 345/688; 345/472; 345/472.2; 382/293; 382/298; 382/305; 715/765; 715/788; 715/800; 715/803; 715/810; 715/815; 715/829; 715/830; 715/831

(58) Field of Classification Search

USPC ................ 345/581, 619, 660–688, 467–472, 345/472.2, 173–178; 715/764, 765, 781, 715/784, 788, 800, 801, 803, 810, 815, 715/821–823, 828–831, 835, 864; 382/276, 382/282, 291, 293, 295, 298, 305

See application file for complete search history.

(56) References Cited

U.S. PATENT DOCUMENTS

| | | | | |
|---|---|---|---|---|
| 2002/0012508 | A1 | 1/2002 | Elisson et al. | |
| 2002/0123368 | A1 | 9/2002 | Yamadera et al. | |
| 2007/0171450 | A1 | 7/2007 | Yoshida | |
| 2007/0236477 | A1* | 10/2007 | Ryu et al. | 345/173 |
| 2008/0062141 | A1* | 3/2008 | Chandhri | 345/173 |
| 2010/0060588 | A1* | 3/2010 | Fong | 345/173 |

FOREIGN PATENT DOCUMENTS

| | | |
|---|---|---|
| JP | 2758838 | 3/1998 |
| JP | 2004145791 | 5/2004 |
| JP | 200592472 | 4/2005 |
| JP | 2005275576 | 10/2005 |
| JP | 2010205050 | 9/2010 |

* cited by examiner

*Primary Examiner* — Wesner Sajous
*Assistant Examiner* — Andrew Shin
(74) *Attorney, Agent, or Firm* — Gerald E Hespos; Michael J Porco; Matthew T Hespus

(57) ABSTRACT

When a display position for any of a plurality of images is designated using a touch panel, an instruction accepting section enlarges, for a predetermined period of time, an area for accepting the input of an instruction associated with any of the image of the plurality of images that is displayed in the designated display position, in accordance with speed of change that is detected by a speed detector at the time of the designation.

6 Claims, 34 Drawing Sheets

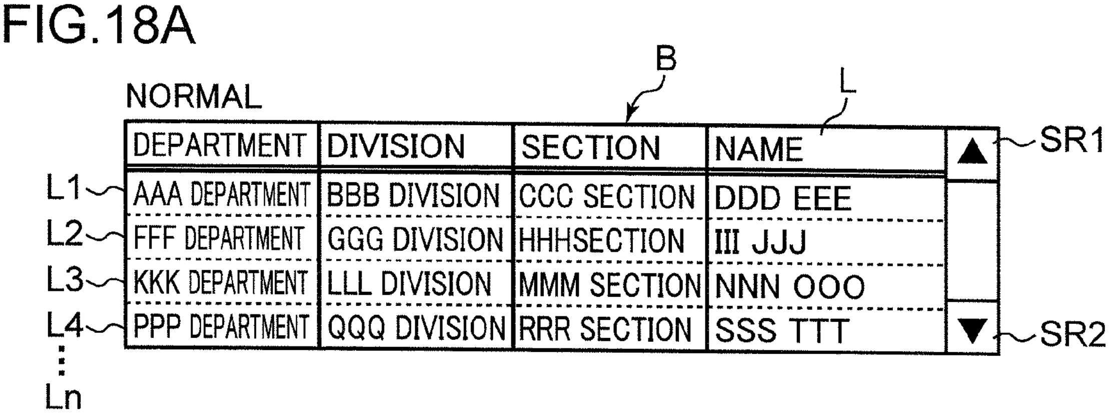

FIG.18A

NORMAL

| DEPARTMENT | DIVISION | SECTION | NAME | ▲ | ~SR1 |
|---|---|---|---|---|---|
| AAA DEPARTMENT | BBB DIVISION | CCC SECTION | DDD EEE | | |
| FFF DEPARTMENT | GGG DIVISION | HHH SECTION | III JJJ | | |
| KKK DEPARTMENT | LLL DIVISION | MMM SECTION | NNN OOO | | |
| PPP DEPARTMENT | QQQ DIVISION | RRR SECTION | SSS TTT | ▼ | ~SR2 |

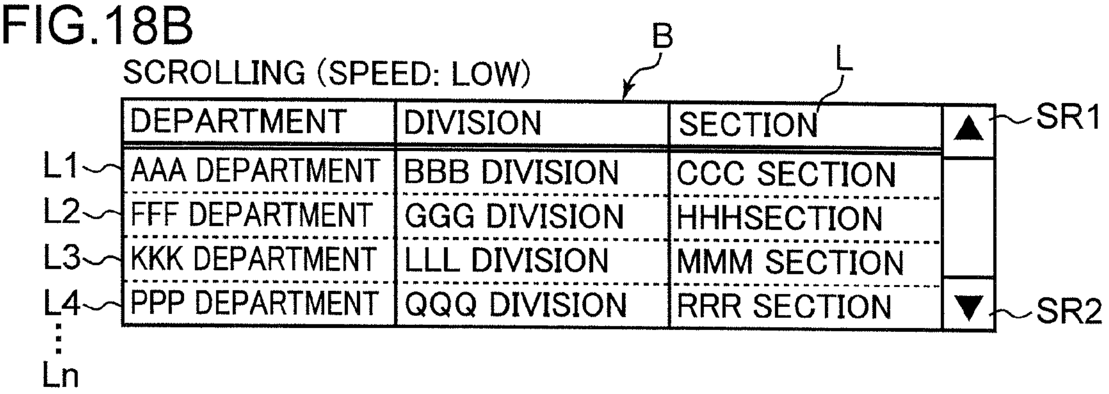

FIG.18B

SCROLLING (SPEED: LOW)

| DEPARTMENT | DIVISION | SECTION | ▲ | ~SR1 |
|---|---|---|---|---|
| AAA DEPARTMENT | BBB DIVISION | CCC SECTION | | |
| FFF DEPARTMENT | GGG DIVISION | HHH SECTION | | |
| KKK DEPARTMENT | LLL DIVISION | MMM SECTION | | |
| PPP DEPARTMENT | QQQ DIVISION | RRR SECTION | ▼ | ~SR2 |

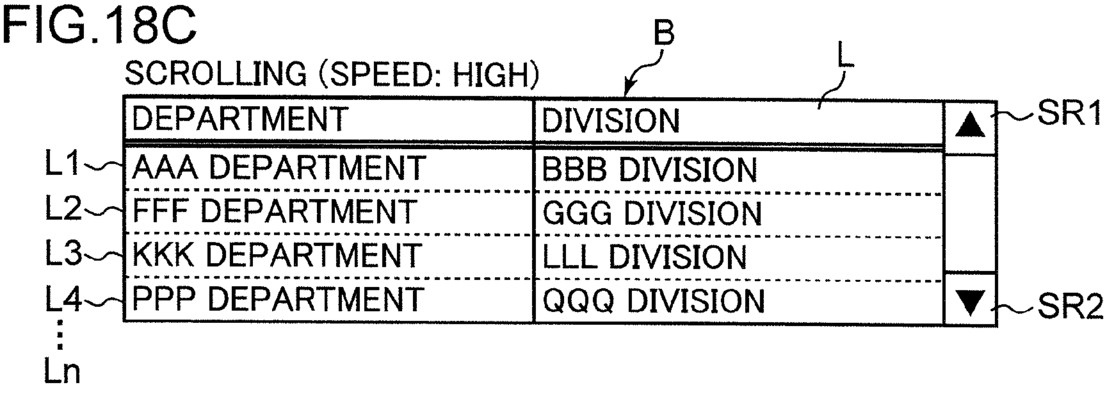

FIG.18C

SCROLLING (SPEED: HIGH)

| DEPARTMENT | DIVISION | ▲ | ~SR1 |
|---|---|---|---|
| AAA DEPARTMENT | BBB DIVISION | | |
| FFF DEPARTMENT | GGG DIVISION | | |
| KKK DEPARTMENT | LLL DIVISION | | |
| PPP DEPARTMENT | QQQ DIVISION | ▼ | ~SR2 |

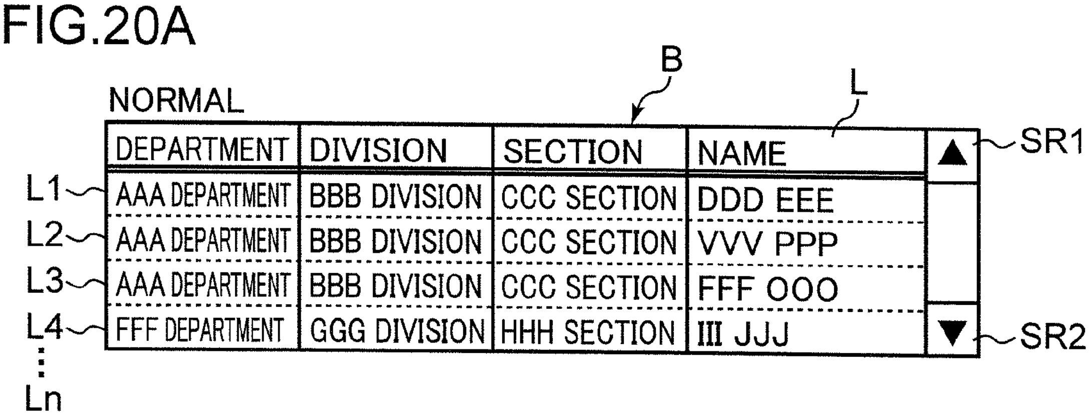

FIG.20A

NORMAL

| | DEPARTMENT | DIVISION | SECTION B | NAME L | | |
|---|---|---|---|---|---|---|
| L1 | AAA DEPARTMENT | BBB DIVISION | CCC SECTION | DDD EEE | ▲ | SR1 |
| L2 | AAA DEPARTMENT | BBB DIVISION | CCC SECTION | VVV PPP | | |
| L3 | AAA DEPARTMENT | BBB DIVISION | CCC SECTION | FFF OOO | | |
| L4 | FFF DEPARTMENT | GGG DIVISION | HHH SECTION | III JJJ | ▼ | SR2 |

Ln

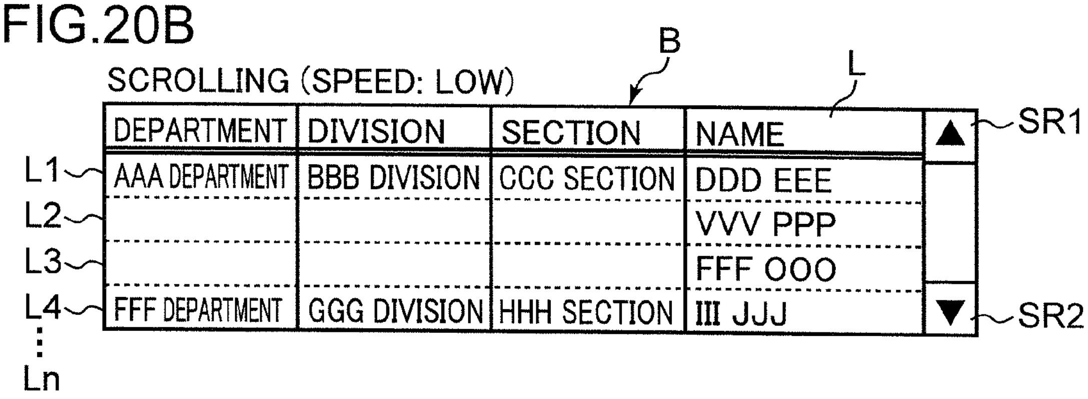

FIG.20B

SCROLLING (SPEED: LOW)

| | DEPARTMENT | DIVISION | SECTION B | NAME L | | |
|---|---|---|---|---|---|---|
| L1 | AAA DEPARTMENT | BBB DIVISION | CCC SECTION | DDD EEE | ▲ | SR1 |
| L2 | | | | VVV PPP | | |
| L3 | | | | FFF OOO | | |
| L4 | FFF DEPARTMENT | GGG DIVISION | HHH SECTION | III JJJ | ▼ | SR2 |

Ln

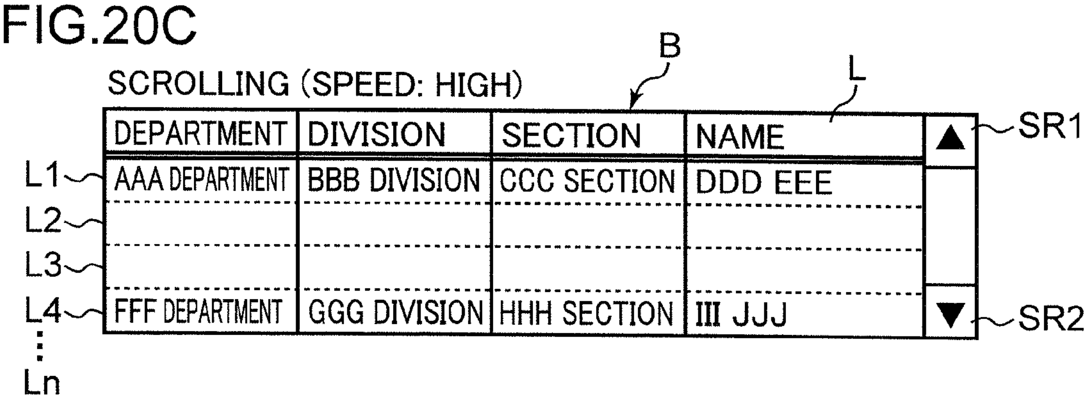

FIG.20C

SCROLLING (SPEED: HIGH)

| | DEPARTMENT | DIVISION | SECTION B | NAME L | | |
|---|---|---|---|---|---|---|
| L1 | AAA DEPARTMENT | BBB DIVISION | CCC SECTION | DDD EEE | ▲ | SR1 |
| L2 | | | | | | |
| L3 | | | | | | |
| L4 | FFF DEPARTMENT | GGG DIVISION | HHH SECTION | III JJJ | ▼ | SR2 |

Ln

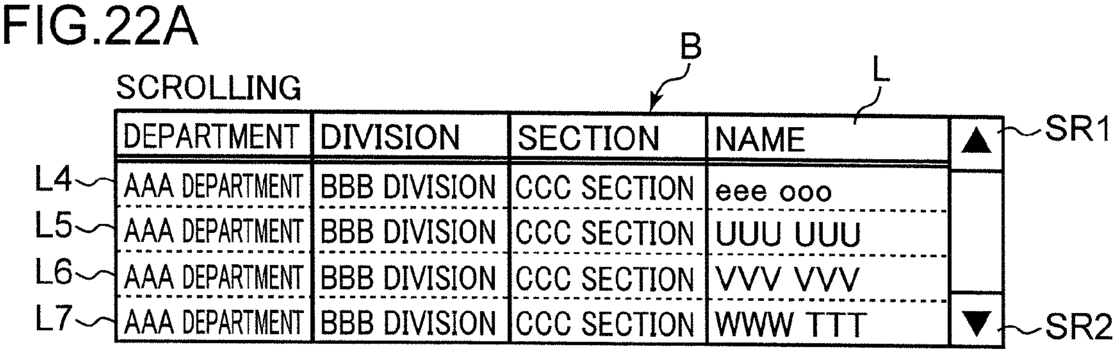

FIG.22A

SCROLLING

| | DEPARTMENT | DIVISION | SECTION | NAME | |
|---|---|---|---|---|---|
| L4 | AAA DEPARTMENT | BBB DIVISION | CCC SECTION | eee ooo | ▲ — SR1 |
| L5 | AAA DEPARTMENT | BBB DIVISION | CCC SECTION | UUU UUU | |
| L6 | AAA DEPARTMENT | BBB DIVISION | CCC SECTION | VVV VVV | |
| L7 | AAA DEPARTMENT | BBB DIVISION | CCC SECTION | WWW TTT | ▼ — SR2 |

B points to SECTION header, L points to NAME column

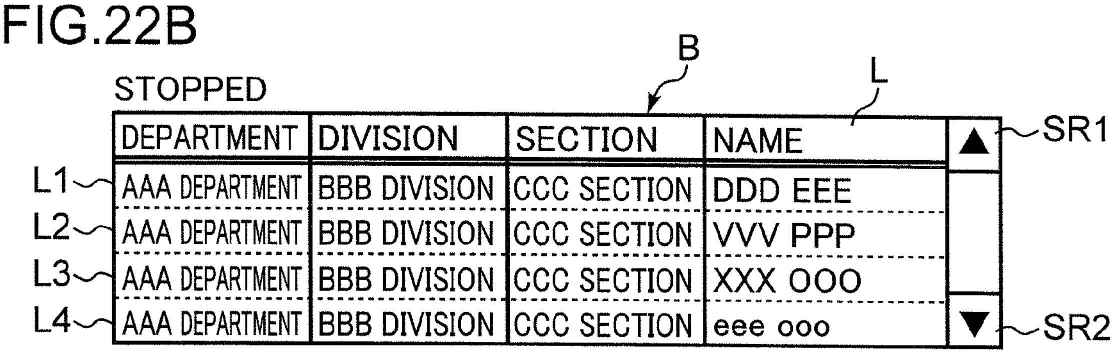

FIG.22B

STOPPED

| | DEPARTMENT | DIVISION | SECTION | NAME | |
|---|---|---|---|---|---|
| L1 | AAA DEPARTMENT | BBB DIVISION | CCC SECTION | DDD EEE | ▲ — SR1 |
| L2 | AAA DEPARTMENT | BBB DIVISION | CCC SECTION | VVV PPP | |
| L3 | AAA DEPARTMENT | BBB DIVISION | CCC SECTION | XXX OOO | |
| L4 | AAA DEPARTMENT | BBB DIVISION | CCC SECTION | eee ooo | ▼ — SR2 |

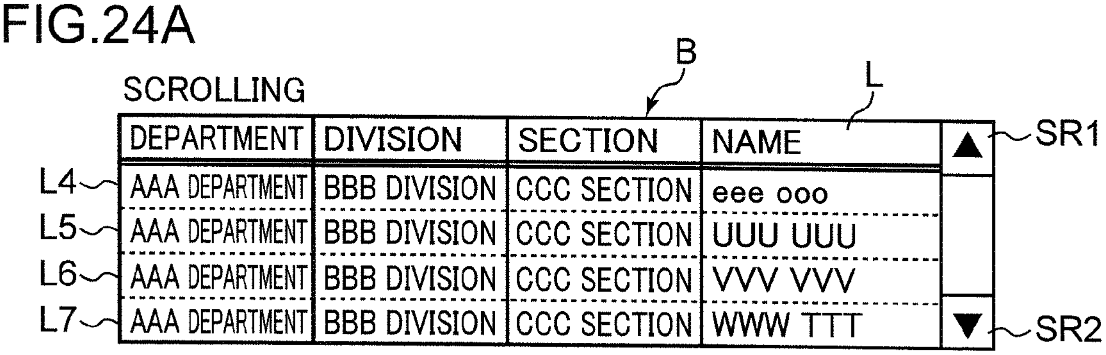

FIG.24A

SCROLLING

| | DEPARTMENT | DIVISION | SECTION | NAME | |
|---|---|---|---|---|---|
| L4 | AAA DEPARTMENT | BBB DIVISION | CCC SECTION | eee ooo | ▲ — SR1 |
| L5 | AAA DEPARTMENT | BBB DIVISION | CCC SECTION | UUU UUU | |
| L6 | AAA DEPARTMENT | BBB DIVISION | CCC SECTION | VVV VVV | |
| L7 | AAA DEPARTMENT | BBB DIVISION | CCC SECTION | WWW TTT | ▼ — SR2 |

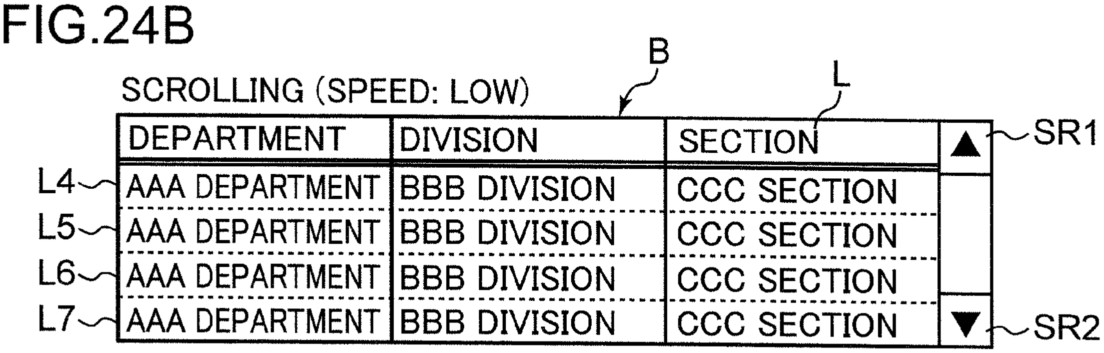

FIG.24B

SCROLLING (SPEED: LOW)

| | DEPARTMENT | DIVISION | SECTION | |
|---|---|---|---|---|
| L4 | AAA DEPARTMENT | BBB DIVISION | CCC SECTION | ▲ — SR1 |
| L5 | AAA DEPARTMENT | BBB DIVISION | CCC SECTION | |
| L6 | AAA DEPARTMENT | BBB DIVISION | CCC SECTION | |
| L7 | AAA DEPARTMENT | BBB DIVISION | CCC SECTION | ▼ — SR2 |

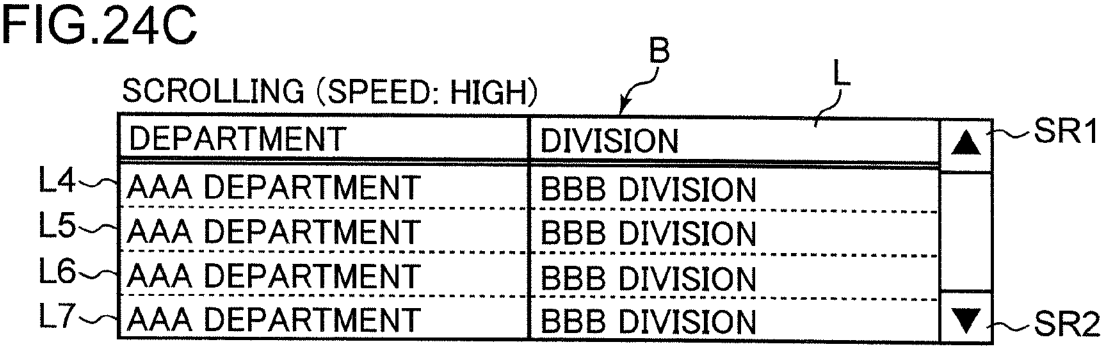

FIG.24C

SCROLLING (SPEED: HIGH)

| | DEPARTMENT | DIVISION | |
|---|---|---|---|
| L4 | AAA DEPARTMENT | BBB DIVISION | ▲ — SR1 |
| L5 | AAA DEPARTMENT | BBB DIVISION | |
| L6 | AAA DEPARTMENT | BBB DIVISION | |
| L7 | AAA DEPARTMENT | BBB DIVISION | ▼ — SR2 |

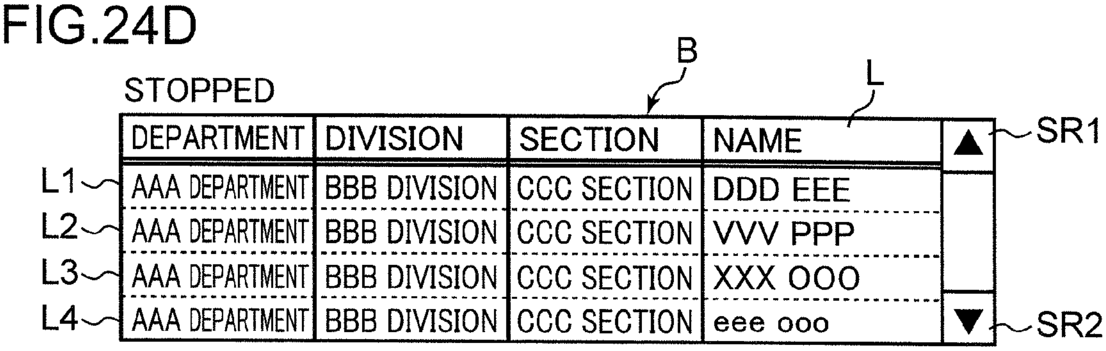

FIG.24D

STOPPED

| | DEPARTMENT | DIVISION | SECTION | NAME | |
|---|---|---|---|---|---|
| L1 | AAA DEPARTMENT | BBB DIVISION | CCC SECTION | DDD EEE | ▲ — SR1 |
| L2 | AAA DEPARTMENT | BBB DIVISION | CCC SECTION | VVV PPP | |
| L3 | AAA DEPARTMENT | BBB DIVISION | CCC SECTION | XXX OOO | |
| L4 | AAA DEPARTMENT | BBB DIVISION | CCC SECTION | eee ooo | ▼ — SR2 |

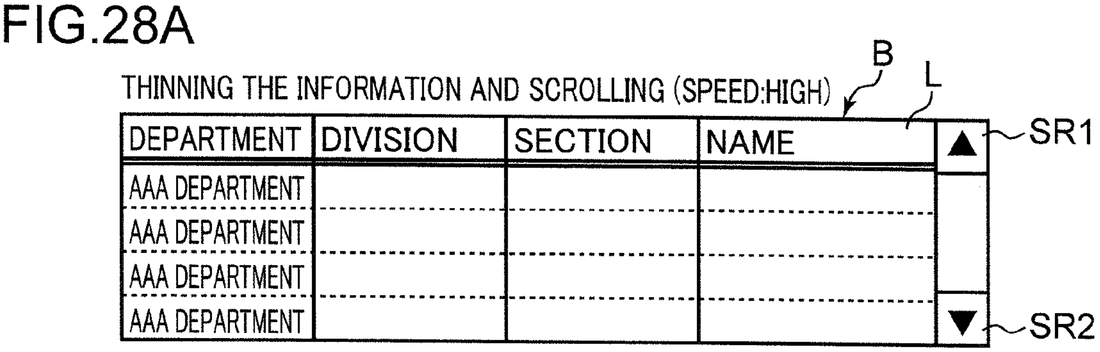

FIG.28A

THINNING THE INFORMATION AND SCROLLING (SPEED:HIGH)

| DEPARTMENT | DIVISION | SECTION | NAME | ▲ | ～SR1 |
|---|---|---|---|---|---|
| AAA DEPARTMENT | | | | | |
| AAA DEPARTMENT | | | | | |
| AAA DEPARTMENT | | | | | |
| AAA DEPARTMENT | | | | ▼ | ～SR2 |

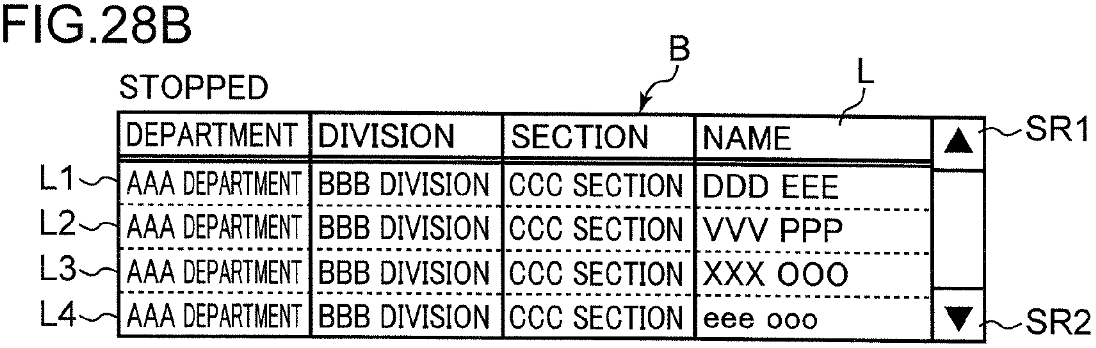

FIG.28B

STOPPED

| | DEPARTMENT | DIVISION | SECTION | NAME | ▲ | ～SR1 |
|---|---|---|---|---|---|---|
| L1～ | AAA DEPARTMENT | BBB DIVISION | CCC SECTION | DDD EEE | | |
| L2～ | AAA DEPARTMENT | BBB DIVISION | CCC SECTION | VVV PPP | | |
| L3～ | AAA DEPARTMENT | BBB DIVISION | CCC SECTION | XXX OOO | | |
| L4～ | AAA DEPARTMENT | BBB DIVISION | CCC SECTION | eee ooo | ▼ | ～SR2 |

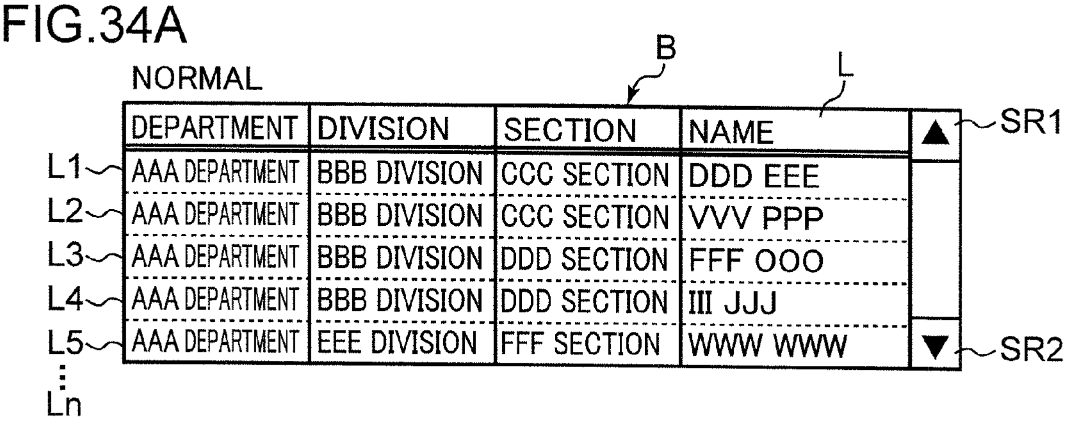

FIG.34A
NORMAL

| | DEPARTMENT | DIVISION | SECTION | NAME | |
|---|---|---|---|---|---|
| L1 | AAA DEPARTMENT | BBB DIVISION | CCC SECTION | DDD EEE | ▲ SR1 |
| L2 | AAA DEPARTMENT | BBB DIVISION | CCC SECTION | VVV PPP | |
| L3 | AAA DEPARTMENT | BBB DIVISION | DDD SECTION | FFF OOO | |
| L4 | AAA DEPARTMENT | BBB DIVISION | DDD SECTION | III JJJ | |
| L5 | AAA DEPARTMENT | EEE DIVISION | FFF SECTION | WWW WWW | ▼ SR2 |
| ⋮ Ln | | | | | |

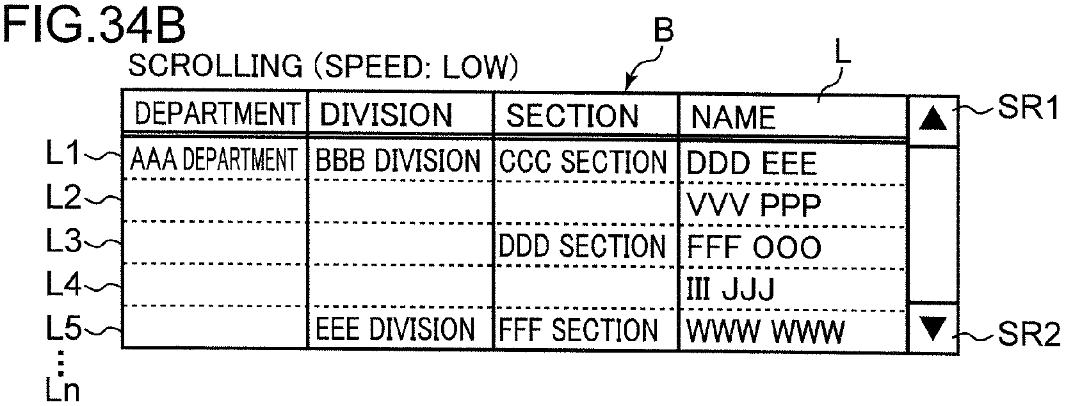

FIG.34B
SCROLLING (SPEED: LOW)

| | DEPARTMENT | DIVISION | SECTION | NAME | |
|---|---|---|---|---|---|
| L1 | AAA DEPARTMENT | BBB DIVISION | CCC SECTION | DDD EEE | ▲ SR1 |
| L2 | | | | VVV PPP | |
| L3 | | | DDD SECTION | FFF OOO | |
| L4 | | | | III JJJ | |
| L5 | | EEE DIVISION | FFF SECTION | WWW WWW | ▼ SR2 |
| ⋮ Ln | | | | | |

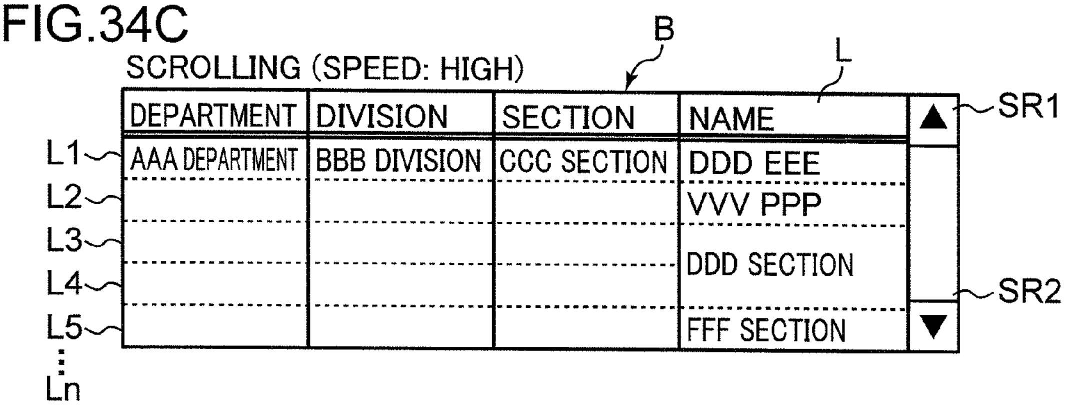

FIG.34C
SCROLLING (SPEED: HIGH)

| | DEPARTMENT | DIVISION | SECTION | NAME | |
|---|---|---|---|---|---|
| L1 | AAA DEPARTMENT | BBB DIVISION | CCC SECTION | DDD EEE | ▲ SR1 |
| L2 | | | | VVV PPP | |
| L3 | | | | DDD SECTION | |
| L4 | | | | | |
| L5 | | | | FFF SECTION | ▼ SR2 |
| ⋮ Ln | | | | | |

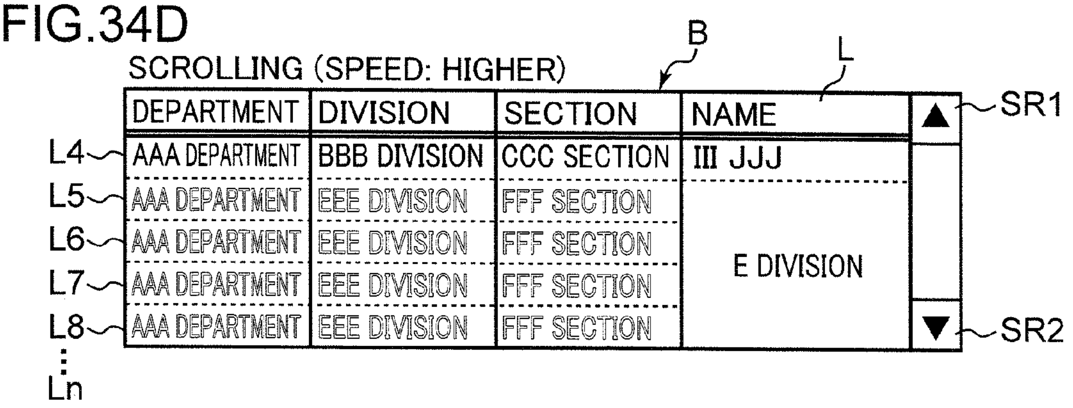

FIG.34D
SCROLLING (SPEED: HIGHER)

| | DEPARTMENT | DIVISION | SECTION | NAME | |
|---|---|---|---|---|---|
| L4 | AAA DEPARTMENT | BBB DIVISION | CCC SECTION | III JJJ | ▲ SR1 |
| L5 | AAA DEPARTMENT | EEE DIVISION | FFF SECTION | | |
| L6 | AAA DEPARTMENT | EEE DIVISION | FFF SECTION | E DIVISION | |
| L7 | AAA DEPARTMENT | EEE DIVISION | FFF SECTION | | |
| L8 | AAA DEPARTMENT | EEE DIVISION | FFF SECTION | | ▼ SR2 |
| ⋮ Ln | | | | | |

DISPLAY DEVICE AND DISPLAY CONTROL METHOD

BACKGROUND OF THE INVENTION

1. Field of the Invention

The present invention relates to a display device, and more particularly to a technology for displaying on a display section a plurality of instruction acceptance images for accepting instructions from an operator, and accepting, from the operator, the input of an instruction associated with any of the instruction acceptance images.

2. Description of the Related Art

There has been conventionally known a technology for an electronic device, such as an image forming apparatus, which displays a plurality of operation guide images on a display screen of a display section such as LCD etc. In this technology, when an operator touches a display position of any of the operation guide images, a touch panel function accepts an operation instruction that is associated with the operation guide image touched by the operator. There is also known an information display device in which an image that shows the information required for an operation and an image that circles and highlights such information are superimposed on each other and displayed on a display section, in order to improve the operability in allowing the operator to select his/her desired operation guide image from among the plurality of operation guide images displayed on a single display screen.

SUMMARY OF THE INVENTION

The present invention is an improved version of the conventional technologies described above.

In other words, the present invention is a display device, having: a display section that displays images; an image storage section that stores a plurality of instruction acceptance images that are displayed on the display section to accept an instruction from an operator; a display controller that displays, on the display section, each of the instruction acceptance images stored in the image storage section; a coordinate position designating section that accepts, from the operator, designation of a coordinate position within a display area of the display section; an instruction accepting section that accepts input of an instruction associated with any of the instruction acceptance images that is displayed in the coordinate position designated by the coordinate position designating section; and a speed detector that detects a speed of change at which the coordinate position designated by the coordinate position designating section changes, wherein, when a display position for any of the instruction acceptance images is designated by designation of the coordinate position accepted by the coordinate position designating section, the instruction accepting section enlarges, for a predetermined period of time, an area for accepting the input of an instruction associated with the instruction acceptance image that is displayed in the designated display position, to a size corresponding to the speed of change that is detected by the speed detector at the time of the designation.

BRIEF DESCRIPTION OF THE DRAWINGS

FIG. 18A is a diagram showing an example of the display screen of the display section, FIG. 18B is a diagram showing an example of the display screen of the display section, and FIG. 18C is a diagram showing an example of the display screen of the display section.

FIG. 20A is a diagram showing an example of the display screen of the display section, FIG. 20B is a diagram showing an example of the display screen of the display section, and FIG. 20C is a diagram showing an example of the display screen of the display section.

FIG. 22A is a diagram showing an example of the display screen of the display section, and FIG. 22B is a diagram showing an example of the display screen of the display section.

FIG. 24A is a diagram showing an example of the display screen of the display section, FIG. 24B is a diagram showing an example of the display screen of the display section, FIG. 24C is a diagram showing an example of the display screen of the display section, and FIG. 24D is a diagram showing an example of the display screen of the display section.

FIG. 28A is a diagram showing an example of the display screen of the display section, and FIG. 28B is a diagram showing an example of the display screen of the display section.

FIG. 34A is a diagram showing an example of the display screen of the display section, FIG. 34B is a diagram showing an example of the display screen of the display section, FIG. 34C is a diagram showing an example of the display screen of the display section, and FIG. 34D is a diagram showing an example of the display screen of the display section.

DETAILED DESCRIPTION OF THE PREFERRED EMBODIMENTS

Figure 1:
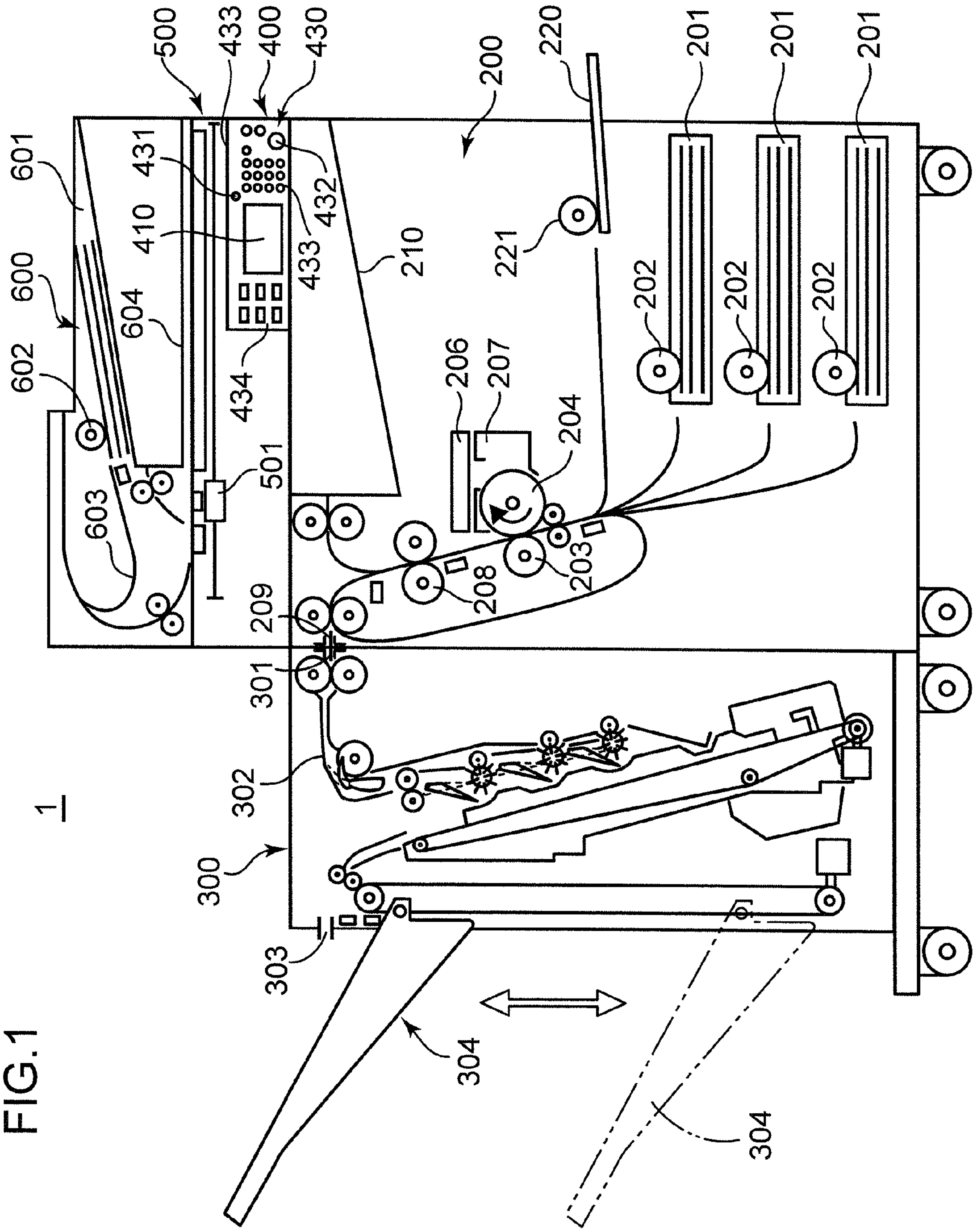
FIG. 1 is a schematic side view showing a configuration of a peripheral, which is an example of an image forming apparatus according to an embodiment of the present invention.
Figure 2:
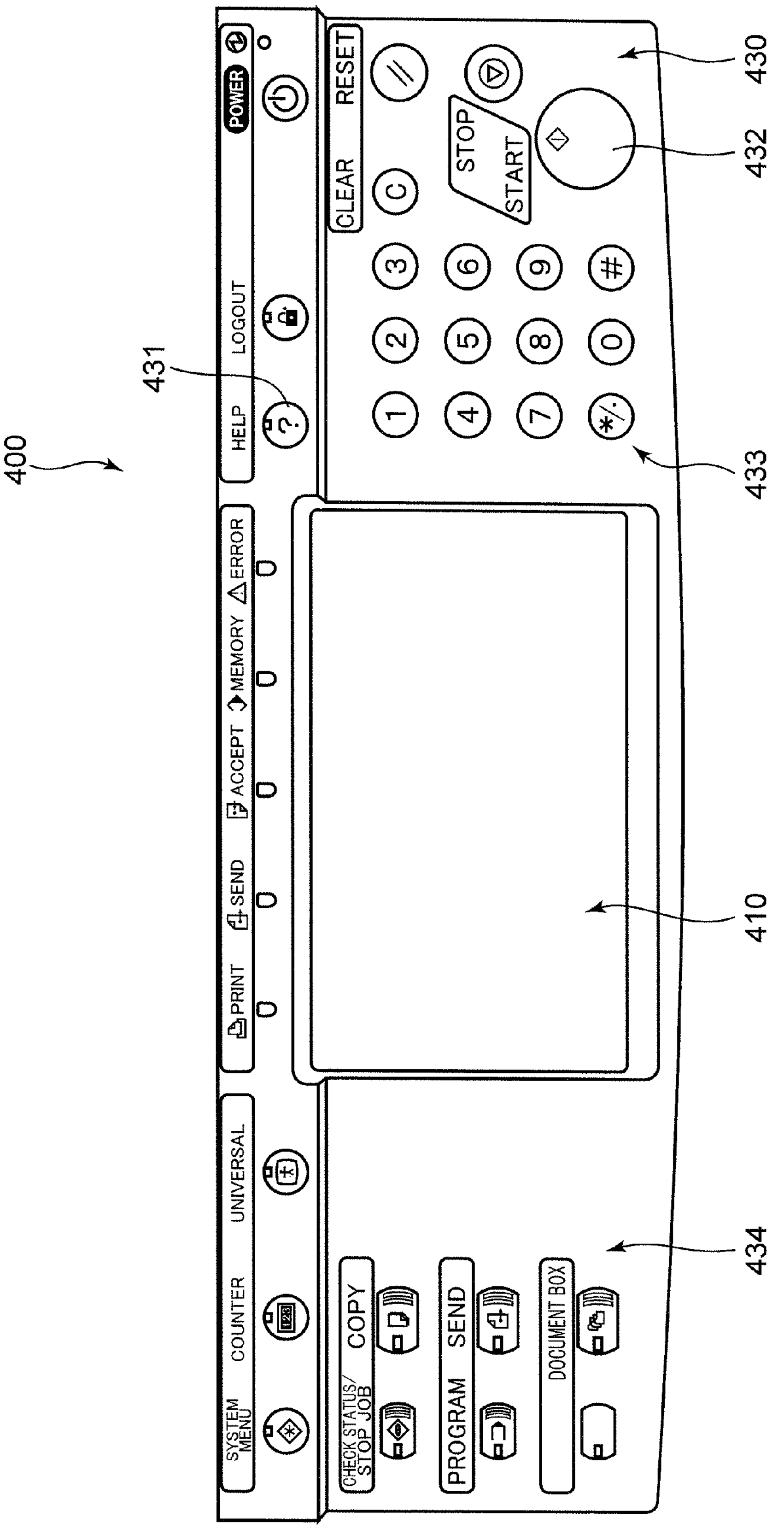
FIG. 2 is a partial enlarged view of an operating section.

Hereinafter, a description will be given of the display device, image forming apparatus with this display device, a display control program, and a display control method according to the present invention. FIG. 1 is a schematic side view showing a configuration of a peripheral, which is an example of the image forming apparatus according to an embodiment of the present invention. FIG. 2 is a partial enlarged view of an operating section 400. A multi function peripheral 1 has a scanner function, facsimile function, printer function, copy function and the like. The multi function peripheral 1 comprises a main body section 200, a sheet post-processing section 300 disposed on the sheet carry-out side of the main body section 200, which is, for example, the left-hand side thereof, the operating section 400 for an operator to input various operation instructions, an original document reader 500 disposed above the main body section 200, and an original document sending section 600 disposed above the original document reader 500.

As shown in FIG. 2, the operating section 400 has a display section 410 such as LCD (Liquid Crystal Display), and an operation key section 430 with which the operator inputs the operation instructions. The operation key section 430 has a help key 431, start key 432, numeric keypad 433, function switching key 434, and the like.

The help key 431 accepts from the operator an instruction for displaying on the display section 410 an operation guide screen (help screen) that displays operation methods related to the scanner function, the facsimile function, the printer, and the copy function.

The start key 432 accepts from the operator an instruction for starting a copy operation, a scanning operation, and various other operations. The numeric keypad 433 accepts from the operator an instruction for designating the number of copies. The function switching key 434 accepts from the operator a function switching instruction for alternately switching between the copy function, transmission functions (the scanner function, the facsimile function etc.), and a box function (a function for reading and printing out the data stored in a storage area (mail box) of the operator that is provided inside an HDD 74, which will be described later).

The display section 410, configured by LCD (Liquid Crystal Display) and the like, has a touch panel unit having a combination of touch panels. The display section 410 is configured not only to display a variety of operation screens but also to allow the operator to input instructions for executing various functions by touching a display surface (a displayed operation key) of each operation screen.

The original document sending section 600 has an original document placing part 601, paper feed roller 602, original document carry-out part 603, and original document discharge part 604. The original document reader 500 has a scanner 501. The paper feed roller 602 feeds out, one by one, the required number of original documents set on the original document placing part 601. The original document carry-out part 603 sequentially carries the fed original documents out to a reading position of the scanner 501. The scanner 501 reads the images on the carried original documents sequentially, and the read original documents are discharged to the original document discharge part 604.

The main body part 200 has a plurality of paper feed cassettes 201, a plurality of paper feed rollers 202, a transfer roller 203, a photosensitive drum 204, an exposure device 206, a developing device 207, a fixing roller 208, a discharge port 209, and a discharge tray 210.

The photosensitive drum 204 is charged uniformly by a charger (not shown) while rotating in the direction of the arrow. The exposure device 206 generates laser beams that are modulated in accordance with the images on the original documents read by the original document reader 500, and scans the laser beams to the photosensitive drum 204 to form an electrostatic latent image of each color on a surface of the drum. The developing device 207 supplies black developer to the photosensitive drum 204 to form a toner image.

On the other hand, the paper feed rollers 202 pull out print sheets from the respective paper feed cassettes 201 that house the print sheets, and then send the print sheets to the transfer roller 203. The transfer roller 203 transfers the toner image on the photosensitive drum 204 to the carried print sheets, and the fixing roller 208 heats the transferred toner image and fixes it onto the print sheets. The print sheets are then carried from the discharge port 209 of the main body part 200 into the sheet post-processing part 300. The print sheets are also discharged to the discharge tray 210 as needed.

The sheet post-processing part 300 has a carry-in port 301, a print sheet carry-out part 302, a carry-out port 303, a stack tray 304, and the like. The print sheet carry-out part 302 sequentially carries and sends the print sheets that are carried from the discharge port 209 into the carry-in port 301, and finally discharges the print sheets from the carry-out port 303 to the stack tray 304. The stack tray 304 is configured so as to be able to move up and down in the direction of the arrow, depending on the number of the accumulated print sheets that are carried out of the carry-out port 303.

Figure 3:
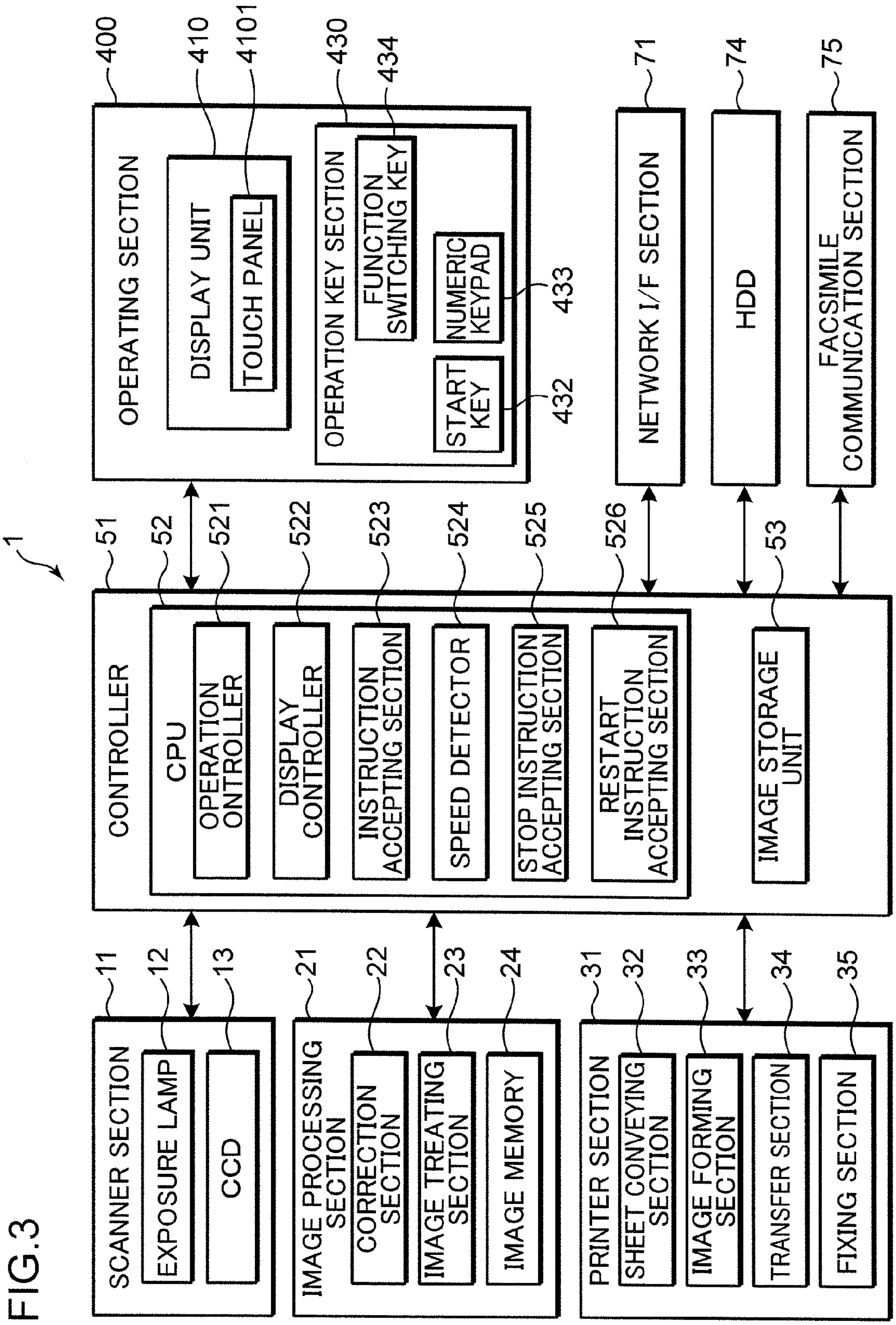
FIG. 3 is a control block diagram of the peripheral shown in FIG. 1.

FIG. 3 is a control block diagram of the peripheral shown in FIG. 1. The multi function peripheral 1 has a scanner section 11, an image processing section 21, a printer section 31, the operating section 400, a controller 51, a network I/F (interface) section 71, the HDD (hard disk drive) 74, and a facsimile communication section 75.

The scanner section 11 includes an exposure lamp 12 and CCD (charge-coupled device) 13 that configure the scanner 501 shown in FIG. 1. In the scanner section 11 the exposure lamp 12 irradiates the original documents and the CCD 13 accepts the light reflected there from. In this manner, the images on the original documents are read, and the images are output correspondingly to the image processing section 21.

The image processing section 21 includes a correction section 22, image treating section 23 and image memory 24. The image processing section 21 processes the read images using the correction section 22 and the image treating section 23 as needed. The images processed by the image processing section 21 are stored in the image memory 24 or output to the printer section 31 in order to be printed out. The correction section 22 performs a predetermined correction process such as level correction and γ correction on the read images. The image treating section 23 performs an image compression/expansion process, an enlargement/reduction process, and various other processes.

The printer section 31 includes a sheet conveying section 32 configured by the paper feed cassettes 201 and paper feed rollers 202 shown in FIG. 1, an image forming section 33 configured by the photosensitive drum 204, exposure device 206 and developing device 207 that are shown in FIG. 1, a transfer section 34 configured by the transfer roller 203 shown in FIG. 1, and a fixing section 35 configured by the fixing roller 208 shown in FIG. 1. The printer section 31 prints out the images on recording sheets by using the data of the original documents read by the scanner section 11. Specifically, the sheet conveying section 32 conveys the recording sheets to the image forming section 33. The image forming section 33 then forms toner images corresponding to the abovementioned images. The transfer section 34 transfers the toner images to the recording sheets. The fixing section 35 fixes the toner images onto the recording sheets to form images.

The network I/F section 71 uses a network interface (10/100 Base-TX) and the like, to control the transmission/acceptance of various data to/from an external device through a LAN.

The HDD 74 stores the images read by the scanner section 11 and output formats that are set for the images.

The operating section 400 has the display section 410 and the operation key section 430, as shown in FIGS. 1 and 2. The display section 410 displays a plurality of keys for accepting the inputs of the various instructions from the touch panel function, under the control of a display controller 522. The operation key section 430 is provided with the function switching key 434, start key 432, numeric keypad 433 and the like that are shown in FIG. 2. A CPU 52 of the controller 51 accepts an instruction that is input by the operator using each of the keys on the display section 410 and the operating section 400.

A touch panel (coordinate position designating section) 4101 of the display section 410 accepts from the operator a coordinate position within a display area of the display section 410 that is designated by the operator's touch operation on the display screen of the display section 410.

The facsimile communication section 75 includes a coding/decoding section (not shown), modulation/demodulation section (not shown), and NCU (Network Control Unit) (not shown). The facsimile communication section 75 transmits the image data of the original documents that are read by the scanner section 11, to the facsimile device and the like through phone lines, and receives the image data transmitted from the facsimile device and the like. The coding/decoding section compresses/encodes the image data to be transmitted, and expands/decodes the received image data. The modulation/demodulation section modulates the compressed/encoded image data to sound signals and demodulates the received signals (sound signals) to the image data. The NCU controls the connections through the telephone lines to the transmission/acceptance destinations such as the facsimile device and the like.

The controller 51 has the CPU 52 and an image storage section 53. The CPU 52 is responsible for controlling the operations of the multi function peripheral 1. The image storage section 53 stores the various data for displaying operation guidance for the operator, the image data on the abovementioned instruction acceptance images, and image data (including data such as images, letters, symbols etc.) for displaying the operating conditions of the scanner function, facsimile function, printer function, copy function and the like, as well as the levels of importance of these functions.

The CPU 52 has an operation controller 521, the display controller 522, an instruction accepting section 523, a speed detector 524, a stop instruction accepting section 525, and a restart instruction accepting section 526.

The operation controller 521 is responsible for controlling the operations of each of the sections configuring the multi function peripheral 1 (the scanner section 11, image processing section 21, printer section 31, etc.).

The display controller 522 controls a display operation performed by the display section 410. The display controller 522 reads, from the image storage section 53, the image data required for displaying the operation guide screen, the operating conditions and the levels of importance, and then displays the image data on the display section 410. The display controller 522 scroll-displays sequentially on the display section 410 the instruction acceptance images stored in the image storage section 53. Note that the display controller 522 carries out various other processes, the details of which will be described hereinafter using the flowcharts and the like.

The instruction accepting section 523 acquires, from the touch panel 4101, the information on the coordinate position designated using the touch panel 4101, and then detects the instruction acceptance image displayed in the coordinate position. The instruction accepting section 523 then specifies an instruction associated with the detected instruction acceptance image, and accepts the input of this specified instruction. The instruction accepting section 523 also carries out various other processes, the details of which will be described hereinafter using the flowcharts and the like.

When the coordinate position designated using the touch panel 4101 is changed to a different coordinate position, the speed detector 524 computes the speed of its change at which the coordinate position designated first changes to the coordinate position designated subsequently, based on the amount of change that is computed based on the first and subsequent coordinate positions, and the time period between the time at which the first coordinate position is designated and the time at which the subsequent coordinate position is designated. The speed detector 524, in this manner, detects the speed of change of a coordinate positions designated by the operator.

Suppose that the coordinate position obtained after the coordinate position designated on the touch panel 4101 is changed is defined as x, the amount of change as dx, and the length of time that has elapsed since before the change as dt. At this time the speed detector 524 computes the speed of change v based on dx/dt. For example, in the case where definitions are given as follows: a change start point coordinate position: 1 (set value 1), i.e., x=1; a change end point coordinate position: 3 (set value 3), i.e., x=3; and the elapsed time, i.,e., dt=0.5, the speed of change v computed by the speed detector 524 is 4.

The speed detector 524 detects a direction and speed of change of the coordinate position, based on the first and subsequent coordinate positions designated using the touch panel 4101. More preferably, the speed detector 524 detects scroll display speed obtained during scroll display by the display controller 522 based on speed information acquired from the display controller 522. Note that the processes conducted by the speed detector 524 are not limited to those described above (unless otherwise specified, the same applies to the operation controller 521, display controller 522, instruction accepting section 523, speed detector 524, stop instruction accepting section 525, and restart instruction accepting section 526).

The stop instruction accepting section 525 accepts a stop instruction for stopping the scroll display performed by the display controller 522. For example, in the case where designation of a coordinate position of a display position for any of the scroll-displayed instruction acceptance images is accepted by the touch panel 4101 during the scroll display by the display controller 522, the stop instruction accepting section 525 accepts this designation as a stop instruction obtained issued by the operator.

The restart instruction accepting section 526 accepts an instruction for restarting the stopped scroll display based on an operation performed on the touch panel 4101 by the operator.

Moreover, the display control program according to the embodiment of the present invention is stored in a storage medium of the multi function peripheral 1, such as the HDD 74. When the CPU 52 performs operation control according to this display control program, CPU 52 functions as the operation controller 521, display controller 522, instruction accepting section 523, speed detector 524, stop instruction accepting section 525, and restart instruction accepting section 526. This display control program is read from a CD-ROM or DVD or downloaded from servers on the internet by the network I/F 71, and thereby stored in the HDD 74 and the like.

However, the operation controller 521, display controller 522, instruction accepting section 523, speed detector 524, stop instruction accepting section 525, and restart instruction accepting section 526 are not necessarily realized when the CPU 52 performs the operation control according to the display control program. The operation controller 521, display controller 522, instruction accepting section 523, speed detector 524, stop instruction accepting section 525, and restart instruction accepting section 526 may be provided by hardware devices such as circuits.

In addition, the display device according to the embodiment of the present invention has the CPU 51 (the required section for the operation controller 521, display controller 522, instruction accepting section 523, speed detector 524, stop instruction accepting section 525, and restart instruction accepting section 526), display section 410, touch panel 4101, and image storage section 53. As described above, in the case where the operation controller 521, display controller 522, instruction accepting section 523, speed detector 524, stop instruction accepting section 525, and restart instruction accepting section 526 are realized by the CPU 52 performing the operation control according to the display control program, the display device according to the embodiment of the present invention is also provided with the HDD 74 etc. in which the display control program is stored.

Figure 4:
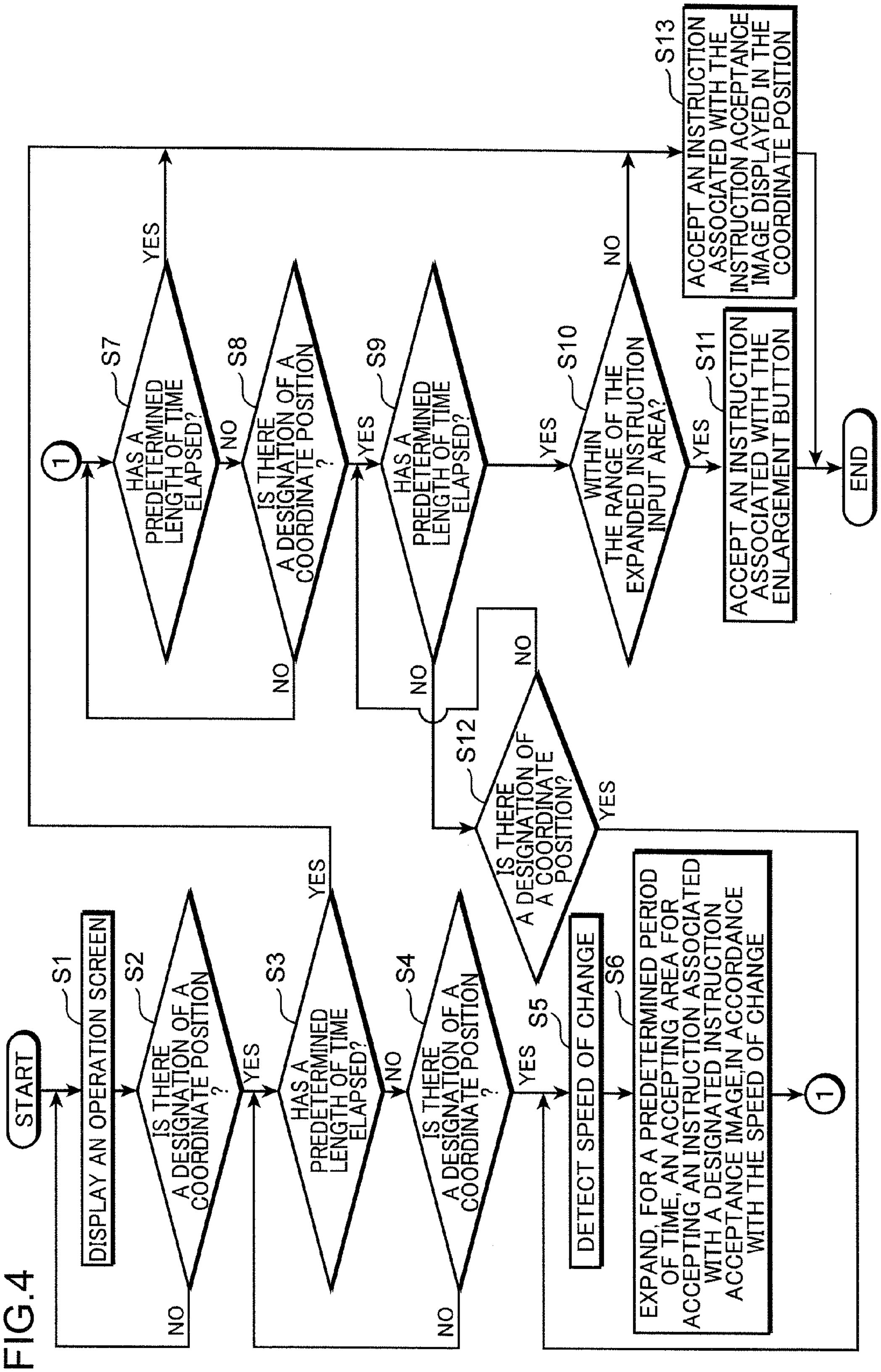
FIG. 4 is a flowchart showing a first embodiment of a display control process performed on a display section by the peripheral.
Figure 5:
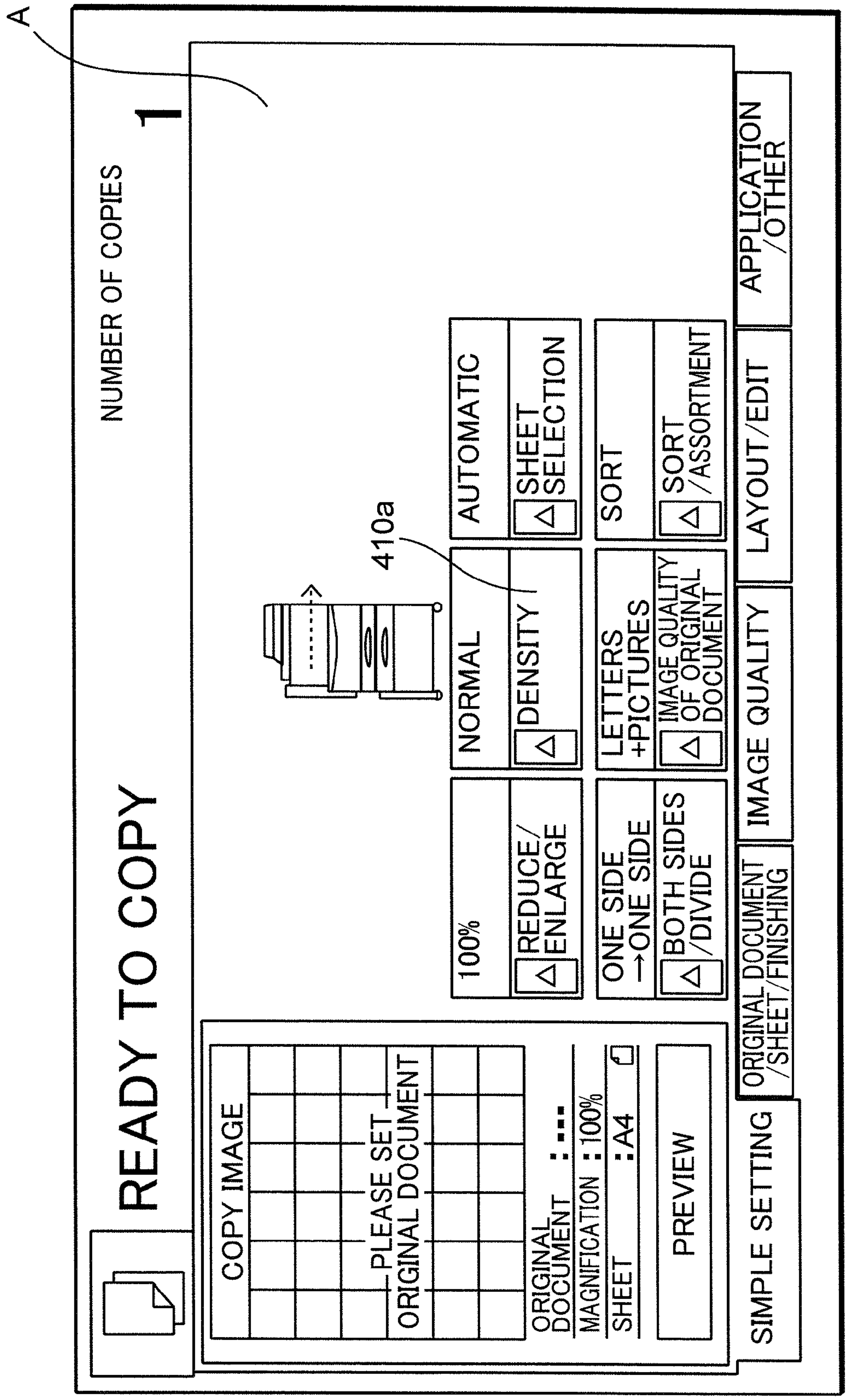
FIG. 5 is a diagram showing an example of a display screen of the display section.
Figure 6A:
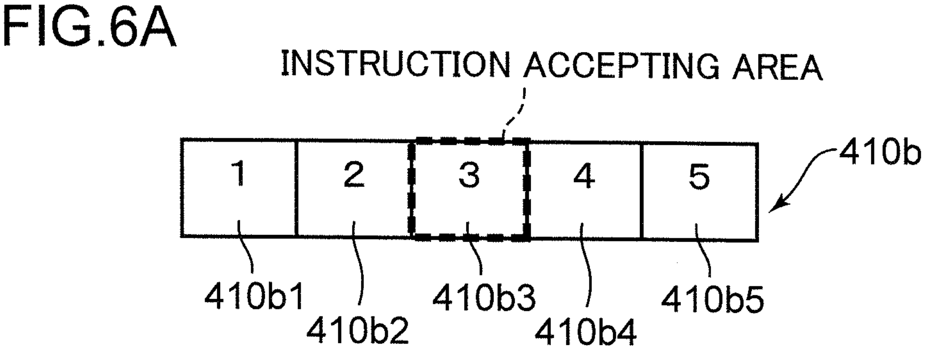
FIG. 6A is a diagram showing an example of the display screen of the display section.
Figure 6B:
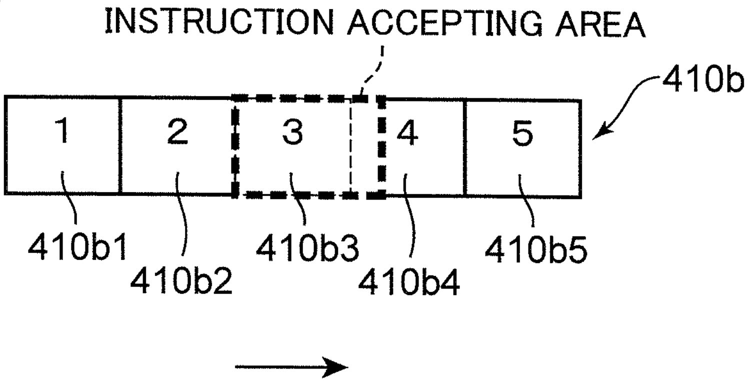
FIG. 6B is a diagram showing an example of the display screen of the display section.

Next is described a first embodiment of the display control process performed on the display section 410 by the multi function peripheral 1. FIG. 4 is a flowchart showing the first embodiment of the display control process performed on the display section 410 by the multi function peripheral 1. FIGS. 5, 6A and 6B are diagrams, each showing an example of the display screen of the display section 410.

When a main power source of the multi function peripheral 1 is turned on, the display controller 522 displays an operation screen (initial screen A) shown in FIG. 5, on the display section 410 (51). In the present embodiment, the display controller 522 causes the display section 410 to display, as an example of the initial screen A, a display screen on which the operating conditions of the copy function can be set.

For example, when the operator touches a density button 410 a while the display controller 522 displays the initial screen A on the display section 410, an instruction for setting the copy density is accepted by the touch panel 4101 and the instruction accepting section 523. At this time, the display controller 522 displays a density setting button **410*b* (a section of a density setting screen) shown in FIG. 6A, on the display section 410**.

When the operator touches any of buttons **410*b*1 to 410*b*5 constituting the density setting button 410*b* while the display controller 522 is displaying the density setting button 410*b*, designation of the coordinate position of a display position for any of the buttons 410*b*1 to 410*b*5 is accepted by the touch panel 4101 (YES in S2). In this case, the instruction accepting section 523 acquires the information on the designated coordinate position from the touch panel 4101 and uses a timer embedded in the instruction accepting section 523 to measure the time that has elapsed since the designation of the coordinate position (S3). It should be noted that when the designation of the coordinate position of the display position for any of the buttons 410*b*1 to 410*b*5 is not accepted by the touch panel 4101** (NO in S2), the process of S1 is repeated.

Here, in the case where designation of the next coordinate position is not accepted by the touch panel 4101 even when the time measured by the instruction accepting section 523 reaches a predetermined elapsed time (0.5 seconds, for example) (YES in S3), that is, when the operator holds his/her finger at the coordinate position of the display position for any of the buttons **410*b*1 to 410*b*5, an instruction associated with the instruction acceptance image (any of the buttons 410*b*1 to 410*b*5) displayed in the coordinate position is accepted by the instruction accepting section 523** (S13).

On the other hand, in the case where another coordinate position is accepted by the touch panel 4101 (YES in S4) while the time measured by the instruction accepting section 523 in S3 does not reach the predetermined elapsed time (NO in S3), the speed detector 524 detects the speed of change based on these first and subsequent coordinate positions (S5).

Here, in accordance with the speed of change that is detected by the speed detector 524 in S5, the instruction accepting section 523 enlarges an area for accepting the input of the instruction that is associated with the button (any of the buttons 410*b*1 to 410*b*5, referred to as "enlargement button" hereinafter) displayed in the display position that is indicated by the coordinate position accepted by the touch panel 4101 in S4(S6).

For example, when the operator changes the designation of the coordinate position in the direction of the arrow as shown in FIG. 6B, and the button 410*b*3 is displayed in the display position that is indicated by the coordinate position accepted in S4, the instruction accepting section 523 enlarges the instruction input accepting area for accepting the input of the instruction associated with the button 410*b*3, to the display area of the adjacent button 410*b*4 toward the direction of the arrow.

The instruction accepting section 523 changes the dimension of the enlarged instruction input accepting area, in accordance with the speed of change that is detected by the speed detector 524 in S5. For example, when the speed of change that is detected by the speed detector 524 in S5 reaches predetermined speed (for instance, the speed v=dx/dt=4 in the example mentioned above, but the speed is not limited thereto), the instruction accepting section 523 preferably increases the dimension of the instruction input accepting area to be enlarged, as the speed of change increases. When the speed of change that is detected by the speed detector 524 in S5 is less than the predetermined speed, the instruction accepting section 523 preferably carries out a process that does not enlarge the instruction input accepting area.

The instruction accepting section 523 measures the time that has elapsed since the process for enlarging the instruction input accepting area of the button (S7). In the case where designation of the next coordinate position is not accepted by the touch panel 4101 even when the time measured by the instruction accepting section 523 reaches the predetermined elapsed time (0.5 seconds, for example) (YES in S7), that is, when the operator holds his/her finger at the coordinate position that is accepted by the touch panel 4101 in S4, an instruction associated with the button displayed in the coordinate position is accepted by the instruction accepting section 523 (S13).

On the other hand, in the case where the designation of the next coordinate position is accepted by the touch panel 4101 (YES in S8) before the time measured by the instruction accepting section 523 reaches the predetermined elapsed time (NO in S7), the instruction accepting section 523 measures a time that has elapsed since the point of time at which the designation of this coordinate position is accepted (S9).

Here, in the case where designation of yet another coordinate position is not accepted by the touch panel 4101 even when the time measured by the instruction accepting section 523 reaches the predetermined elapsed time (0.5 seconds, for example) (YES in S9), the instruction accepting section 523 judges whether or not the coordinate position that is designated in S8 is within the range of the enlarged instruction input accepting area (S10).

When the instruction accepting section 523 judges that the coordinate position designated in S8 is not within the range of the enlarged instruction input accepting area (NO in S10), an instruction associated with the button that is originally displayed in the coordinate position designated in S8 is accepted by the instruction accepting section 523 (S13).

When the instruction accepting section 523 determines that the coordinate position designated in S8 is within the range of the enlarged instruction input accepting area (YES in S10), the instruction accepting section 523 accepts the input of the instruction associated with the enlargement button (S11). In other words, when the instruction accepting section 523 enlarges the instruction input accepting area for accepting the instruction associated with the enlargement button as described above, the instruction accepting section 523 does not accept the input of the instruction associated with the original button (not the enlargement button) displayed in the enlarged instruction input accepting area, for the predetermined period.

When the instruction accepting section 523 enlarges the instruction input accepting area for accepting the input of the instruction associated with the button 410*b*3 to the display area of the button 410*b*4 as shown in FIG. 6B, the instruction accepting section 523 does not accept the input of an instruction associated with the button 410*b*4 for the predetermined period in the enlarged instruction input accepting area of the button 410*b*3.

Furthermore, in the case where designation of yet another coordinate position is accepted by the touch panel 4101 (YES in S12) before the time measured by the instruction accepting section 523 reaches the predetermined elapsed time in S9 (NO in S9), the process returns to S5, and the processes subsequent to S5 are performed again. Note that, when the designation of the abovementioned coordinate position is not accepted by the touch panel 4101 (NO in S12), the process returns to S9.

As described above, when the area for accepting the input of the instruction is enlarged by the instruction accepting section 523 to the size corresponding to the speed of change that is detected by the speed detector 524 in S5 (S6), the instruction being associated with the button that is displayed in the display position indicated by the coordinate position accepted by the touch panel 4101 in S4, in the case where the designation of the next coordinate position is not accepted by the touch panel 4101 although the time measured by the instruction accepting section 523 reaches the predetermined elapsed time (YES in S7), that is, in the case where the operator holds his/her finger at the coordinate position that is accepted by the touch panel 4101 in S4, the instruction corresponding to the button displayed in this coordinate position is accepted by the instruction accepting section 523 (S13), and the instruction accepting section 523 enlarges, for the predetermined period, the area for accepting the input of the instruction that is associated with the button displayed in the designated coordinate position, to the size corresponding to the speed of change detected by the speed detector 524. In so doing, the instruction accepting section 523 may change the predetermined period in accordance with the speed of change detected by the speed detector 524. For example, when the speed of change that is detected by the speed detector 524 in S5 reaches the predetermined speed (for instance, the speed v=dx/dt=4 in the example mentioned above, but the speed is not limited thereto), the instruction accepting section 523 may perform a process that lengthens the predetermined period as the speed of change increases.

Figure 7:
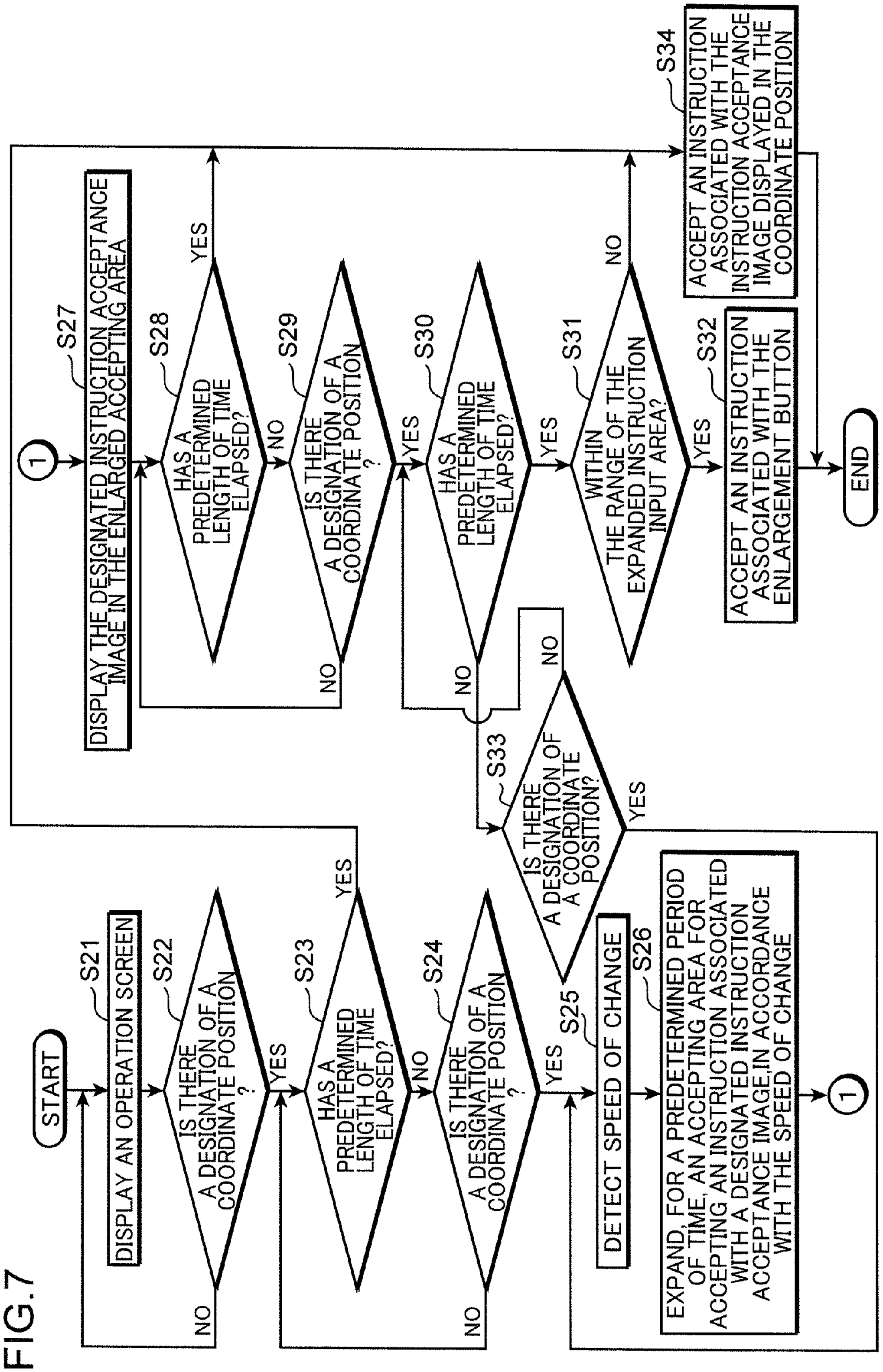
FIG. 7 is a flowchart showing a second embodiment of the display control process performed on the display section by the peripheral.

Next is described a second embodiment of the display control process performed on the display section 410 by the multi function peripheral 1. FIG. 7 is a flowchart showing the second embodiment of the display control process performed on the display section 410 by the multi function peripheral 1. FIGS. 8A, 8B, 8C, 9A and 9B are diagrams, each showing an example of the display screen of the display section 410. Note that the descriptions of the same processes as those of the first embodiment are omitted.

In the second embodiment, when, in accordance with the speed of change that is detected by the speed detector 524 in S25, the instruction accepting section 523 enlarges the area for accepting the input of the instruction that is associated with the button (enlargement button) displayed in the display position indicated by the coordinate position accepted by the touch panel 4101 in S24 (S26), the display controller 522 displays, on the entire instruction input accepting area to be enlarged, an image of the button (enlargement button) displayed in the display position that is indicated by the coordinate position that is accepted by the touch panel 4101 in S24 (S27).

Figure 8A:
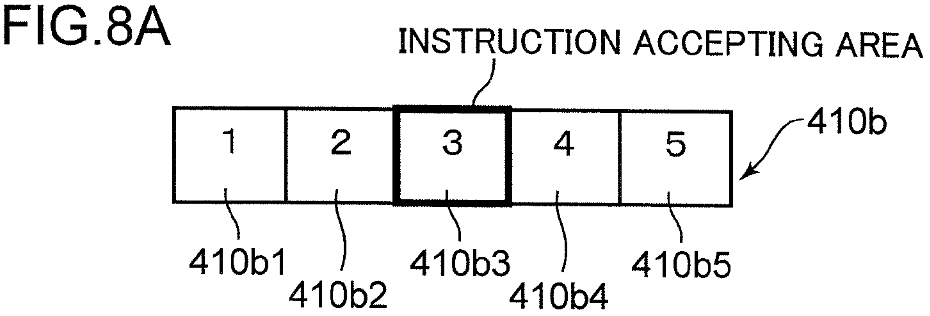
FIG. 8A is a diagram showing an example of the display screen of the display section.
Figure 8B:
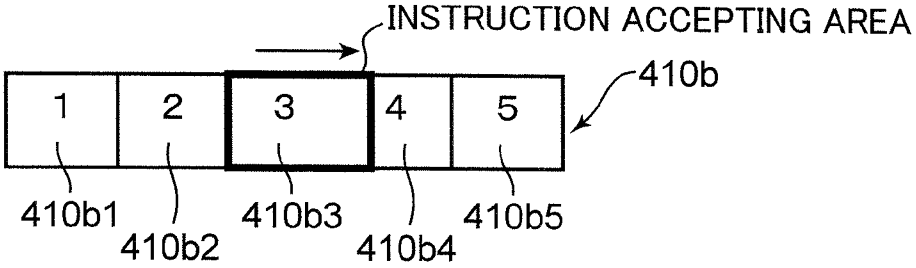
FIG. 8B is a diagram showing an example of the display screen of the display section.

For instance, considered is the case where the operator changes the designation of the coordinate position in the direction of the arrow as shown in FIG. 8B and that the button **410*b*3 is displayed in the display position that is indicated by the coordinate position accepted in S24. In this case, when the instruction accepting section 523 enlarges the instruction input accepting area for accepting the input of the instruction associated with the button 410*b*3, to the display area of the adjacent button 410*b*4 toward the direction of the arrow, the display controller 522 displays the image of the button 410*b*3 in place of the image of the button 410*b*4, in the instruction input accepting area of the button 410*b*3 that is enlarged to the display area of the button 410*b*4**.

Figure 8C:
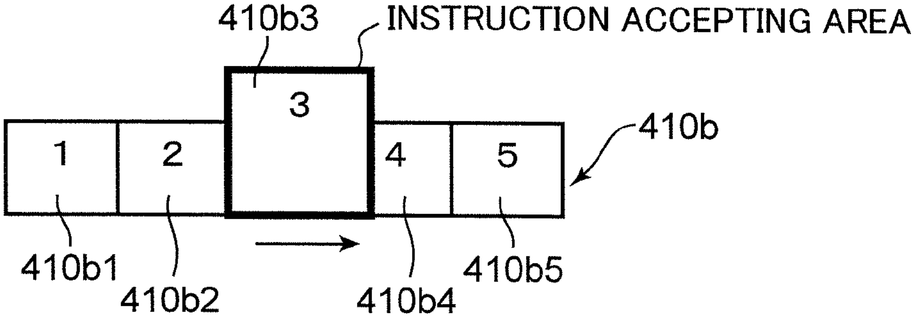
FIG. 8C is a diagram showing an example of the display screen of the display section.

In the case where the operator changes the designation of the coordinate position in the direction of the arrow as shown in FIG. 8C, and where the button **410*b*3 is displayed in the display position that is indicated by the coordinate position accepted in S24, the instruction accepting section 523 may enlarge the instruction input accepting area not only in the direction of the arrow in which the operator changes the designation of the coordinate position, but also in a vertical direction or oblique direction in FIG. 8C. In this case as well, the display controller 522 displays the image of the button 410*b*3 in the entire instruction input accepting area to be enlarged. In this case, the display controller 522 also displays the image of the button 410*b*3 in place of the image of the button 410*b*4, in the instruction input accepting area of the button 410*b*3 that is enlarged to the display area of the button 410*b*4**.

As a result of the display process of S27 performed by the display controller 522, the operator can easily observe his/her desired instruction acceptance image that the operator wishes to designate originally (the button **410*b*3 in the examples shown in FIGS. 8B and 8**C), and can also accurately input an instruction associated with the desired instruction acceptance image.

Figure 9A:
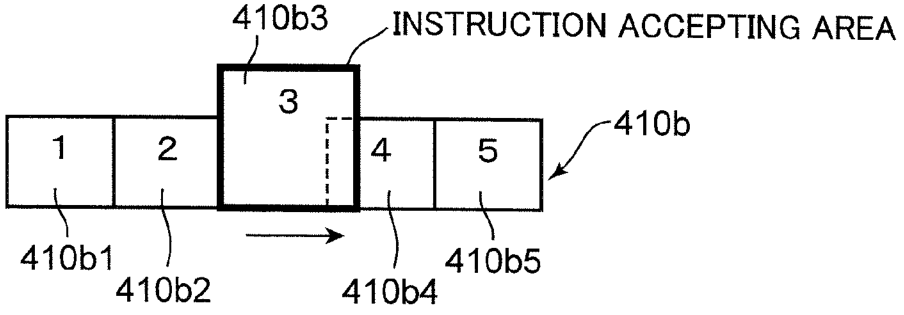
FIG. 9A is a diagram showing an example of the display screen of the display section.
Figure 9B:
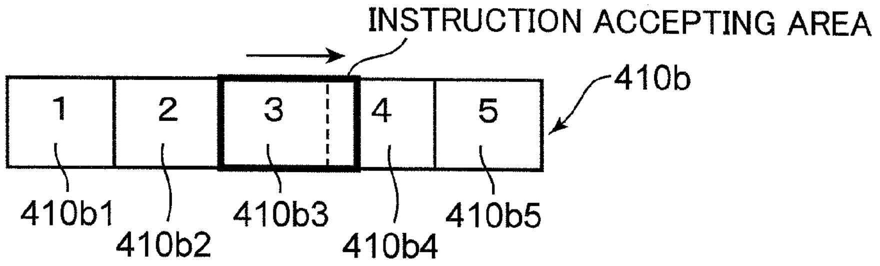
FIG. 9B is a diagram showing an example of the display screen of the display section.

Note that, in the case where the display controller 522 performs the display process of S27 to display the image of the button **410*b*3 on the entire instruction input accepting area to be enlarged, as shown in FIGS. 8B and 8C, the image of the button 410*b*3 may be displayed in the instruction input accepting area that is enlarged to the display area of the button 410*b*4 such that the image of the button 410*b*4 is made transmissive to the image of the button 410*b*3, as shown in FIGS. 9A and 9**B.

Figure 10:
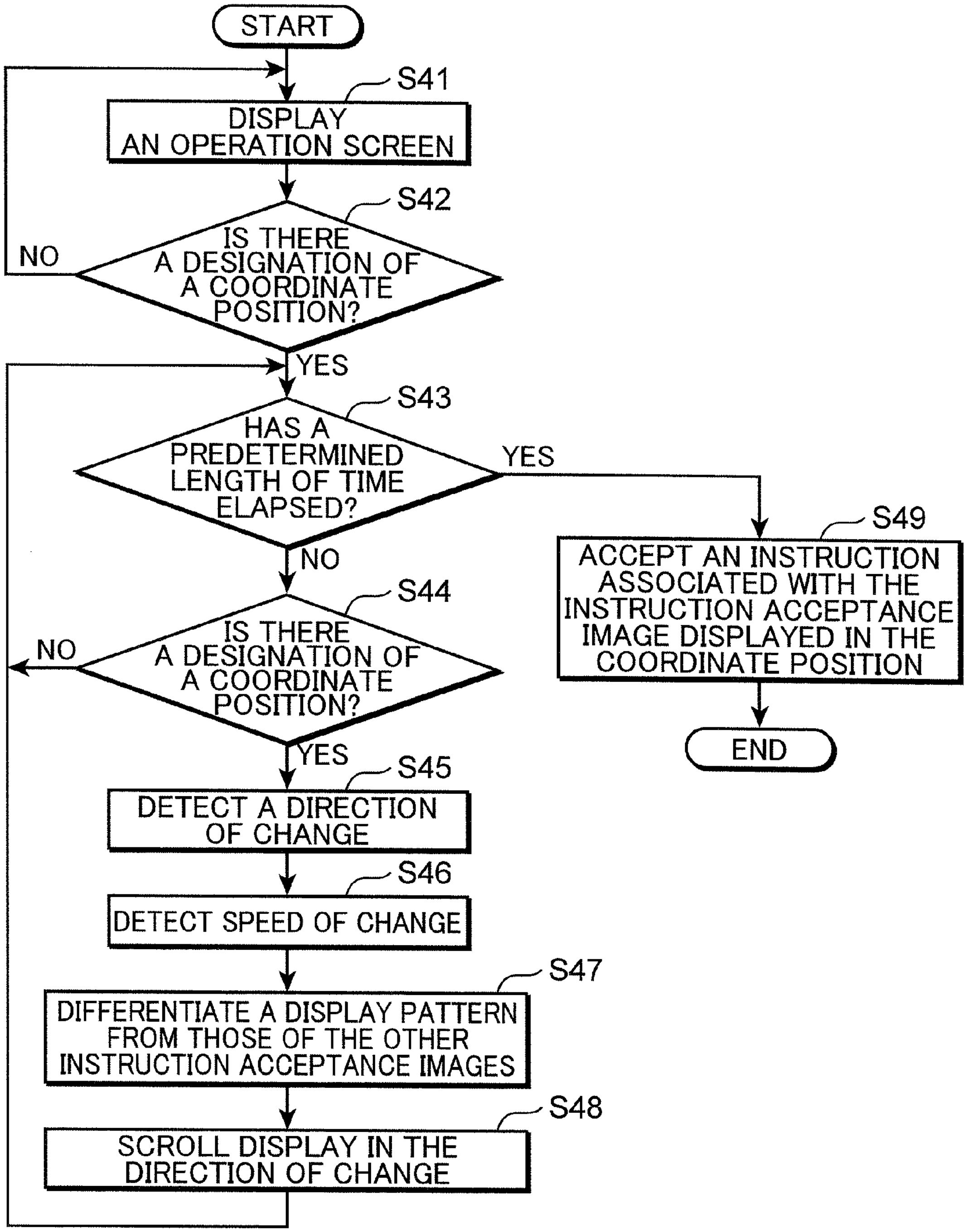
FIG. 10 is a flowchart showing a third embodiment of the display control process performed on the display section by the peripheral.
Figure 11A:
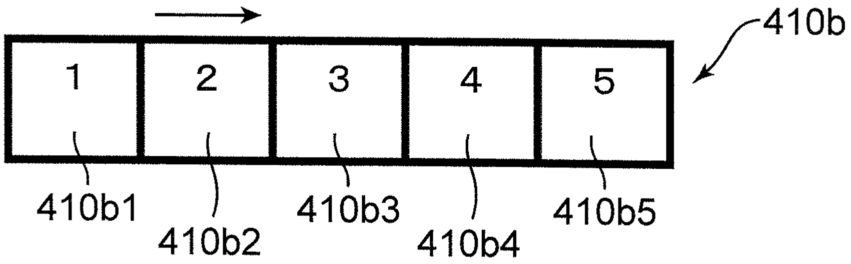
FIG. 11A is a diagram showing an example of the display screen of the display section.
Figure 11B:
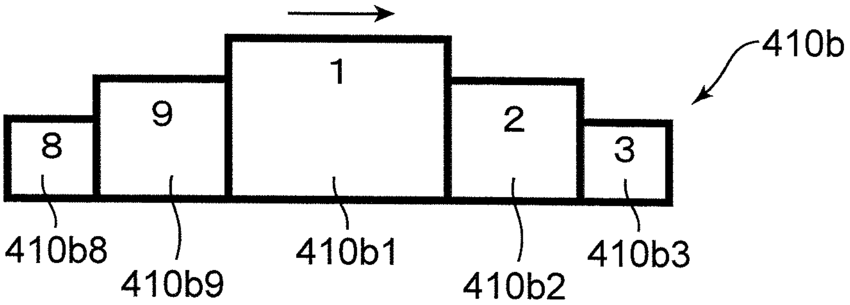
FIG. 11B is a diagram showing an example of the display screen of the display section.

Next is described a third embodiment of the display control process performed on the display section 410 by the multi function peripheral 1. FIG. 10 is a flowchart showing the third embodiment of the display control process performed on the display section 410 by the multi function peripheral 1. FIGS. 11A and 11B are diagrams, each showing an example of the display screen of the display section 410.

The third embodiment describes a display process that is performed when the display controller 522 scroll-displays the instruction acceptance images on the display section 410.

When the main power source of the multi function peripheral 1 is turned on, the display controller 522 displays the operation screen (initial screen A) shown in FIG. 5, on the display section 410 (S41). For example, when the operator touches the density button **410*a* while the display controller 522 displays the initial screen A on the display section 410, an instruction for setting the copy density is accepted by the touch panel 4101 and the instruction accepting section 523. At this time, the display controller 522 displays the density setting button 410*b* (a section of the density setting screen) shown in FIG. 11A, on the display section 410**.

When the operator touches any of buttons **410*b*1 to 410*b*5 constituting the density setting button 410*b* while the display controller 522 is displaying the density setting button 410*b*, designation of the coordinate position of a display position for any of the buttons 410*b*1 to 410*b*5 is accepted by the touch panel 4101 (YES in S42). In this case, the instruction accepting section 523 acquires the information on the designated coordinate position from the touch panel 4101 and uses a timer embedded in the instruction accepting section 523 to measure the time that has elapsed since the designation of the coordinate position (S43). It should be noted that when the designation of the coordinate position of the display position for any of the buttons 410*b*1 to 410*b*5 is not accepted by the touch panel 4101 (NO in S42), the process of S41** is repeated.

Here, in the case where designation of the next coordinate position is not accepted by the touch panel 4101 even when the time measured by the instruction accepting section 523 reaches a predetermined elapsed time (0.5 seconds, for example) (YES in S43), that is, when the operator holds his/her finger at the coordinate position of the display position for any of the buttons **410*b*1 to 410*b*5, an instruction associated with the instruction acceptance image (any of the buttons 410*b*1 to 410*b*5) displayed in the coordinate position is accepted by the instruction accepting section 523 (S43**).

On the other hand, in the case where another coordinate position is accepted by the touch panel 4101 (YES in S44) while the time measured by the instruction accepting section 523 in S43 does not reach the predetermined elapsed time (NO in S43), the speed detector 524 detects the direction of change based on these first and subsequent coordinate positions (S45). The speed detector 524 further detects the speed of change based on these first and subsequent coordinate positions (S46).

Then, in accordance with the speed of change that is detected by the speed detector 524 in S46, the display controller 522 sets up a display pattern for at least one instruction acceptance image of the plurality of instruction acceptance images to be scroll-displayed, the display pattern being differentiated from the display patterns of the rest of the instruction acceptance images (S47). As the display pattern different from those of the rest of the instruction acceptance images, a variety of display patterns such as the size, brightness and color of the image can be adopted.

For example, when the display controller 522 scroll-displays on the display section 410 an array of a plurality of buttons **410*b*1 to 410*b*9 as shown in FIG. 11A (FIG. 11A shows an example in which five of the plurality of buttons 410*b*1 to 410*b*9 are displayed simultaneously on the display section 410. In FIG. 11A the buttons 410*b*6 to 410*b*9 are hidden), the five buttons that are arranged and displayed simultaneously are set such that the scroll-displayed images thereof become larger toward the center in the array direction, as shown in FIG. 11B. At least, the largest button 410*b*1 at the center in FIG. 11B is enlarged in accordance with the speed of change that is detected by the speed detector 524 in S46 mentioned above (for example, the higher the speed of change that is detected by the speed detector 524 in S46, the greater the rate of enlargement). However, the display controller 522 may enlarge all of the five buttons that are arranged and displayed simultaneously or a button arbitrarily extracted from the five buttons that are arranged and displayed simultaneously, in accordance with the speed of change that is detected by the speed detector 524 in S46**.

The display controller 522 uses the display patterns that are set in the manner described above, to scroll-display on the display section 410 the plurality of instruction acceptance images (buttons 410*b*1 to 410*b*9) to be displayed, in the direction of change that is detected by the speed detector 524 in S45 (S48). For example, as shown in FIG. 11B, when the direction of change that is detected by the speed detector 524 in S45 is the direction of the arrow, the display controller 522 displays each of the images of the buttons 410*b*1 to 410*b*9 such that these images are displayed and scrolled five by five on the display section 410 in the direction of the arrow.

Figure 12:
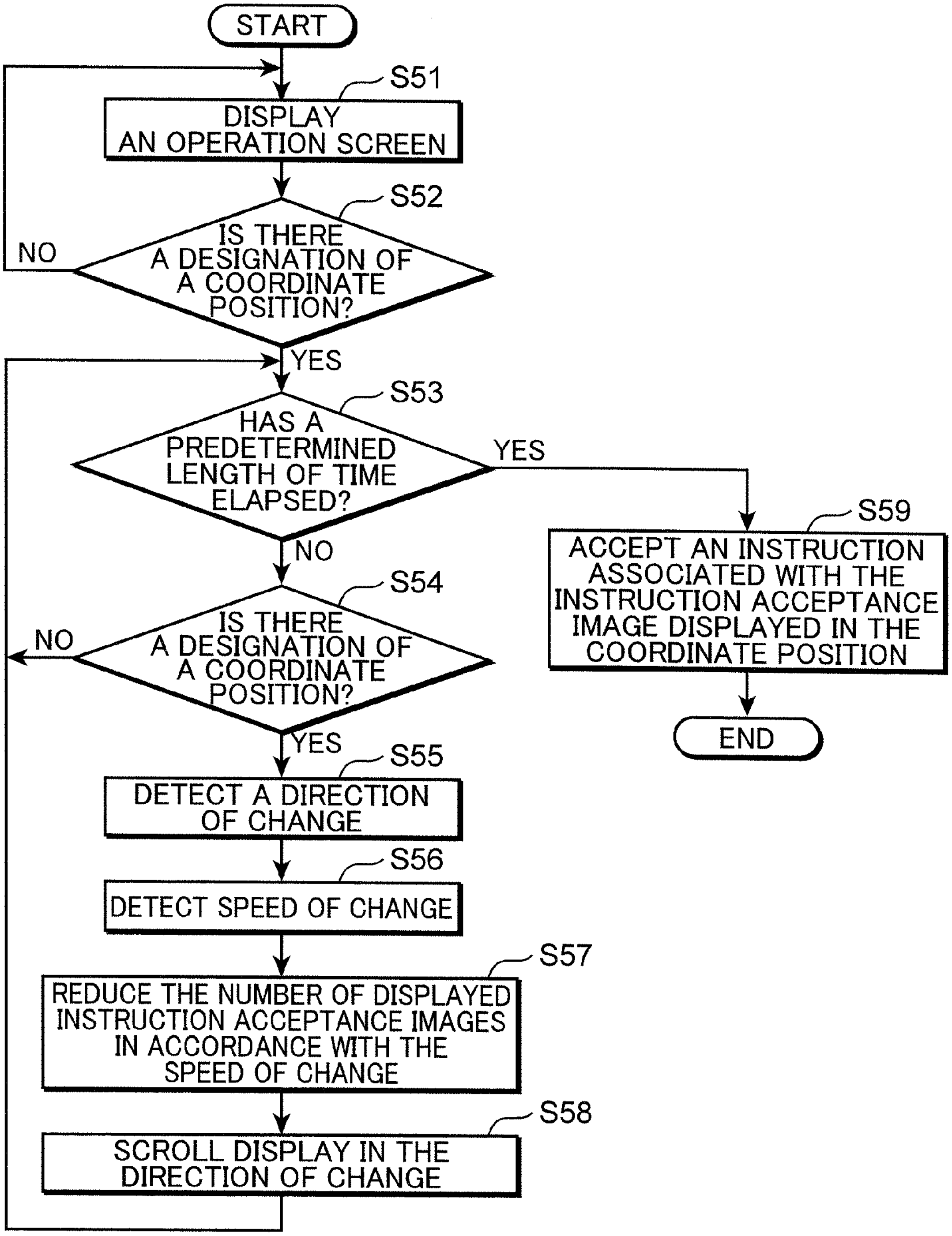
FIG. 12 is a flowchart showing a fourth embodiment of the display control process performed on the display section by the peripheral.
Figure 13A:
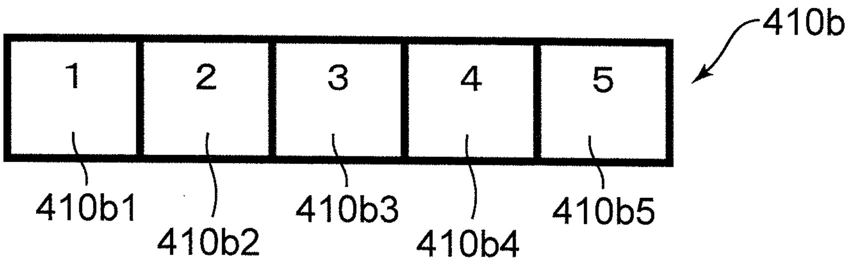
FIG. 13A is a diagram showing an example of the display screen of the display section.
Figure 13B:
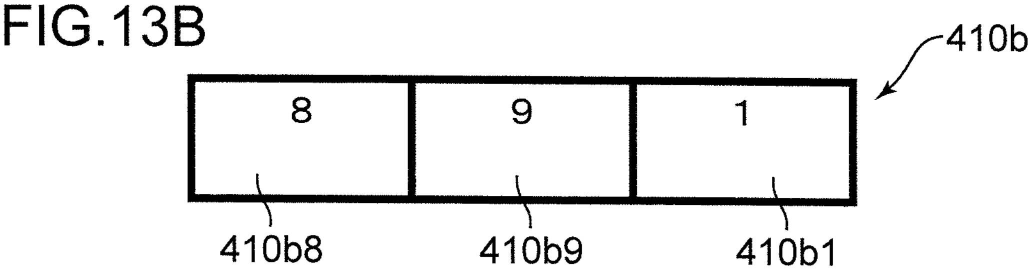
FIG. 13B is a diagram showing an example of the display screen of the display section.
Figure 13C:
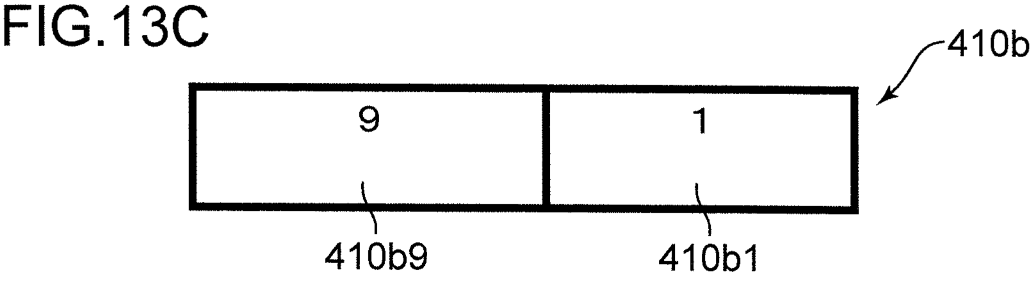
FIG. 13C is a diagram showing an example of the display screen of the display section.

Next is described a fourth embodiment of the display control process performed on the display section 410 by the multi function peripheral 1. FIG. 12 is a flowchart showing the fourth embodiment of the display control process performed on the display section 410 by the multi function peripheral 1. FIGS. 13A, 13B and 13C are diagrams, each showing an example of the display screen of the display section 410. As with the third embodiment, the fourth embodiment describes the display process performed when the display controller 522 scroll-displays the instruction acceptance images on the display section 410. Note that the descriptions of the same processes as those of the third embodiment are omitted.

As the process in which the display controller 522 sets up, based on the speed of change that is detected by the speed detector 524 in S56, a display pattern for at least one instruction acceptance image of the plurality of instruction acceptance images to be scroll-displayed, the display pattern being differentiated from the display patterns of the rest of the instruction acceptance images, the fourth embodiment adopts a process for reducing the number of instruction acceptance images to be displayed on the display section 410, in accordance with the speed of change that is detected by the speed detector 524 in S56 (S57).

For example, considered is the case where the display controller 522 scroll-displays on the display section 410 an array of five buttons out of the plurality of buttons 410*b*1 to 410*b*9 (in FIG. 13A the buttons 410*b*6 to 410*b*9 are hidden) as shown in FIG. 13A. In this case, when the speed of change that is detected by the speed detector 524 in S56 reaches predetermined speed 51 that is higher than predetermined standard speed S, the display controller 522 reduces the number of buttons that are arranged and displayed simultaneously on the display section 410 to, for example, three, as shown in FIG. 13B. When the speed of change that is detected by the speed detector 524 in S56 reaches predetermined speed S2 that is higher than the speed 51, the display controller 522 reduces the number buttons that are arranged and displayed simultaneously on the display section 410 to, for example, two, as shown in FIG. 13C, which is less than the number obtained with the speed S1. In these cases, the display controller 522 preferably displays the dimensions of the buttons as large as possible in the arranging/displaying area.

Even when the display control by the display controller 522 performs the scroll display relatively fast, displaying the large instruction acceptance images in such a limited arranging/displaying area can improve the operator's visibility on each instruction acceptance image at the time of the scroll display.

Figure 14:
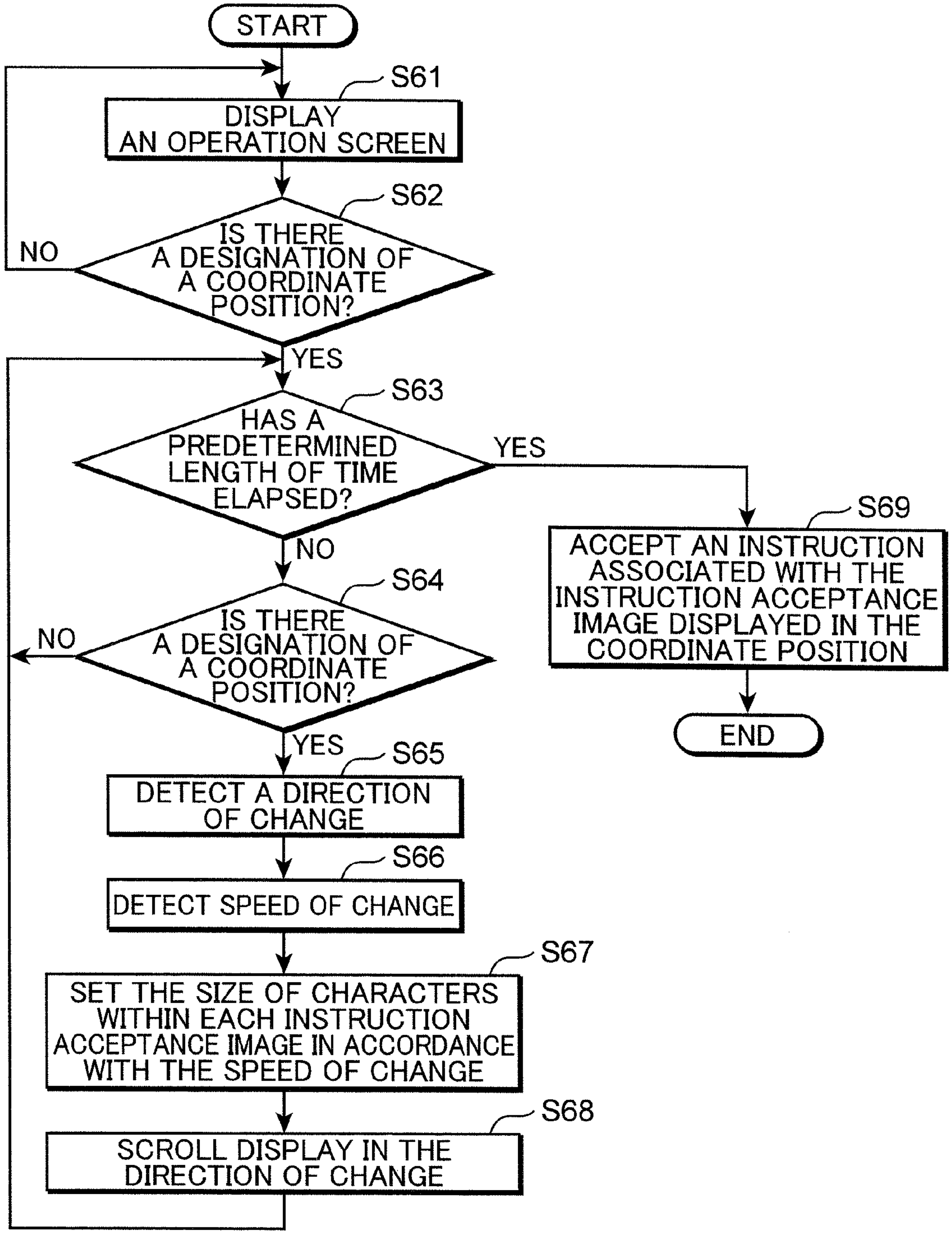
FIG. 14 is a flowchart showing a fifth embodiment of the display control process performed on the display section by the peripheral.

Next is described a fifth embodiment of the display control process performed on the display section 410 by the multi function peripheral 1. FIG. 14 is a flowchart showing the fifth embodiment of the display control process performed on the display section 410 by the multi function peripheral 1. FIGS. 15A, 15B, 16A and 16B are diagrams, each showing an example of the display screen of the display section 410. As with the third and fourth embodiments, the fifth embodiment describes the display process performed when the display controller 522 scroll-displays the instruction acceptance images on the display section 410. Note that the descriptions of the same processes as those of the third or fourth embodiment are omitted.

As the process in which the display controller 522 sets up, based on the speed of change that is detected by the speed detector 524 in S66, a display pattern for at least one instruction acceptance image of the plurality of instruction acceptance images to be scroll-displayed, the display pattern being differentiated from the display patterns of the rest of the instruction acceptance images, the fifth embodiment adopts a process for setting up the characters shown in each instruction acceptance image (numbers, letters, symbols etc.) in accordance with the speed of change that is detected by the speed detector 524 in S66, such that the characters become larger toward the center in the array direction, while the size of each of the plurality of arranged and displayed instruction acceptance images is kept constant (S67). At this time, the display controller 522 enlarges the characters shown in at least the largest instruction acceptance image in the middle in accordance with the speed of change that is detected by the speed detector 524 in S66.

Figure 15A:
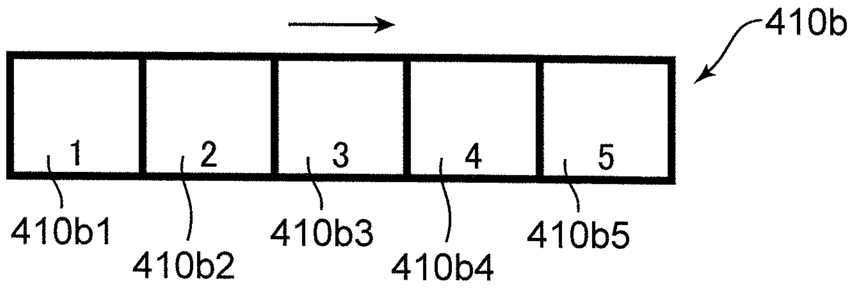
FIG. 15A is a diagram showing an example of the display screen of the display section.
Figure 15B:
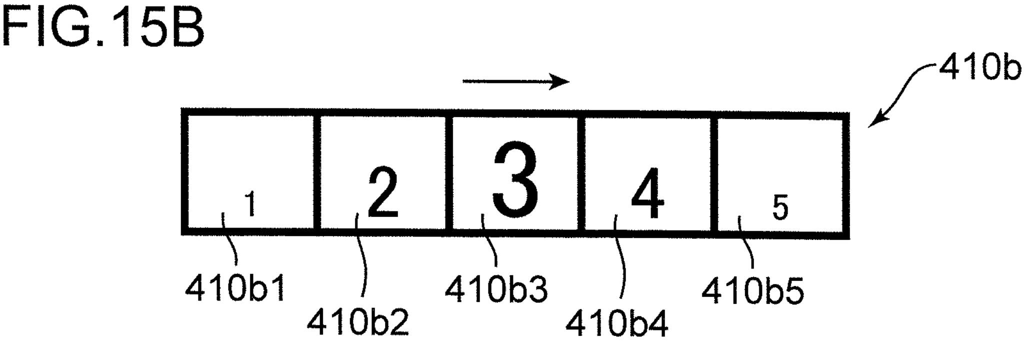
FIG. 15B is a diagram showing an example of the display screen of the display section.

For example, in the case where the display controller 522 scroll-displays on the display section 410 an array of five buttons out of the plurality of buttons 410*b*1 to 410*b*9 (in FIG. 15A the buttons 410*b*6 to 410*b*9 are hidden) as shown in FIG. 15A, the characters (numbers, letters, symbols etc.) that are displayed within the image of each button are set to become larger toward the center in the array direction, with the size of each button being kept constant (S67) as shown in FIG. 15B.

Even when, for example, the speed of change is increased, the display control by the display controller 522 can improve the operator's visibility on the characters shown in the largest instruction acceptance image in the middle, so that the operator can easily specify his/her desired instruction acceptance image.

Figure 16A:
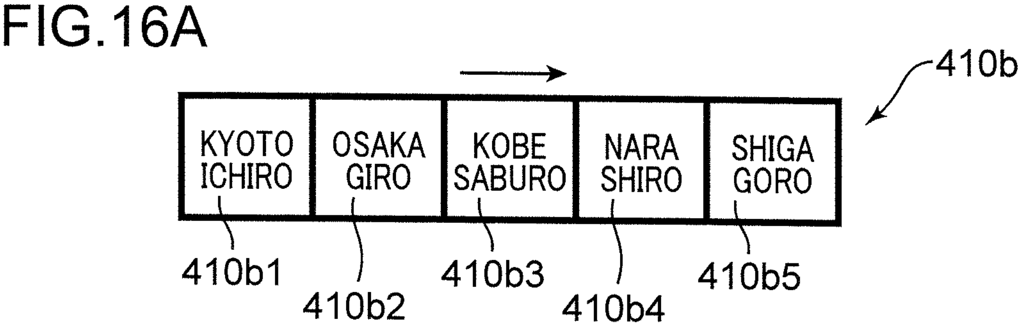
FIG. 16A is a diagram showing an example of the display screen of the display section.
Figure 16B:
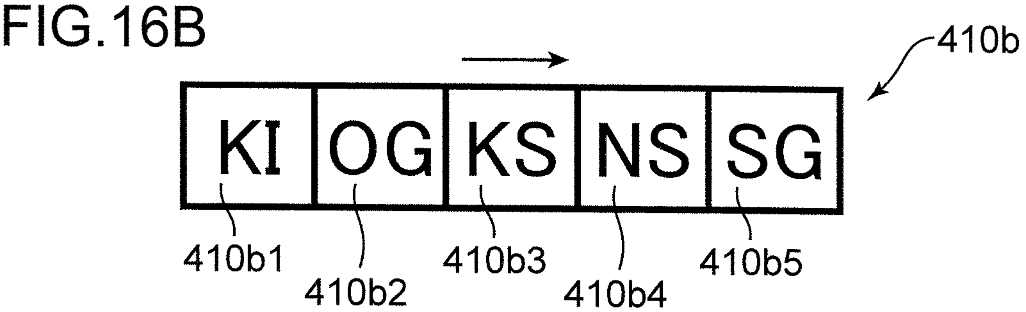
FIG. 16B is a diagram showing an example of the display screen of the display section.

In addition, in the process of S67 mentioned above, when enlarging the characters in each button image in accordance with the speed of change that is detected by the speed detector 524 in S66, the display controller 522 may enlarge the characters in each enlarged button image after reducing the number of characters to abbreviations thereof. For example, considered is the case shown in FIG. 16A where five buttons out of the plurality of buttons 410*b*1 to 410*b*9 are arranged and scroll-displayed so that the characters of the button 410*b*1 show "Kyoto Ichiro," the characters of the button 410*b*2 "Osaka Giro," the characters of the button 410*b*3 "Kobe Saburo," the characters of the button 410*b*4 "Nara Shiro," and the characters of the button 410*b*5 "Shiga Goro." In this case, when the speed of change that is detected by the speed detector 524 in S66 reaches the predetermined speed S1 that is higher than the predetermined standard speed S, the display controller 522 may enlarge and display the characters of each of the buttons after reducing the original number of characters to abbreviations thereof, such as "KI" for the characters in the button 410*b*1, "OG" for the characters in the button 410*b*2, "KS" for the characters in the button 410*b*3, "NS" for the characters in the button 410*b*4, and "SG" for the characters in the button 410*b*5, as shown in FIG. 16B.

The display control described above allows the characters to be further enlarged and displayed within each instruction acceptance image by reducing the number of displayed letters, whereby the operator can specify his/her desired instruction acceptance image more readily.

Figure 17:
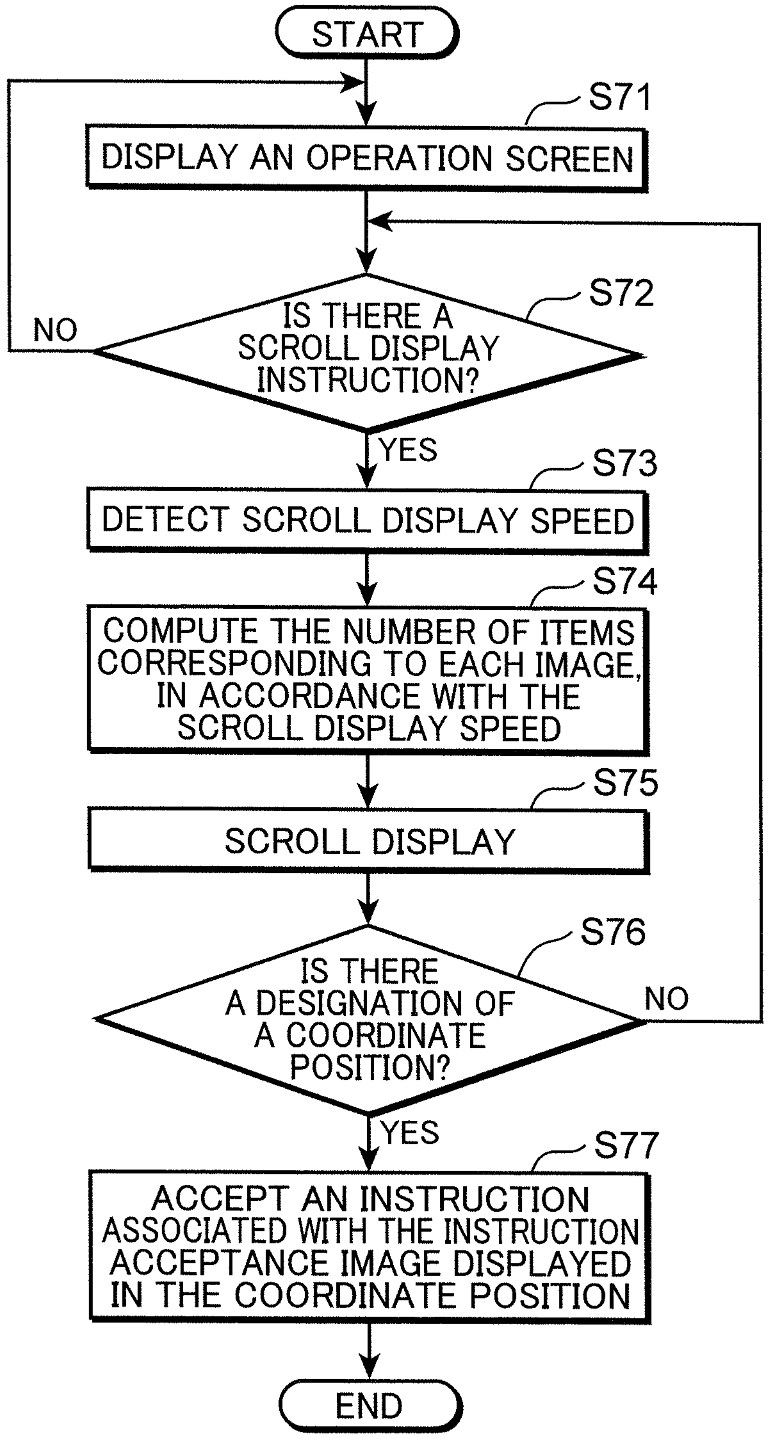
FIG. 17 is a flowchart showing a sixth embodiment of the display control process performed on the display section by the peripheral.

Next is described a sixth embodiment of the display control process performed on the display section 410 by the multi function peripheral 1. FIG. 17 is a flowchart showing the sixth embodiment of the display control process performed on the display section 410 by the multi function peripheral 1. FIGS. 18A, 18B and 18C are diagrams, each showing an example of the display screen of the display section 410. The sixth embodiment also describes the display process performed when the display controller 522 scroll-displays the instruction acceptance images on the display section 410.

For example, in the multi function multi function peripheral 1, when the display controller 522 displays on the display section 410 an operation screen B that displays a list image L showing a list of destinations to which the scanned data read by the scanner section 11 are transmitted (S71), as shown in FIG. 18A, the operator touches a scroll button SR1 or SR2 configuring a part of the list image L, whereby a scroll display instruction is accepted by the touch panel 4101 and the instruction accepting section 523 (YES in S72). Note that when the scroll display instruction is not accepted by the touch panel 4101 and the instruction accepting section 523 (NO in S72), the process of S71 is repeated. The direction of the scroll display is, for example, a direction from bottom to top in FIG. 18A (in the following description the same applies to the following embodiments in which scroll display instruction is carried out using the scroll button SR1 or SR2).

At this time, for example, the display controller 522 computes the scroll display speed transmission destination images L1 to Ln configuring the list image L, based on the length of the time for which the operator touches the scroll button SR1 or SR2, and the display controller 522 scroll-displays the transmission destination images L1 to Ln at the scroll display speed computed by the display controller 522. The speed detector 524 detects this scroll display speed (S73). For example, the longer the length of time for which the operator touches the scroll button SR1 or SR2, the more the scroll display speed the transmission destination images L1 to Ln is increased by the display controller 522, and the shorter the length of time for which the operator touches the scroll button SR1 or SR2, the more the scroll display speed the transmission destination images L1 to Ln is reduced.

Note that, as shown in FIG. 18A, each of the transmission destination images L1 to Ln has a plurality of items to each of which a hierarchical level is associated. In the present embodiment each of the transmission destination image L1 to Ln has "department," "division," "section" and "name" as the items in decreasing order of hierarchical level. In other words, each of the transmission destination images L1 to Ln comprises the four items of "department," "division," "section" and "name."

The display controller 522 reduces the number of items of each image scroll-displayed on the display section 410, as the scroll display speed that is detected by the speed detector 524 in S73 increases, and increases the number of items as the scroll display speed decreases, thereby computing the number of items in each image that is scroll-displayed on the display section 410 (S74).

For example, considered is the case shown in FIG. 18A where the display controller 522 scroll-displays on the display section 410 an array of four of the plurality of transmission destination images L1 to Ln in the vertical direction of FIG. 18A (in FIG. 18A the transmission destination images other than the transmission destination images L1 to L4 are hidden). In this case, when the scroll display speed that is detected by the speed detector 524 in S73 reaches the predetermined speed S1 that is higher than the predetermined standard speed S, the display controller 522 reduces the number of displayed items in each transmission destination image displayed on the display section 410 to, for example, three, as shown in FIG. 18B, to obtain the items of "department," "division" and "section" in decreasing order of hierarchical level, as the displayed items for each of the transmission destination images. Moreover, when the scroll display speed that is detected by the speed detector 524 in S73 reaches the predetermined speed S2 that is higher than the speed S1, the display controller 522 reduces the number of displayed items in each transmission destination image displayed on the display section 410 to, for example, two, which is less than the number obtained with the speed S1, and defines the items of "department" and "division" in decreasing order of hierarchical level, as the displayed items for each of the transmission destination images, as shown in FIG. 18C.

Figure 26:
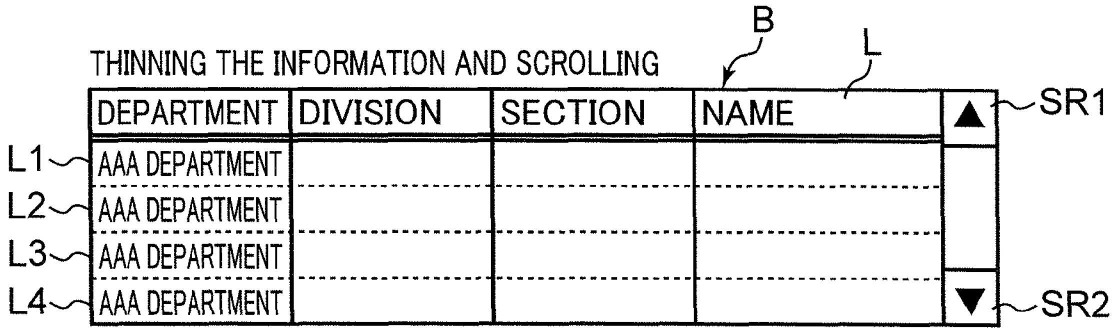
FIG. 26 is a diagram showing an example of the display screen of the display section.

Note that, when the display controller 522 determines in S74 that the scroll display speed detected by the speed detector 524 in S73 reaches speed E, which is higher than the speed S1 and the speed S2, the display controller 522 may perform the scroll display while displaying, for example, only the item of the highest hierarchical level for each of the transmission destination images L1 to Ln to be scroll-displayed, as shown in FIG. 26. Furthermore, when the scroll display speed that is detected by the speed detector 524 in S73 reaches the predetermined speed E higher than the predetermined standard speed S without relating the speed E to the speed S1 and the speed S2 (in other words, the display control based on the speed S1 and the speed S2 is not performed), the display controller 522 may perform the scroll display while displaying, for example, only the item of the highest hierarchical level for each of the transmission destination images L1 to Ln to be scroll-displayed, in S74.

When the images described above are scroll-displayed in this manner at high scroll display speed that deteriorates the operator's visibility on the images, the number of items of each image is reduced, and hence the reduced amount of information on each image observed by the operator. As a result, the operator can easily understand the contents of each image even when the images are scroll-displayed at high speed. When the images mentioned above are scroll-displayed at low scroll display speed that does not seem to deteriorate the operator's visibility on the images, the number of items of each image is increased. Therefore, without reducing the amount of information on each image observed by the operator, the operator can understand the contents of each image completely.

Figure 19:
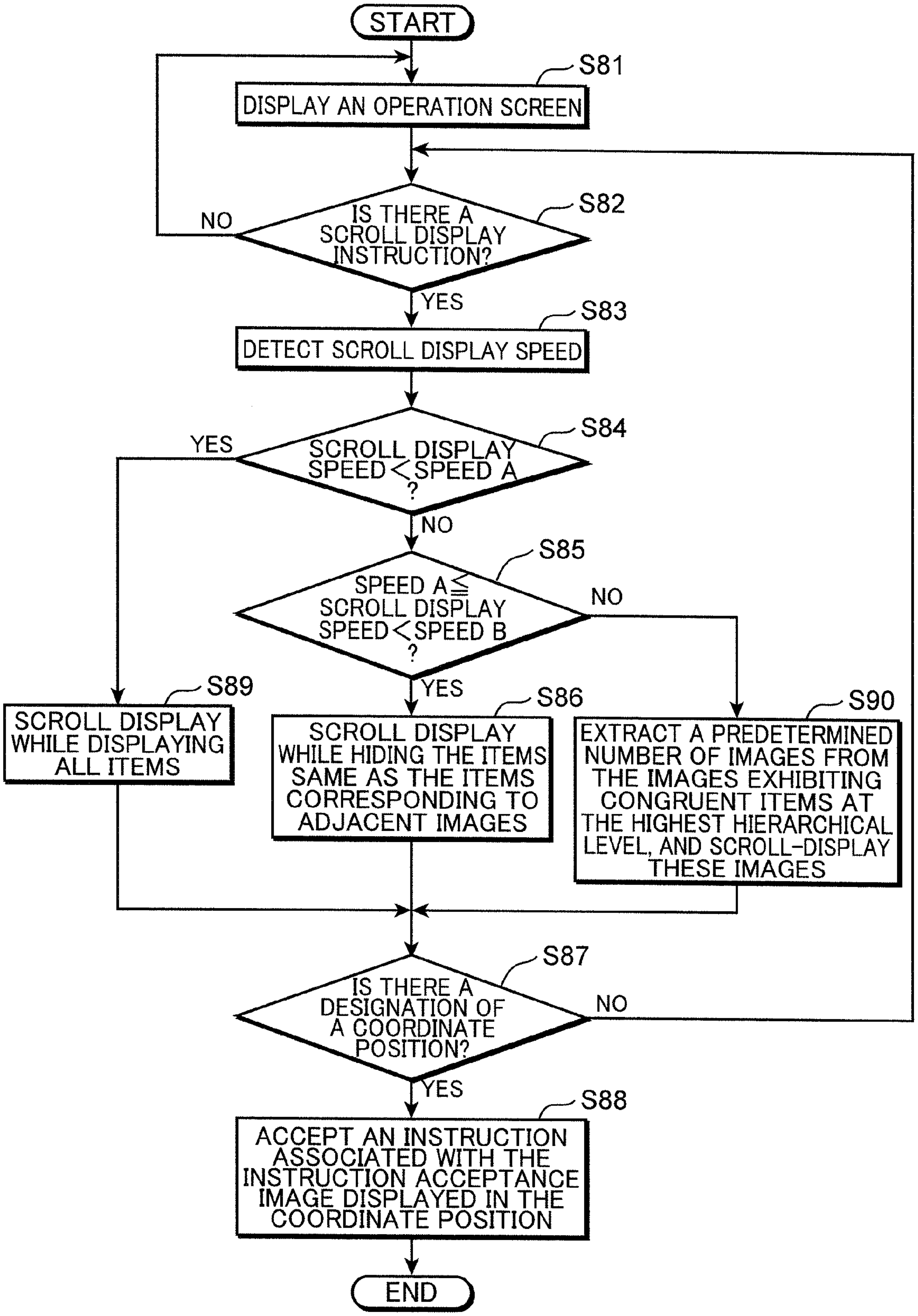
FIG. 19 is a flowchart showing a seventh embodiment of the display control process performed on the display section by the peripheral.

Next is described a seventh embodiment of the display control process performed on the display section 410 by the multi function multi function peripheral 1. FIG. 19 is a flowchart showing the seventh embodiment of the display control process performed on the display section 410 by the multi function multi function peripheral 1. FIGS. 20A, 20B and 20C are diagrams, each showing an example of the display screen of the display section 410. The seventh embodiment also describes the display process performed when the display controller 522 scroll-displays the instruction acceptance images on the display section 410. Note that the descriptions of the same processes as those of the sixth embodiment are omitted.

In the seventh embodiment, the display controller 522 scroll-displays continuously, on the display section 410, any transmission destination images exhibiting items at congruent levels among the transmission destination images L1 to Ln.

Then, when the speed detector 524 computes the speed of scrolling the transmission destination images L1 to Ln constituting the list image L, based on the length of time for which the operator touches the scroll button SR1 or SR2 (S83), the display controller 522 determines whether the scroll display speed that is detected by the speed detector 524 in S83 reaches predetermined first speed A (S84).

When the display controller 522 determines that the scroll display speed that is detected by the speed detector 524 in S83 does not reach the first speed A (YES in S84), the display controller 522 scroll-displays the transmission destination images L1 to Ln while displaying all of the items of each of the transmission destination images L1 to Ln (S89), as shown in FIG. 20A.

When, on the other hand, the display controller 522 determines that the scroll display speed that is detected by the speed detector 524 in S83 reaches the first speed A but not as far as second speed B higher than the first speed A (NO in S84, YES in S85), the display controller 522 performs the scroll display while hiding the items of any adjacent transmission destination images exhibiting congruent items among the transmission destination images L1 to Ln scroll-displayed on the display section 410 (S86). For example, in the case where each of the transmission destination images is displayed as shown in FIG. 20A, the display controller 522 hides the congruent items of the adjacent transmission destination images, as shown in FIG. 20B.

On the other hand, when the display controller 522 determines that the scroll display speed that is detected by the speed detector 524 in S83 reaches the second speed B (NO in S84, NO in S85), the display controller 522 extracts a predetermined number of images from the transmission destination images exhibit the items at the highest hierarchical level, and performs the scroll display (S90). For example, as shown in FIG. 20C, the display controller 522 displays only the transmission destination image that appears first in the display order of the transmission destination images exhibiting congruent items at the highest hierarchical level.

As described above, in the present embodiment, when the display controller 522 determines that the scroll display speed that is detected by the speed detector 524 in S83 mentioned above reaches the second speed B higher than the first speed A (NO in S84, NO in S85), the display controller 522 performs the process of S90 after carrying out the process of S85, but the process of S90 may be performed instead of the process of S85. In other words, when the display controller 522 determines that the scroll display speed detected by the speed detector 524 reaches the second speed B, without relating the second speed B to the first speed A, the second speed B being the reference speed to perform the process of S90, the display controller 522 may perform the process of extracting a predetermined number of images from the transmission destination images exhibiting congruent items at the highest hierarchical level, and perform the scroll display.

In this manner, the different portions among the transmission destination images, which are required for the operator to identify a difference among these images, are extracted and displayed on the display section 410. Thus, even when each of the transmission destination images is scroll-displayed at high speed, the operator can readily identify a difference among the images displayed on the display section 410.

Figure 33:
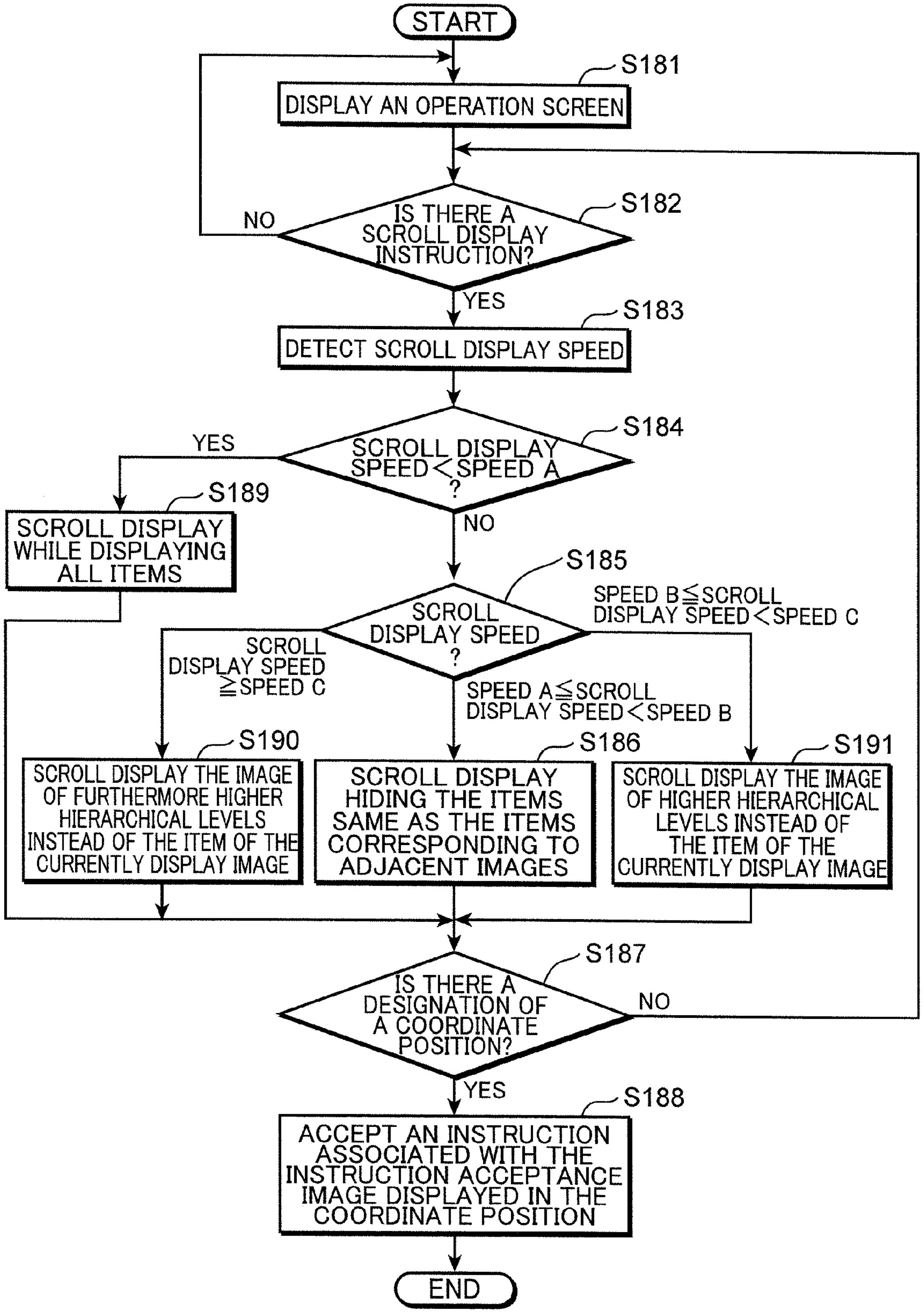
FIG. 33 is a flowchart of a modification of the seventh embodiment of the display control process performed on the display section by the peripheral.

Next is described a modification of the seventh embodiment of the display control process performed on the display section 410 by the multi function multi function peripheral 1. FIG. 33 is a flowchart of the modification of the seventh embodiment of the display control process performed on the display section 410 by the multi function peripheral 1. FIGS. 34A, 34B, 34C and 34D are diagrams, each showing an example of the display screen of the display section 410. Note that the descriptions of the same processes as those of the seventh embodiment using FIGS. 19 and 20 are omitted.

In the modification as well, the display controller 522 scroll-displays continuously, on the display section 410, any transmission destination images exhibiting items at congruent levels among the transmission destination images L1 to Ln. However, in this modification, when the display controller 522 determines that the scroll display speed detected by the speed detector 524 reaches the second speed B (NO in S184, “second speed B≤scroll display speed<third speed C” in S185, the third speed C being predetermined speed higher than the second speed B), the display controller 522 displays the adjacent images having different items in the higher hierarchical levels, instead of the items of the currently displayed images, and performs the scroll display (S191).

For example, the display controller 522 displays the transmission destination images in the manner shown in FIG. 34C. Note in this modification that five transmission destination images are displayed at once on the display section 410. However, the number of the transmission destination images to be displayed at once on the display section 410 is not limited to five. In other words, suppose that the scroll display speed detected by the speed detector 524 satisfies the relationship of “the first speed A the scroll display speed <the second speed B,” and that the scroll display speed detected by the speed detector 524 further increases and reaches the second speed B in a state in which the display controller 522 scroll-displays the transmission destination images L1 to Ln on the display section 410 while hiding the congruent items of the adjacent transmission destination images, as shown in FIG. 34B (S186). In this case, regarding the transmission destination images L3 to L5 that are different from the transmission destination images L1 and L2 in terms of the items of the higher hierarchical levels, the display controller 522 displays the image of the item “section” that is one level higher on the item “name,” which is at a lower level as shown in FIG. 34C. In such a case, it is preferred that the display controller 522 display the image only on the item “name,” because, since the scroll display speed is high, reducing the number of displayed items can improve the operator’s visibility on the images.

Moreover, considered is the case where the scroll display speed detected by the speed detector 524 reaches the predetermined third speed C higher than the second speed B and the display controller 522 determines that the detected scroll display speed reaches the third speed C (NO in S184, “scroll display speed third speed C” in S185). In this case, regarding the adjacent image that is displayed subsequently to the first displayed image and has a different item of the even higher hierarchical level, the display controller 522 performs the scroll display by displaying the image of the furthermore higher hierarchical level instead of the item of the currently displayed image (S190).

For example, FIG. 34D is used to explain the case where the transmission destination image L4 is displayed first. For the image of the item “division” on the higher hierarchical level above the image of the item “section,” for which the similarities are determined to perform the display process of S191 on the first displayed transmission destination image L4, the display controller 522 determines the similarities between the first displayed transmission destination image L4 and the subsequent transmission destination images L5 etc. For the transmission destination images L5 to L8 whose images of the items "division" on the further higher hierarchical level, the display controller 522 performs the scroll display while displaying these different images of the items "division" on the further higher hierarchical level, on the currently displayed item "name." In this case as well, it is preferred that the display controller 522 display these images only on the item "name," because, since the scroll display speed is high, reducing the number of displayed items can improve the operator's visibility on the images. The items "department," "division" and "section" of the transmission destination images L5 to L8 are illustrated using dashed lines in FIG. 34D, in order to explain the image contents of the higher hierarchical levels for the transmission destination images L5 to L8 and not to illustrate the preferable display patterns.

Figure 21:
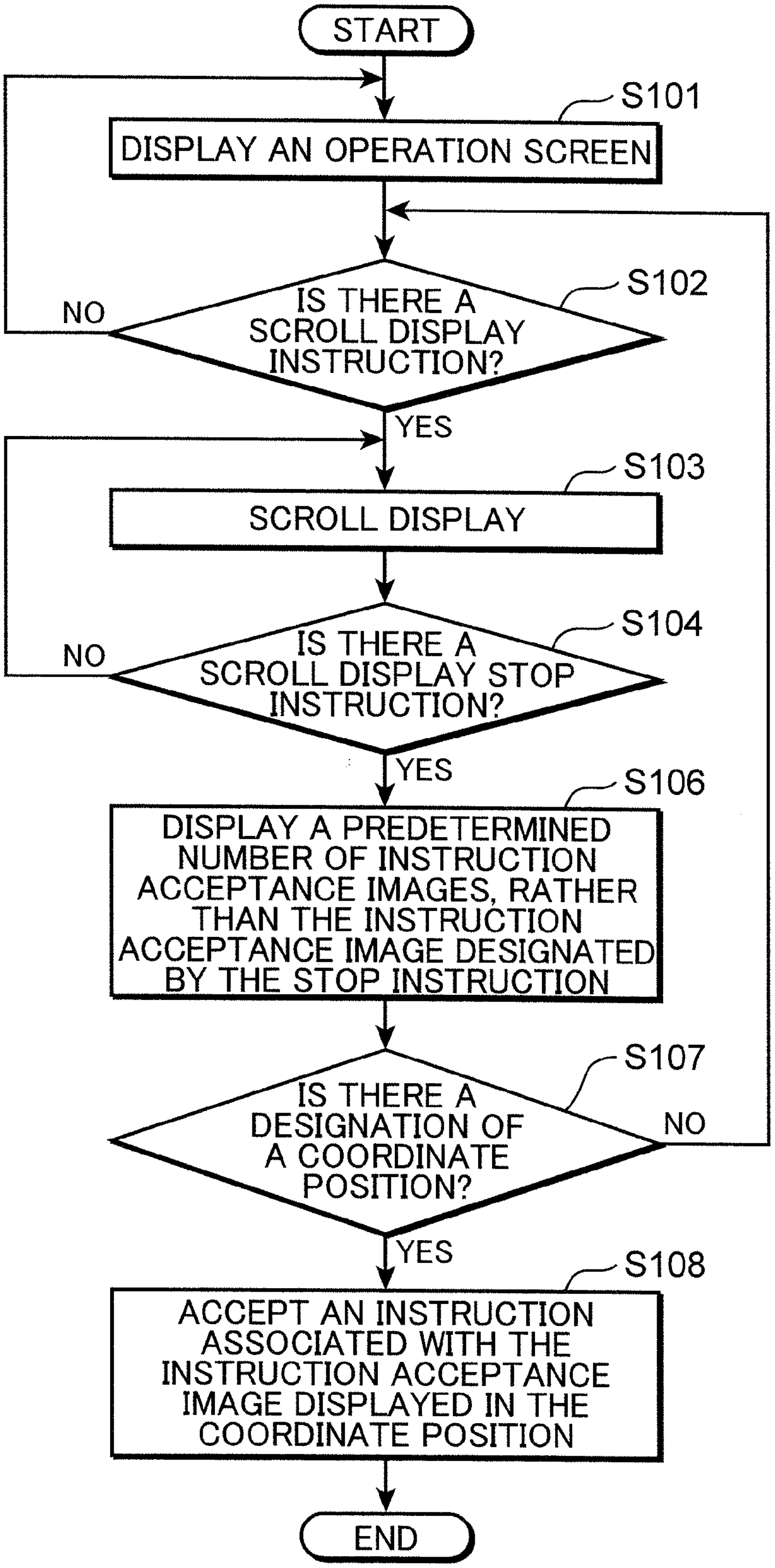
FIG. 21 is a flowchart showing an eighth embodiment of the display control process performed on the display section by the peripheral.

Next is described an eighth embodiment of the display control process performed on the display section 410 by the multi function peripheral 1. FIG. 21 is a flowchart showing the eighth embodiment of the display control process performed on the display section 410 by the multi function peripheral 1. FIGS. 22A and 22B are diagrams, each showing an example of the display screen of the display section 410. The eighth embodiment also describes the display process performed when the display controller 522 scroll-displays the instruction acceptance images on the display section 410. Note that the descriptions of the same processes as those of the sixth or seventh embodiment are omitted.

In the eighth embodiment, the display controller 522 scroll-displays continuously and sequentially, on the display section 410, any transmission destination images exhibiting items at congruent levels among the transmission destination images L1 to Ln. In the eighth embodiment four transmission destination images are displayed at once on the display section 410. However, the number of transmission destination images displayed at once on the display section 410 is not limited to four.

For example, in the multi function peripheral 1, when the display controller 522 displays on the display section 410 the operation screen B that displays the list image L showing the list of destinations to which the scanned data read by the scanner section 11 are transmitted (S101), the operator touches the scroll button SR1 or SR2, whereby the scroll display instruction is accepted by the touch panel 4101 and the instruction accepting section 523 (YES in 102). Consequently, the display controller 522 starts scroll-displaying the transmission destination images L1 to Ln as described above (S103). Note that when the scroll display instruction is not accepted by the touch panel 4101 and the instruction accepting section 523 (NO in S102), the process of S101 is repeated.

When a stop instruction for stopping the scroll display is accepted by the touch panel 4101 and the stop instruction accepting section 525 as a result of an operation in which the operator discontinues touching the scroll button SR1 or SR2 (YES in S104), the display controller 522 displays on the display section 410 the transmission destination image that is displayed a predetermined number of images before the instruction acceptance image (any of the transmission destination images L1 to Ln) that is scroll-displayed on the display section 410 at the point of time, and stops the scroll display at this condition when the scroll display stop instruction is accepted (S106).

For example, in the case where the scroll display stop instruction is accepted by the touch panel 4101 and the stop instruction accepting section 525, while the transmission destination images L4 to L7 of the transmission destination images L1 to Ln are scroll-displayed on the display section 410 by the display controller 522 as shown in FIG. 22A, the display controller 522 does not define such a display condition as the display screen of the display section 410. Instead, the display controller 522 defines, as the display screen of the display section 410, a condition in which the transmission destination images L1 to L4 are scroll-displayed on the display section 410 with the abovementioned predetermined number of images as three, and stops the scroll display, as shown in FIG. 22B.

Accordingly, when the operator's desired transmission destination image is displayed, even if the operator cannot input the stop instruction using the stop instruction accepting section 525 or even if it is too late to input the stop instruction, the image desired by the operator can be displayed on the display section 410 easily. For this reason, scroll-displaying the images on the display section 410 can improve the operator's visibility so that the operator can easily find his/her desired operation guide image.

In this embodiment, however, the speed detector 524 may detect the scroll display speed when the stop instruction accepting section 525 accepts the stop instruction, and the display controller 522 may acquire the scroll display speed from the speed detector 524 and change the abovementioned predetermined number of images in accordance with the scroll display speed in S106 mentioned above. For example, the display controller 522 may perform a process for increasing the abovementioned predetermined number of images as the scroll display speed increases.

Figure 23:
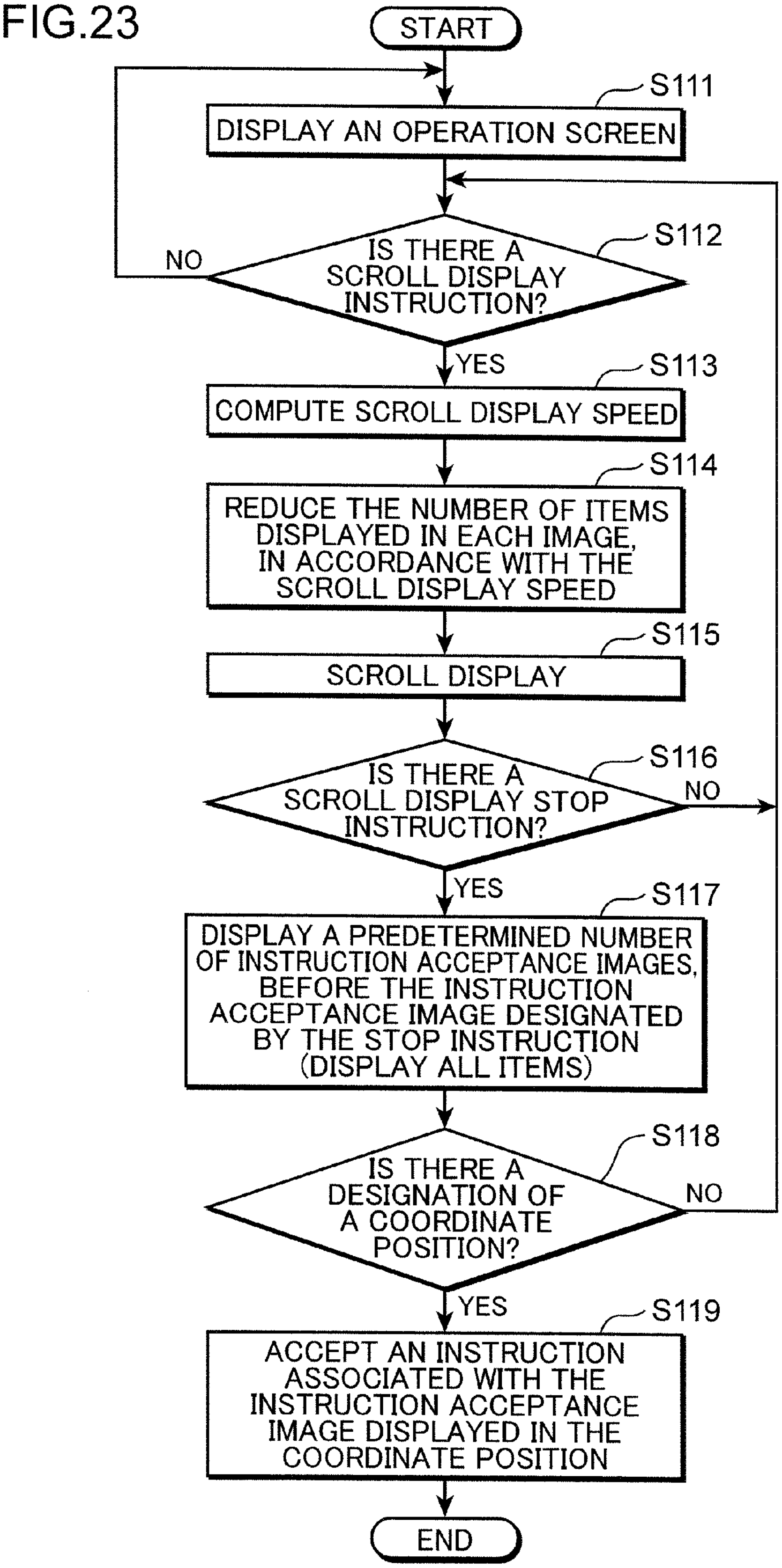
FIG. 23 is a flowchart showing a ninth embodiment of the display control process performed on the display section by the peripheral.

Next is described a ninth embodiment of the display control process performed on the display section 410 by the multi function peripheral 1. FIG. 23 is a flowchart showing the ninth embodiment of the display control process performed on the display section 410 by the multi function peripheral 1. FIGS. 24A to 24D are diagrams, each showing an example of the display screen of the display section 410. The ninth embodiment also describes the display process performed when the display controller 522 scroll-displays the instruction acceptance images on the display section 410. Note that the descriptions of the same processes as those of the sixth to eighth embodiments are omitted.

As with the eighth embodiment, in the ninth embodiment the display controller 522 scroll-displays continuously and sequentially, on the display section 410, any transmission destination images exhibiting items at congruent levels among the transmission destination images L1 to Ln.

Furthermore, in the ninth embodiment, when, for example, the scroll display instruction is accepted in the multi function peripheral 1 (YES in S112), the display controller 522 reduces the number of instruction acceptance images displayed on the display section 410, in accordance with the scroll display speed that is detected by the speed detector 524 in S113 (S114). The display controller 522 here reduces the number of items on each image scroll-displayed on the display section 410 as the scroll display speed that is detected by the speed detector 524 in S73 increases, or increases the number of items as the scroll display speed decreases. In this manner, the display controller 522 computes the number of items on each of the images scroll-displayed on the display section 410 (S114). The display controller 522 then causes the display section 410 to display the transmission destination image that is displayed a predetermined number of images before the instruction acceptance image (any of the transmission destination images L1 to Ln) that is scroll-displayed on the display section 410 at the point of time when the scroll display stop instruction is accepted (S117).

For example, considered is the case shown in FIG. 24A where the display controller 522 scroll-displays on the display section 410 an array of four transmission destination images L4 to L7 out of the plurality of transmission destination images L1 to Ln in the vertical direction of FIG. 24A (in FIG. 24A the transmission destination images other than the transmission destination images L4 to L7 are hidden). In this case, when the scroll display speed that is detected by the speed detector 524 in S113 reaches the predetermined speed S1 that is higher than the predetermined standard speed S, the display controller 522 reduces the number of displayed items in each transmission destination image displayed on the display section 410 to, for example, three, as shown in FIG. 24B, to obtain the items of "department," "division" and "section" in decreasing order of hierarchical level, as the displayed items for each of the transmission destination images. Moreover, when the scroll display speed that is detected by the speed detector 524 in S113 reaches the predetermined speed S2 that is higher than the speed S1, the display controller 522 reduces the number of displayed items in each transmission destination image displayed on the display section 410 to, for example, two, which is less than the number obtained with the speed S1, and defines the items of "department" and "division" in decreasing order of hierarchical level, as the displayed items for each of the transmission destination images, as shown in FIG. 24C.

In this display condition, in the case where the scroll display stop instruction is accepted by the touch panel 4101 and the stop instruction accepting section 525, the display controller 522 defines, as the display screen of the display section 410, a condition in which the transmission destination images L1 to L4 are scroll-displayed on the display section 410 with the abovementioned predetermined number of images as three, and stops the scroll display, as shown in FIG. 24D.

When the images described above are scroll-displayed in this manner at high speed of change that deteriorates the operator's visibility on the images, the number of items of each image is reduced, and hence the reduced amount of information on each image observed by the operator. As a result, the operator can easily understand the contents of each image even when the images are scroll-displayed at high speed.

Figure 25:
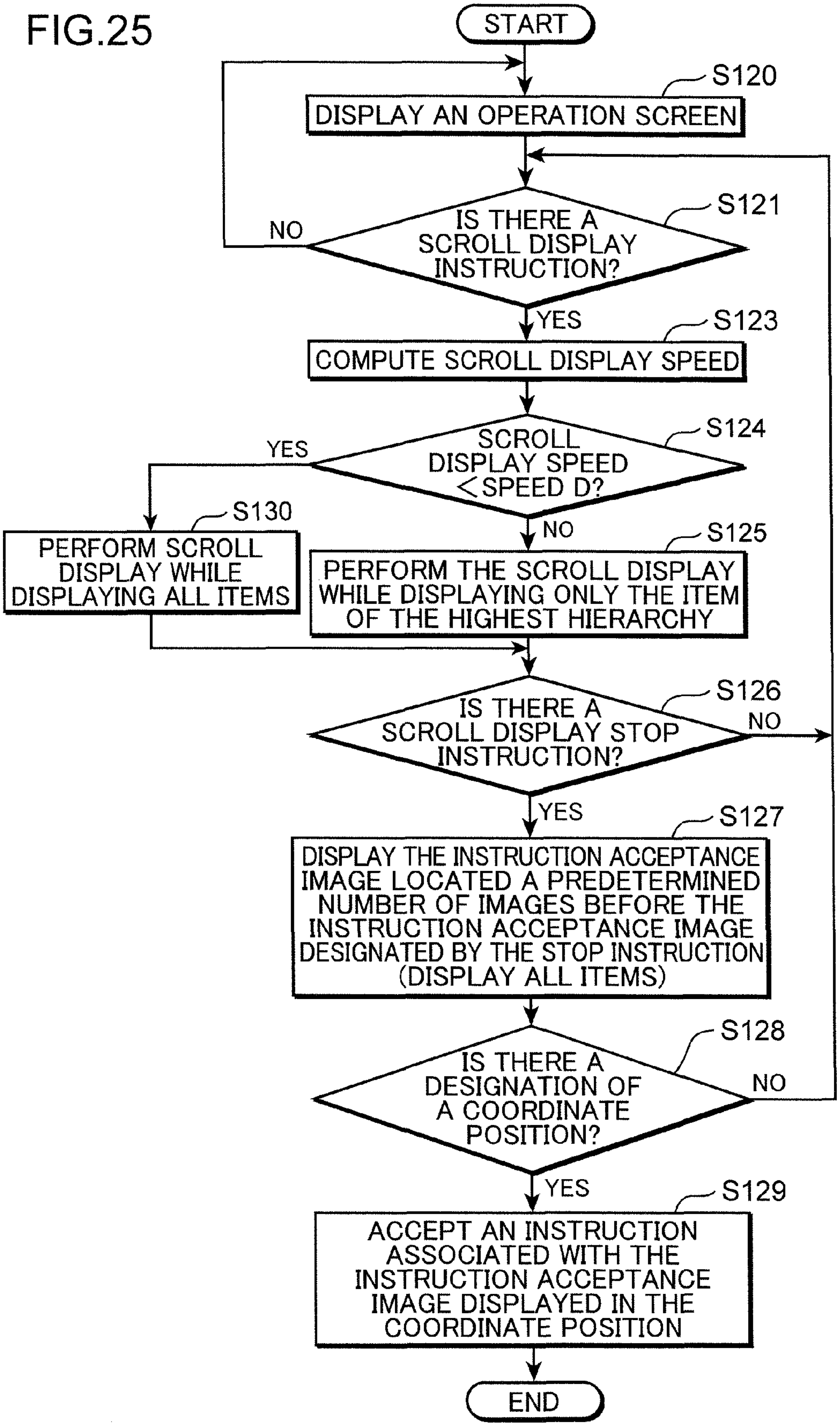
FIG. 25 is a flowchart showing a tenth embodiment of the display control process performed on the display section by the peripheral.

Next is described a tenth embodiment of the display control process performed on the display section 410 by the multi function peripheral 1. FIG. 25 is a flowchart showing the tenth embodiment of the display control process performed on the display section 410 by the multi function peripheral 1. FIG. 26 is a diagram showing an example of the display screen of the display section 410. The tenth embodiment also describes the display process performed when the display controller 522 scroll-displays the instruction acceptance images on the display section 410. Note that the descriptions of the same processes as those of the sixth to ninth embodiments are omitted.

As with the ninth embodiment, in the tenth embodiment the display controller 522 scroll-displays continuously and sequentially, on the display section 410, any transmission destination images exhibiting items at congruent levels among the transmission destination images L1 to Ln.

In the tenth embodiment, in the case where, for example, the scroll display instruction is accepted in the multi function peripheral 1 (YES in S121), when the display controller 522 determines that the scroll display speed that is detected by the speed detector 524 in S123 is standard scroll display speed that is lower than predetermined speed D (YES in S124), the display controller 522 performs the scroll display while displaying all of the items of the transmission destination images L1 to Ln (S130). When, on the other hand, the display controller 522 determines that the scroll display speed that is detected by the speed detector 524 in S123 reaches the speed D that is higher than the standard scroll display speed (NO in S124), the display controller 522 performs the scroll display while displaying, for example, only the item of the highest hierarchical level for each of the transmission destination images L1 to Ln (S125), as shown in FIG. 26. Hereinafter, the processes that are carried out after the acceptance of the scroll display stop instruction by the stop instruction accepting section 525 (S126 to S129) are identical to those described in the ninth embodiment.

As described above, the display controller 522 displays only the item of the highest hierarchical level for each of the transmission destination images when the speed of change reaches the predetermined speed D. Thus, even when each transmission destination image is scroll-displayed on the display section 410 at higher speed, the amount of information on each transmission destination image to be displayed is narrowed down so that operator can easily identify the attribute or type of each transmission destination image. Therefore, even when each transmission destination image is scroll-displayed at high speed, the operator can easily specify his/her desired image from the transmission destination images displayed on the display section 410. In addition, when the scroll display is stopped, all of the items configuring each transmission destination image are displayed. Therefore, in the case where the operator can easily identify the contents of the displayed transmission destination images, the operator can completely understand the contents of each transmission destination image.

Figure 27:
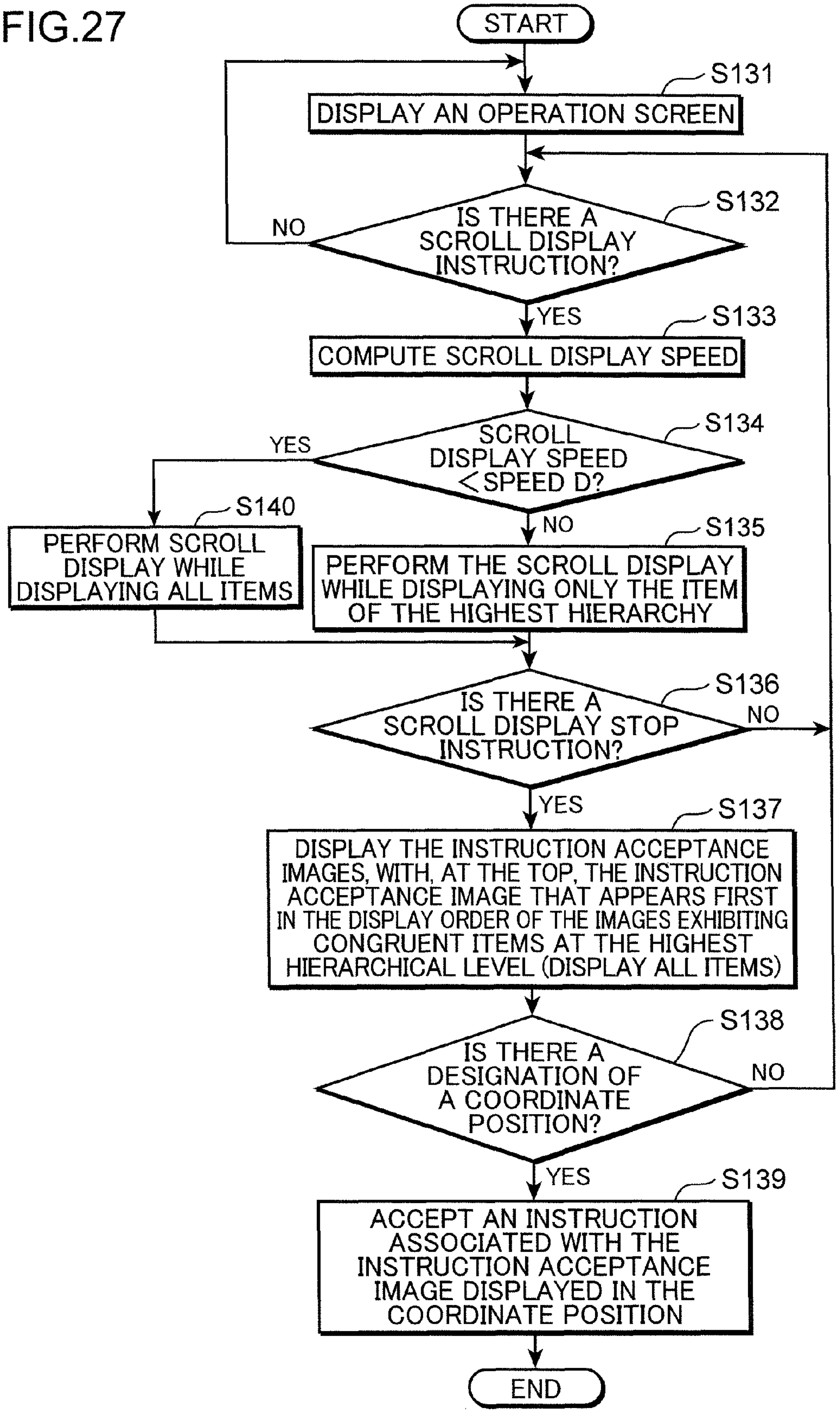
FIG. 27 is a flowchart showing an eleventh embodiment of the display control process performed on the display section by the peripheral.

Next is described an eleventh embodiment of the display control process performed on the display section 410 by the multi function peripheral 1. FIG. 27 is a flowchart showing the eleventh embodiment of the display control process performed on the display section 410 by the multi function peripheral 1. FIGS. 28A and 28B are diagrams, each showing an example of the display screen of the display section 410. The eleventh embodiment also describes the display process performed when the display controller 522 scroll-displays the instruction acceptance images on the display section 410. Note that the descriptions of the same processes as those of the sixth to tenth embodiments are omitted.

As with the tenth embodiment, in the eleventh embodiment the display controller 522 scroll-displays continuously and sequentially, on the display section 410, any transmission destination images exhibiting items at congruent levels among the transmission destination images L1 to Ln.

In the eleventh embodiment, in the case where, for example, the display controller 522 determines that the scroll display speed that is detected by the speed detector 524 in S133 reaches the speed D that is higher than the standard scroll display speed, as shown in FIG. 28A (NO in S134), the display controller 522 performs the scroll display while displaying only the item of the highest hierarchical level for each of the transmission destination images L1 to Ln (S135). Here, when the scroll display stop instruction is accepted by the stop instruction accepting section 525 (YES in S136), the display controller 522 stops the scroll display while displaying the array of any transmission destination images exhibiting congruent items at the highest hierarchical level among the transmission destination images L1 to Ln, which are scroll-displayed upon the acceptance of the scroll display stop instruction, with the first transmission destination image displayed at the top (S137), as shown in FIG. 28B. At this time the display controller 522 displays all of the items of each transmission destination image on the display section 410.

As described above, when the scroll display is stopped, the display controller 522 displays the array of any transmission destination images exhibiting congruent items at the highest hierarchical level among the transmission destination images, which are scroll-displayed upon the acceptance of the scroll display stop instruction by the stop instruction accepting section 525, with the first transmission destination image displayed at the top. Therefore, the operator can completely understand the contents of each of the transmission destination images exhibiting congruent items at the highest hierarchical level.

Note in the eleventh embodiment that in the case where the scroll display speed reaches the speed D that is higher than the standard scroll display speed, the display controller 522 carries out the scroll display while displaying only the item of the highest hierarchical level for each of the transmission destination images L1 to Ln (the item "department" in the example shown in FIG. 28A) (S135). However, instead, in S135 the display controller 522 may perform the scroll display while displaying the items of a predetermined number of higher hierarchical levels for each of the scroll-displayed images. In the example shown in FIG. 28A, the display controller 522 performs the scroll display while displaying not only the item "department," which is the highest hierarchical level, but also two items "department" and "division" or three items from "department" to "section."

In this case, when the scroll display stop instruction is accepted by the stop instruction accepting section 525 (YES in S136), in S137 the display controller 522 stops the scroll display while displaying the array of any transmission destination images exhibiting congruent items at the lowest hierarchical level among the transmission destination images L1 to Ln, which are scroll-displayed upon the acceptance of the scroll display stop instruction, with the first transmission destination image displayed at the top. The process in which the display controller 522 displays all of the items of each transmission destination image on the display section 410 is performed at this time are identical to those described in the tenth embodiment.

Figure 29:
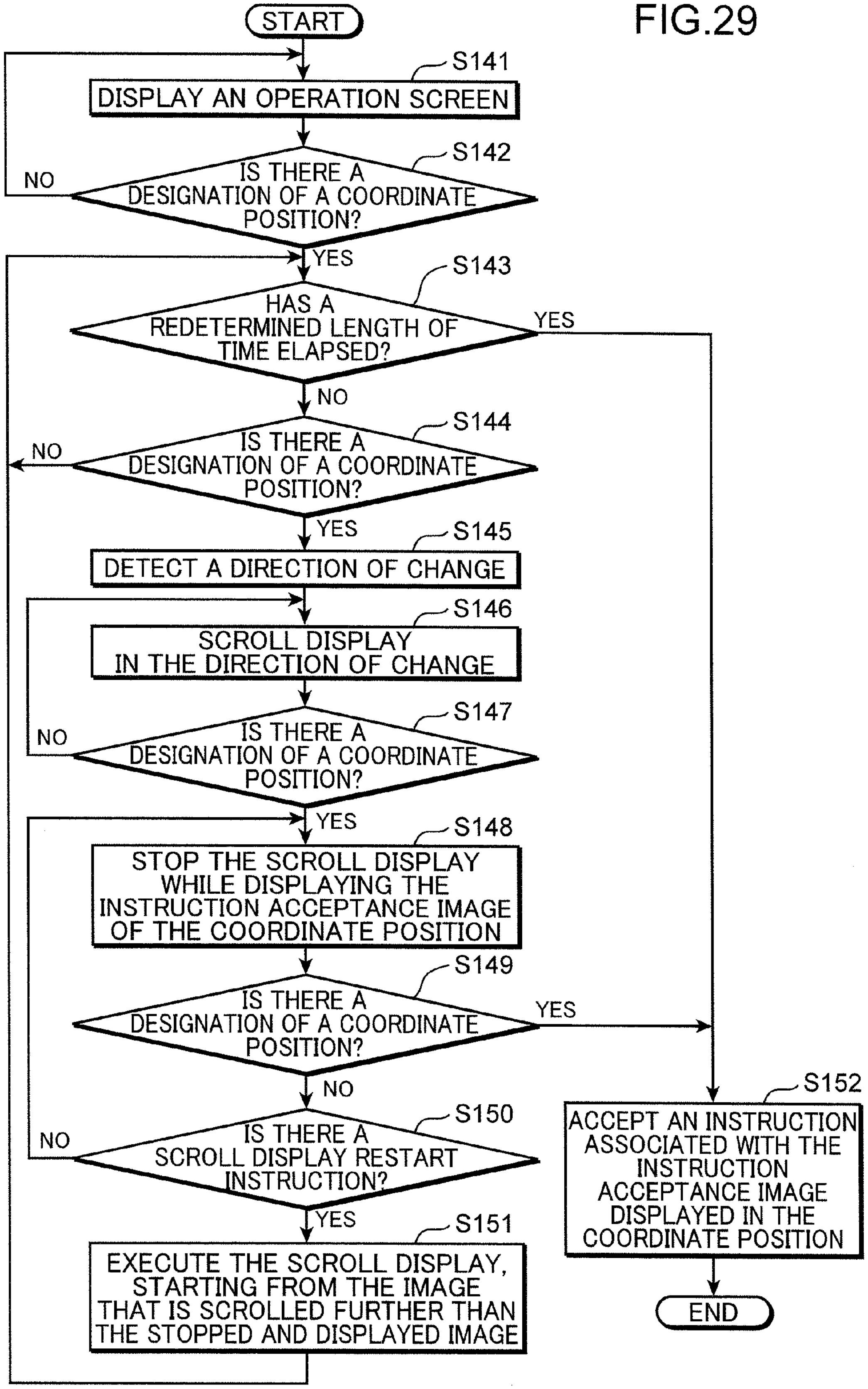
FIG. 29 is a flowchart showing a twelfth embodiment of the display control process performed on the display section by the peripheral.

Next is described a twelfth embodiment of the display control process performed on the display section 410 by the multi function peripheral 1. FIG. 29 is a flowchart showing the twelfth embodiment of the display control process performed on the display section 410 by the multi function peripheral 1. FIGS. 30A to 30D are diagrams, each showing an example of the display screen of the display section 410. The twelfth embodiment also describes the display process performed when the display controller 522 scroll-displays the instruction acceptance images on the display section 410. Note that the descriptions of the same processes as those of the third embodiment are omitted.

When the main power source of the multi function peripheral 1 is turned on, the display controller 522 displays in the display section 410 the operation screen (initial screen A) shown in FIG. 5 described above (S141). When the operator touches the density button 410*a* while the display controller 522 displays the initial screen A on the display section 410, the instruction for setting the copy density is accepted by the touch panel 4101 and the instruction accepting section 523. At this time, the display controller 522 displays the density setting button 410*b* (a part of the density setting screen) shown in FIG. 30A, on the display section 410.

When the operator touches any of the buttons 410*b*1 to 410*b*5 constituting the density setting button 410*b* while the display controller 522 is displaying the density setting button 410*b*, designation of the coordinate position of a display position for any of the buttons 410*b*1 to 410*b*5 is accepted by the touch panel 4101 (YES in S142). In this case, the instruction accepting section 523 acquires the information on the designated coordinate position from the touch panel 4101 and uses a timer embedded in the instruction accepting section 523 to measure the time that has elapsed since the designation of the coordinate position (S143). It should be noted that when the designation of the coordinate position of the display position for any of the buttons 410*b*1 to 410*b*5 is not accepted by the touch panel 4101 (NO in S142), the process of S141 is repeated.

Here, in the case where designation of the next coordinate position is not accepted by the touch panel 4101 even when the time measured by the instruction accepting section 523 reaches a predetermined elapsed time (0.5 seconds, for example) (YES in S143), that is, when the operator holds his/her finger at the coordinate position of the display position for any of the buttons 410*b*1 to 410*b*5, an instruction associated with the instruction acceptance image (any of the buttons 410*b*1 to 410*b*5) displayed in the coordinate position is accepted by the instruction accepting section 523 (S152).

On the other hand, in the case where another coordinate position is accepted by the touch panel 4101 (YES in S144) while the time measured by the instruction accepting section 523 in S143 does not reach the predetermined elapsed time (NO in S143), the speed detector 524 detects the direction of change based on these first and subsequent coordinate positions (S145).

Figure 30A:
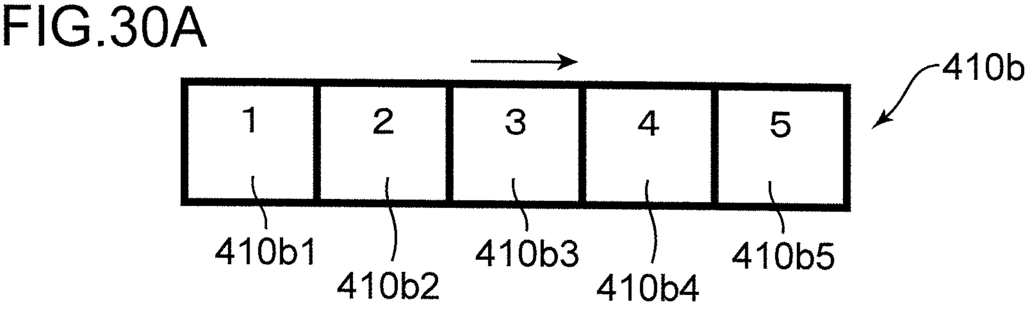
FIG. 30A is a diagram showing an example of the display screen of the display section.
Figure 30B:
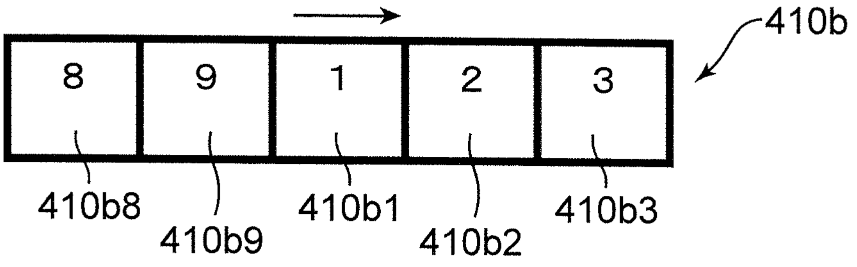
FIG. 30B is a diagram showing an example of the display screen of the display section.

Then, the display controller 522 scroll-displays on the display section 410 the plurality of instruction acceptance images (the buttons 410*b*1 to 410*b*5) to be displayed, in the direction of the change that is detected by the speed detector 524 in S145 (S146). For example, as shown in FIG. 30B, when the direction of change that is detected by the speed detector 524 in S145 is the direction of the arrow, the display controller 522 displays each of the images of the buttons 410*b*1 to 410*b*9 such that these images are displayed and sequentially scrolled five by five on the display section 410 in the direction of the arrow.

Figure 30C:
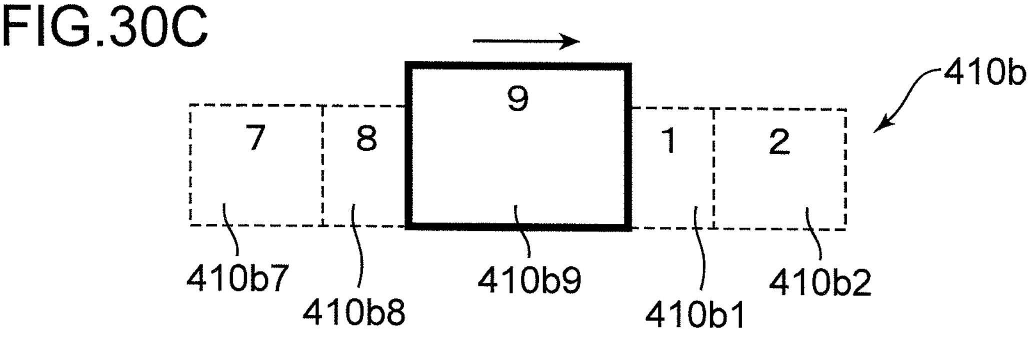
FIG. 30C is a diagram showing an example of the display screen of the display section.

When the operator touches any of the buttons 410*b*1 to 410*b*9, designation of the coordinate position of the display position for any of the buttons 410*b*1 to 410*b*9 is accepted by the touch panel 4101 (YES in S147). In this case, the instruction accepting section 523 acquires the information on the designated coordinate position from the touch panel 4101 and stops the scroll display, while the image of the button displayed on the coordinate position (the instruction acceptance image) is displayed on the display section 410 (S148). For example, when designation of the coordinate position of the display position for the button 410*b*9 is accepted by the operator, the display controller 522 causes the display section 410 to display (enlarge and display) its display screen showing the image of the button 410*b*9, as shown by the solid line in FIG. 30C, and also causes the display section 410 to display its display screen showing the images of the other buttons that are not designated by the operator, as shown by the dashed lines in FIG. 30C. In this manner, the display pattern of the image of the button 410*b*9 designated by the operator is preferably differentiated from the display pattern of the images of the other buttons, by displaying the image of the button 410*b*9 larger than the other buttons, as shown in FIG. 30C.

When the operator touches any of the displayed buttons and designation of the coordinate position of the display position for any of the displayed buttons is accepted by the touch panel 4101 while the display screen that shows the image of the button **410*b*9 designated by the operator as described above is displayed on the display section 410 (YES in S149), an instruction associated with the instruction acceptance image (any of the buttons 410*b*1 to 410*b*9) displayed in the coordinate position is accepted by the instruction accepting section 523 (S152**).

Figure 30D:
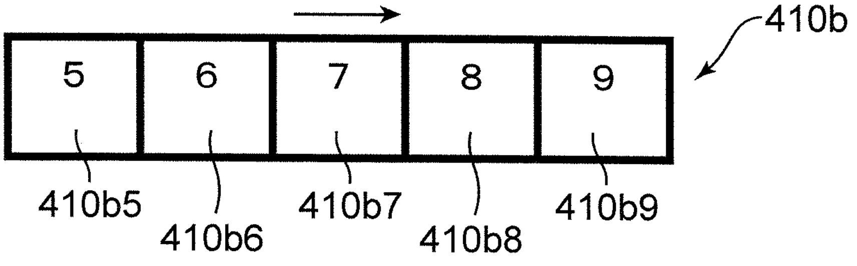
FIG. 30D is a diagram showing an example of the display screen of the display section.

Moreover, when a scroll display restart instruction is accepted by the restart instruction accepting section 526 by a predetermined operation performed on the touch panel 4101 by the operator (within a predetermined time. For example, two different coordinate positions are designated within less than 0.5 seconds) (YES in S150) without having designation of the coordinate position of the display position by the operator accepted (NO in S149), the display controller 522 restarts the scroll display, starting from the image that is scrolled further than the image that is stopped in S148, instead of scroll-displaying the image stopped in S148 (S151). The display controller 522 starts the scroll display, starting from the image scrolled further than the stopped image, instead of starting the scroll display of the display condition shown in, for example, FIG. 30C. For instance, the display controller 522 performs the scroll display in the same manner as the case where the scroll display of S146 is performed continuously without being stopped. For example, as shown in FIG. 30D, the button **410*b*9 that is displayed in the center of the plurality of instruction acceptance images in the display condition shown in FIG. 30C is displayed in the position that is obtained in the direction of the arrow (the direction of change) shown in FIG. 30D after the lapse of time since the designation of the coordinate position made in S147 until the scroll display restart instruction is accepted in S150. Thereafter, the process returns to S143**.

However, the process of S151 may be performed by the display controller 522 to restart the scroll display, starting from the image that is scrolled further than the image stopped in S148. As described above, the scroll display, which is carried out in the same manner as the case where the scroll display of S146 is performed continuously without being stopped, is merely an example of the process of S151.

Therefore, when, for example, the operator finds his/her desired image from the images scroll-displayed on the display section 410, the operator can check the contents of this image displayed on the display screen of the display section 410. Furthermore, when the operator finishes checking the contents of the image and restarts the scroll display, the desired image is displayed as if the scroll display is not stopped. Therefore, the time during which the operator has to wait until his/her desired image is displayed on the display section 410 can be reduced.

Figure 31:
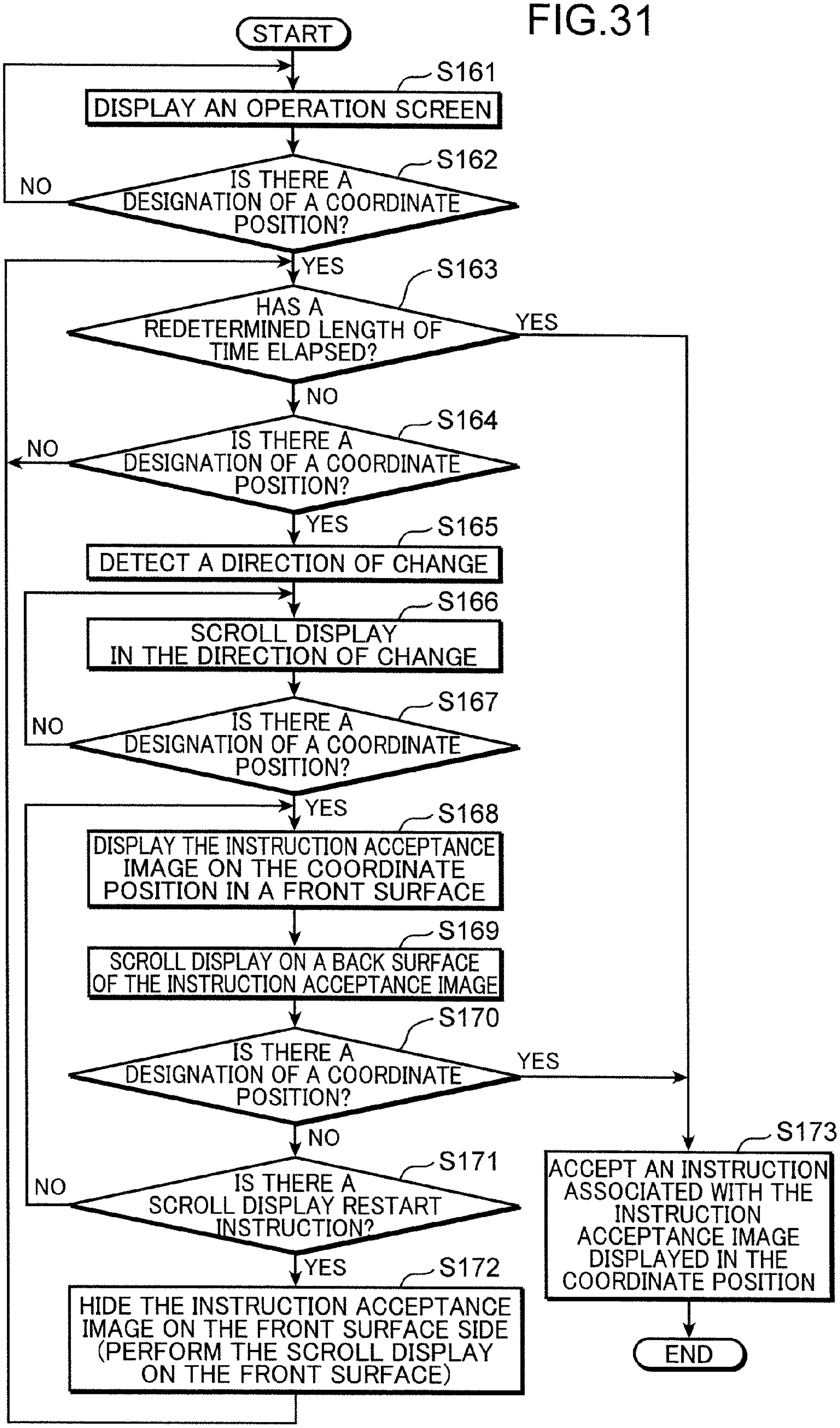
FIG. 31 is a flowchart showing a thirteenth embodiment of the display control process performed on the display section by the peripheral.

Next is described a thirteenth embodiment of the display control process performed on the display section 410 by the multi function peripheral 1. FIG. 31 is a flowchart showing the thirteenth embodiment of the display control process performed on the display section 410 by the multi function peripheral 1. FIGS. 32A to 32D are diagrams, each showing an example of the display screen of the display section 410. The thirteenth embodiment also describes the display process performed when the display controller 522 scroll-displays the instruction acceptance images on the display section 410. Note that the descriptions of the same processes as those of the twelfth embodiment are omitted.

Figure 32A:
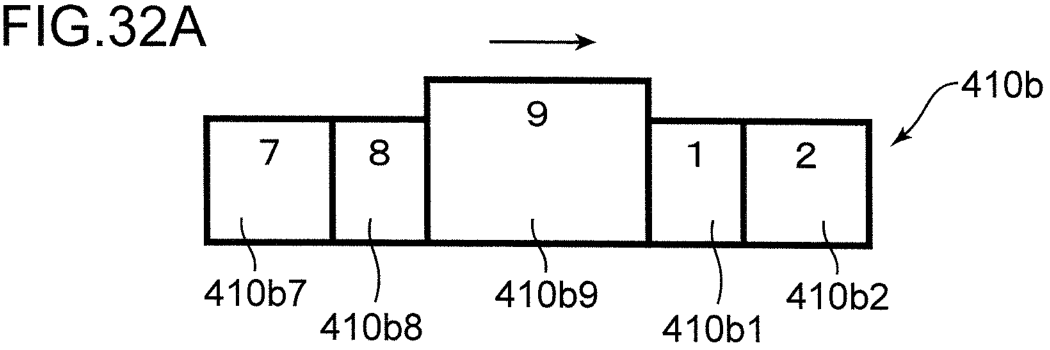
FIG. 32A is a diagram showing an example of the display screen of the display section.

In the thirteenth embodiment, when designation of a coordinate position from the operator is accepted by the touch panel 4101 (YES in S167) when the display controller 522 performs the scroll display on the display section 410 in the direction of change that is detected by the speed detector 524 in S165 (S166), the instruction accepting section 523 acquires the information on the designated coordinate position from the touch panel 4101, and the display controller 522 displays the image of the button displayed in the coordinate position (the instruction acceptance image), on a front surface of the display screen of the display section 410, and the display controller 522 stops the scroll display at this condition as shown in FIG. 32A, for example (S168).

Figure 32B:
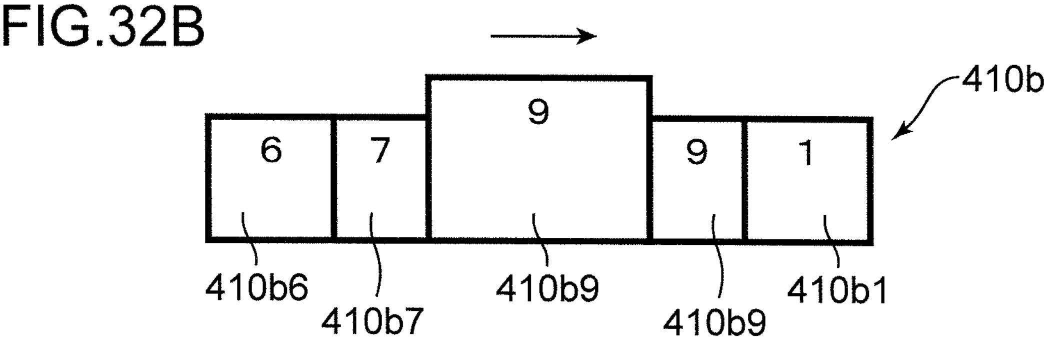
FIG. 32B is a diagram showing an example of the display screen of the display section.
Figure 32C:
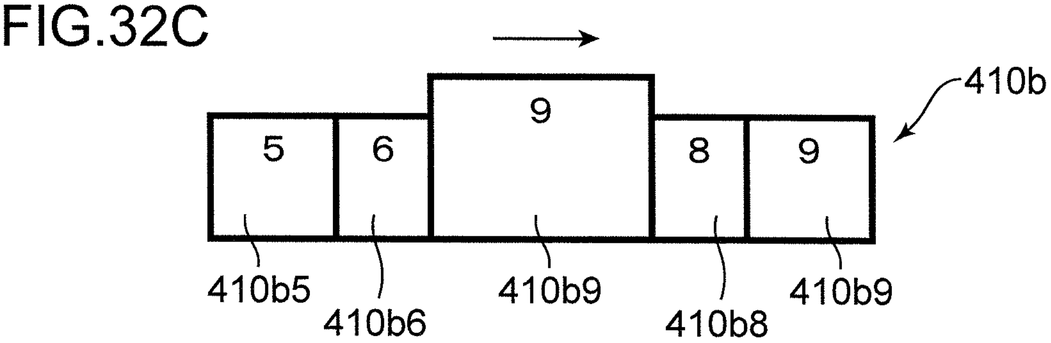
FIG. 32C is a diagram showing an example of the display screen of the display section.

At this time the display controller 522 keeps the display condition obtained by the scroll display started in S166, on a back surface of the image of the button displayed on the front surface (the instruction acceptance image) (S169). For example, as shown in FIG.32A the display controller 522 continues the scroll display as shown in FIG. 32B and then in FIG. 32C, sequentially, without stopping scroll-displaying each button on the back surface as shown in FIG. 31A, even when the image of the button is displayed on the front surface.

Figure 32D:
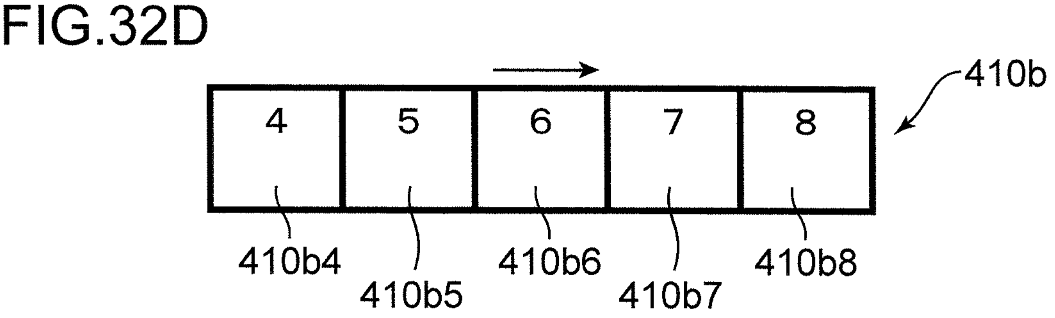
FIG. 32D is a diagram showing an example of the display screen of the display section.

Then, when the scroll display restart instruction from the operator (the instruction for stopping the display of the image of the button on the front surface) is accepted by the restart instruction accepting section 526 (YES in S171), the display controller 522 stops displaying the image of the button on the front surface and hides this image. The display controller 522 then starts displaying this image in S166 to perform the scroll display, which is performed continuously in S169, on the front surface of the display screen of the display section 410 (S172). For example, as shown in FIG. 32D, the display controller 522 displays the button **410*b*8, which was displayed in a second position from the left in the display condition shown in FIG. 32A, in a position obtained later in the direction of the arrow shown in FIG. 32D (the direction of change). Thereafter, the process returns to S163**.

As a result, when the operator finds his/her desired image from the images scroll-displayed on the display section 410, the operator can observe the images that are sequentially scroll-displayed on the display section 410, while checking the contents of the desired image displayed on the display screen of the display section 410.

Note that the present invention can be modified in various ways without being limited to the configurations of the foregoing embodiments. For instance, the configurations and processes according to the embodiments shown in FIGS. 1 to 34 are merely exemplary the configurations and processes of the image forming apparatus according to the present invention, and the configurations and processes of the image forming apparatus according to the present invention should not be limited to the details described above.

In addition, according to each of the foregoing embodiments, the display device according to the present invention is mounted in not only the image forming apparatus such as the multi function peripheral 1, but also other electronic devices, such as personal computers, cellular phones, microwaves, and washing machines.

Although the image forming apparatus according to the present invention was described as the multi function peripheral 1, the image forming apparatus of the present invention can be not only a peripheral but also a copy machine, a facsimile device, and a printer.

In the foregoing embodiments, the speed of change or the scroll display speed detected by the speed detector 524 is used in the process for changing the display patterns of the instruction acceptance images. However, not only the speed of change mentioned above, but also acceleration during changing of the coordinate position may be used as the speed of change. However, not only the scroll display speed mentioned above, but also the scroll distance obtained during the scroll display may be used as the scroll display speed. In this case, the acceleration and the scroll distance may be detected by the speed detector 524.

In the foregoing embodiments, the display controller 522 and the speed detector 524 are constituted as separate section, however, but not only the display controller 522 and the speed detector 524 mentioned above, but also the display controller 522 and the speed detector 524 are constituted as one section, for example the display controller 522 has function as the speed detector 524.

In other words, the present invention is a display device, comprising: a display section that displays images; an image storage section that stores a plurality of instruction acceptance images that are displayed on the display section to accept an instruction from an operator; a display controller that displays, on the display section, each of the instruction acceptance images stored in the image storage section; a coordinate position designating section that accepts, from the operator, designation of a coordinate position within a display area of the display section; an instruction accepting section that accepts input of an instruction associated with any of the instruction acceptance images that is displayed in the coordinate position designated by the coordinate position designating section; and a speed detector that detects a speed of change at which the coordinate position designated by the coordinate position designating section changes, wherein, when a display position for any of the instruction acceptance images is designated by designation of the coordinate position accepted by the coordinate position designating section, the instruction accepting section enlarges, for a predetermined period of time, an area for accepting the input of an instruction associated with the instruction acceptance image that is displayed in the designated display position, to a size corresponding to the speed of change that is detected by the speed detector at the time of the designation.

The present invention is also a display control method for displaying, on a display section of an electronic device, a plurality of instruction acceptance images for accepting an instruction from an operator, and accepting, from the operator, input of an instruction associated with any of the instruction acceptance images, the display control method comprising: an instruction acceptance image display step of displaying each of the instruction acceptance images on the display section; a position designation accepting step of accepting, from the operator, designation of a coordinate position within a display area of the display section; an instruction accepting step of accepting the input of an instruction associated with the instruction acceptance image that is displayed in the coordinate position accepted in the position designation accepting step; a speed of change detection step of detecting a speed of change at which the coordinate position accepted in the position designation accepting step changes; and an area enlargement step of enlarging, when a display position for any of the instruction acceptance images is designated in the position designation accepting step, an area for accepting the input of an instruction that is associated with the instruction acceptance image that is displayed in the designated display position, to the size corresponding to the speed of change that is detected in the speed of change detection step at the time of the designation, for a predetermined period of time.

In the conventional technologies described in Description of the Background Art, because a base image showing the information required originally for an operation and a window image highlighting the base image are superimposed on each other and displayed, extra memory is necessary for storing the window image. Therefore, a special mechanism has to be added to these technologies.

According to the present invention, when a display position for any of the instruction acceptance images is designated by the coordinate position designating section, the instruction accepting unit enlarges, for a predetermined period of time, an area for accepting the input of an instruction associated with the instruction acceptance image that is displayed in the designated display position, in accordance with the speed of change that is detected by the speed detector at the time of the designation. Therefore, even when it is difficult for the operator to designate a display position for his/her desired instruction acceptance image because the operator relatively quickly changes the coordinate position designated by the coordinate position designating section, of even when the operator cannot designate a coordinate position in the display position for his/her desired instruction acceptance image or is only allowed to designate a coordinate position only when the instruction acceptance image is passed, the instruction accepting unit enlarges the instruction acceptance area for the predetermined period of time so that the operator can accurately input an instruction associated with his/her desired instruction acceptance image. Thus, without adding extra memory or any special mechanism, the present invention can improve the operability in allowing the operator to select his/her desired operation guide image from among the plurality of operation guide images displayed on the display screen, and inputting an instruction associated with this desired operation guide image.

The present invention is also the display device, in which, when the instruction accepting section enlarges the area for accepting the input of an instruction associated with the instruction acceptance image in accordance with the speed of change that is detected by the speed detector, the instruction accepting section changes the predetermined period of time in accordance with the speed of change that is detected by the speed detector at the time when the display position is designated by the coordinate position designating section.

The present invention is also the display control method, in which, when enlarging the area for accepting the input of an instruction associated with the instruction acceptance image in accordance with the speed of change that is detected in the speed of change detection step, the instruction accepting step changes the predetermined period of time in accordance with the speed of change that is detected in the speed of change detection step when the display position is designated by the coordinate position designating section.

According to these inventions, when the display position for any of the instruction acceptance images is designated by the coordinate position designating section, the instruction accepting unit changes the period of time in accordance with the speed of change that is detected by the speed detector when the display position is designated, the period of time being a period for enlarging the area for accepting the input of the instruction associated with the instruction acceptance image that is displayed in the designated display position. Therefore, in accordance with the speed at which the operator changes the coordinate position designated by the coordinate position designating section, the period of time for enlarging the input accepting area can be changed to a period of time during which the operator can easily input the instruction associated with his/her desired instruction acceptance image.

The present invention is the display device, in which, when the display position for any of the instruction acceptance images is designated by the coordinate position designating section, the instruction accepting section enlarges, for the predetermined period of time, the area for accepting the input of an instruction associated with the instruction acceptance image displayed in the designated display position, in a direction of change of the coordinate position that is detected by the speed detector, in accordance with the speed of change that is detected by the speed detector at the time of the designation, and the instruction accepting section does not accept, for the predetermined period of time, the input of an instruction associated with another instruction acceptance image displayed in the enlarged area.

The present invention is also the display control method, in which, when the display position for any of the instruction acceptance images is designated in the position designation accepting step, the instruction accepting step enlarges, for the predetermined period of time, an area for accepting the input of an instruction associated with the instruction acceptance image displayed in the designated display position, in a direction of change of the coordinate position that is detected in the speed of change detection step, in accordance with the speed of change that is detected in the speed of change detection step at the time of the designation, and the instruction accepting step does not accept the input of an instruction associated with another instruction acceptance image displayed in the enlarged area, for the predetermined period of time.

According to these inventions, when enlarging the instruction accepting area for the predetermined period of time, the instruction accepting unit does not accept the input of an instruction associated with another instruction acceptance image displayed in the enlarged area, for the predetermined period of time. Therefore, the enlargement of the instruction acceptance area by the instruction accepting unit for the predetermined period of time enables the operator to accurately input the instruction associated with his/her desired instruction acceptance image.

The present invention is also the display device, in which, when the display position for any of the instruction acceptance images is designated by the coordinate position designating section, the instruction accepting section enlarges, for the predetermined period of time, the area for accepting the input of an instruction associated with the instruction acceptance image displayed in the designated display position, in accordance with the speed of change that is detected by the speed detector at the time of the designation, and the display controller displays the instruction acceptance image displayed in the designated display position, over the entire enlarged area.

Furthermore, the present invention is the display control method, in which, when the display position for any of the instruction acceptance images is designated in the coordinate position designation step, the instruction accepting step enlarges, for the predetermined period of time, the area for accepting the input of an instruction associated with the instruction acceptance image displayed in the designated display position, in accordance with the speed of change that is detected in the speed of change detection step at the time of the designation, and the instruction acceptance image display step displays the instruction acceptance image displayed in the designated display position, over the entire enlarged area.

According to these inventions, when enlarging the instruction acceptance area for the predetermined period of time, the display controller displays the instruction acceptance image displayed in the designated display position, over the entire enlarged area. Therefore, even when the operator relatively quickly changes the coordinate position designated by the coordinate position designating section, displaying the instruction acceptance image of the designated display position over the entire enlarged area enables the operator to easily observe his/her desired instruction acceptance image that the operator originally wishes to designate, and also enables the operator to accurately input the instruction associated with his/her desired instruction acceptance image.

Moreover, the present invention is the display device, in which, when the display controller displays the instruction acceptance image displayed in the designated display position, over the entire enlarged area, the display controller displays another instruction acceptance image that should originally be displayed in the enlarged area, by rendering the same transmissive to the instruction acceptance image that is displayed in the designated display position.

In addition, the present invention is the display control method, in which, when the instruction acceptance image display step displays the instruction acceptance image displayed in the designated display position, over the entire enlarged area, the instruction acceptance image display step displays another instruction acceptance image that should originally be displayed in the enlarged area, by making the same transmissive to the instruction acceptance image that is displayed in the designated display position.

According to these inventions, when the display controller displays the instruction acceptance image displayed in the designated display position, over the entire enlarged area, the display controller makes another instruction acceptance image that should originally be displayed in the enlarged area, transmissive. Thus, the operator can check the contents of the instruction acceptance image that should originally be displayed in the enlarged area.

The present invention is also a display device, comprising: a display section that displays images; an image storage section that stores a plurality of instruction acceptance images that are displayed on the display section to accept an instruction from an operator; a coordinate position designating section that accepts, from the operator, designation of a coordinate position within a display area of the display section; an instruction accepting section that accepts input of an instruction associated with any of the instruction acceptance images that is displayed in the coordinate position designated by the coordinate position designating section; a speed detector that detects a direction of change and speed of change in which the coordinate position designated by the coordinate position designating section changes; and a display controller that scroll-displays, on the display section, each of the instruction acceptance images stored in the image storage section toward the direction of change detected by the speed detector, and differentiates a display pattern of at least one of the instruction acceptance images scroll-displayed on the display section, from those of the rest of the instruction acceptance images, in accordance with the speed of change detected by the speed detector.

The present invention is also a display control method for displaying, on a display section of an electronic device, a plurality of instruction acceptance images for accepting an instruction from an operator, and accepting, from the operator, input of an instruction associated with any of the instruction acceptance images, the display control method comprising: a coordinate position designation step of accepting, from the operator, designation of a coordinate position within a display area of the display section; an instruction accepting step of accepting the input of an instruction associated with the instruction acceptance image that is displayed in the coordinate position designated in the coordinate position designation step; a speed of change detection step of detecting a speed of change at which the coordinate position designated in the coordinate position designation step changes; and a display control step of scroll-displaying each of the instruction acceptance images on the display section in a direction of change detected in the speed of change detection step, and displaying an enlargement of at least one of the instruction acceptance images scroll-displayed on the display section, in accordance with the speed of change detected in the speed of change detection step.

According to these inventions, the display controller displays an enlargement of at least one of the instruction acceptance images scroll-displayed on the display unit, in accordance with the speed of change that is detected by the speed detector at the time of the designation. Therefore, even when it is difficult for the operator to designate a display position for his/her desired instruction acceptance image because the operator relatively quickly changes the coordinate position designated by the coordinate position designating section, the enlargement of the instruction acceptance image allows the operator to accurately designate his/her desired instruction acceptance image and to accurately input the instruction associated therewith, when the enlarged instruction acceptance image is the desired instruction acceptance image. Thus, without adding extra memory or any special mechanism, the present invention can improve the operability in allowing the operator to select his/her desired operation guide image from among the plurality of operation guide images displayed on the display screen, and inputting an instruction associated with this desired operation guide image.

The present invention is also the display device, in which the display controller enlarges each of the plurality of instruction acceptance images displayed in arrangement, toward the center in a direction of the arrangement of the instruction acceptance images, and enlarges at least the largest instruction acceptance image in the center in accordance with the speed of change that is detected by the speed detector.

The present invention is also the display control method in which the display control step enlarges and scroll-displays each of the plurality of instruction acceptance images displayed in arrangement, toward the center in a direction of the arrangement of the instruction acceptance images, and enlarges at least the largest instruction acceptance image in the center in accordance with the speed of change that is detected in the speed of change detection step.

According to these inventions, when performing the display control, the display controller displays the instruction accepting image in the middle of the plurality of arrayed and displayed instruction acceptance images as the largest image, and this instruction acceptance image in the middle is enlarged in accordance with the speed of change detected by the speed detector. Therefore, even when the operator changes the coordinate position designated by the coordinate position designating section relatively quickly, the enlargement display of the instruction acceptance image in the middle improves the operator's visibility on the instruction acceptance image in the middle. As a result, the operator can easily specify his/her desired instruction acceptance image.

Moreover, the present invention is the display device, in which the display controller enlarges and displays the plurality of instruction acceptance images displayed in arrangement, after reducing the number of instruction acceptance images to be scroll-displayed in this arranged display area, in accordance with the speed of change detected by the speed detector.

The present invention is also the display control method, in which the display control step enlarges and displays the plurality of instruction acceptance images displayed in arrangement, after reducing the number of instruction acceptance images scroll-displayed in this arranged display area, in accordance with the speed of change detected in the speed of change detection step.

According to these inventions, the display controller enlarges and displays the plurality of instruction acceptance images to be arranged and displayed, after reducing the number of instruction acceptance images scroll-displayed in this arranged and displayed area, in accordance with the speed of change detected by the speed detector. Therefore, the enlarged instruction acceptance images can be displayed in the arranged and displayed area, which is a limited area.

The present invention is also the display device, in which the display controller scroll-displays the plurality of instruction acceptance images displayed in arrangement, with characters therein being increased in size toward the center in a direction of the arrangement of the instruction acceptance images, while keeping the size of each instruction acceptance image constant, and enlarges the characters in at least the largest instruction acceptance image in the center in accordance with the speed of change detected by the speed detector.

The present invention is also the display control method, in which the display control step scroll-displays the plurality of instruction acceptance images displayed in arrangement, with characters therein being enlarged toward the center in a direction of the arrangement of the instruction acceptance images, while keeping the size of each instruction acceptance image constant, and enlarges the characters in at least the largest instruction acceptance image in the center in accordance with the speed of change detected in the speed of change detection step.

According to these inventions, when scroll-displaying the plurality of instruction acceptance images to be arranged and displayed, the display controller enlarges the characters of at least the largest instruction acceptance image in the middle in accordance with the speed of change detected by the speed detector. Thus, even when, for example, the speed of change increases, the operator's visibility on the characters shown by the largest instruction acceptance image in the middle can be improved, whereby the operator can easily specify his/her desired instruction acceptance image.

The present invention is also the display device, in which, when enlarging the characters in the instruction acceptance image in accordance with the speed of change detected by the speed detector, the display controller downsizes the enlarged characters in the instruction acceptance image in abbreviation form.

The present invention is also the display control method, in which, when enlarging the characters in the instruction acceptance image in accordance with the speed of change detected in the speed of change detection step, the display control step downsizes the enlarged characters in the instruction acceptance image in abbreviation form.

According to these inventions, when enlarging the characters of the instruction acceptance image in accordance with the speed of change, the number of the enlarged characters is reduced to an abbreviation thereof. As a result, the further enlarged characters are displayed in the instruction acceptance image so that the operator can specify his/her desired instruction acceptance image more easily.

This application is based on Japanese Patent application serial Nos. 2009-244862 and 2009-244865 filed in Japan Patent Office on Oct. 23, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A display device, comprising:

a display section that displays images;

an image storage section that stores a plurality of instruction acceptance images that are displayed on the display section to accept an instruction from an operator;

a display controller that displays, on the display section, each of the instruction acceptance images stored in the image storage section;

a coordinate position designating section that accepts, from the operator, designation of a coordinate position within a display area of the display section;

an instruction accepting section that accepts input of an instruction associated with any of the instruction acceptance images that is displayed in the coordinate position designated by the coordinate position designating section; and a speed detector that detects a speed of change at which the coordinate position designated by the coordinate position designating section changes, wherein, when a display position for a first instruction acceptance images is designated by designation of the coordinate position accepted by the coordinate position designating section while the first instruction acceptance image and a second instruction acceptance image are displayed adjacent to one another on the display section as the instruction acceptance images, an instruction accepting area enlarges for a predetermined period of time, so that the instruction accepting area for accepting the input of an instruction associated with the first instruction acceptance image larger in a direction of change of the coordinate position that is detected by the speed detector in accordance with the speed of change that is detected by the speed detector at the time of the designation, and the instruction accepting section does not accept, for the predetermined period of time, the input of an instruction associated with the second instruction acceptance image displayed in the enlarged area.

2. A display control method for displaying, on a display section of an electronic device, a plurality of instruction acceptance images for accepting an instruction from an operator, and accepting, from the operator, input of an instruction associated with any of the instruction acceptance images, the display control method comprising:

an instruction acceptance image display step of displaying each of the instruction acceptance images on the display section;

a position designation accepting step of accepting, from the operator, designation of a coordinate position within a display area of the display section;

an instruction accepting step of accepting the input of an instruction associated with the instruction acceptance image that is displayed in the coordinate position accepted in the position designation accepting step;

a speed of change detection step of detecting a speed of change at which the coordinate position accepted in the position designation accepting step changes; and an area enlargement step carried out so that, when a display position for a first instruction acceptance images is designated in the position designation accepting step while the first instruction acceptance image and a second instruction acceptance image are displayed adjacent to one another as the instruction acceptance images, the instruction acceptance area for accepting the input of an instruction that is associated with the first instruction acceptance image is enlarged, for a predetermined period of time, in a direction of change of the coordinate position that is detected in the speed of change detection step, in accordance with the speed of change that is detected in the speed of change detection step at the time of the designation, and the instruction acceptance step does not accept the input of an instruction associated with the second instruction acceptance image displayed in the enlarged area for the predetermined period of time.

3. A display device comprising:

a display section that displays images;

an image storage section that stores a plurality of instruction acceptance images that are displayed on the display section to accept an instruction from an operator;

a coordinate position designating section that accepts, from the operator, designation of a coordinate position within a display area of the display section;

an instruction accepting section that accepts input of an instruction associated with any of the instruction acceptance images that is displayed in the coordinate position designated by the coordinate position designating section;

a speed detector that detects a direction of change and speed of change in which the coordinate position designated by the coordinate position designating section changes; and a display controller that scroll-displays, on the display section, each of the instruction acceptance images stored in the image storage section toward the direction of change detected by the speed detector, and differentiates a display pattern of at least one of the instruction acceptance images scroll-displayed on the display section, from those of the rest of the instruction acceptance images, in accordance with the speed of change detected by the speed detector, wherein the display controller scroll-displays the plurality of instruction acceptance images displayed in arrangement, with characters therein being increased in size toward the center in a direction of the arrangement of the instruction acceptance images, while keeping the size of each instruction acceptance image constant, and enlarges the characters in at least the largest instruction acceptance image in the center in accordance with the speed of change detected by the speed detector.

4. The display device according to claim 3, wherein, when enlarging the characters in the instruction acceptance image in accordance with the speed of change detected by the speed detector, the display controller downsizes the enlarged characters in the instruction acceptance image in abbreviation form.

5. A display control method for displaying, on a display section of an electronic device, a plurality of instruction acceptance images for accepting an instruction from an operator, and accepting, from the operator, input of an instruction associated with any of the instruction acceptance images, the display control method comprising:

a coordinate position designation step of accepting, from the operator, designation of a coordinate position within a display area of the display section;

an instruction accepting step of accepting the input of an instruction associated with the instruction acceptance image that is displayed in the coordinate position designated in the coordinate position designation step;

a speed of change detection step of detecting a speed of change at which the coordinate position designated in the coordinate position designation step changes; and a display control step of scroll-displaying each of the instruction acceptance images on the display section in a direction of change detected in the speed of change detection step, and displaying an enlargement of at least one of the instruction acceptance images scroll-displayed on the display section, in accordance with the speed of change detected in the speed of change detection step, wherein the display control step scroll-displays the plurality of instruction acceptance images displayed in arrangement, with characters therein being enlarged toward the center in a direction of the arrangement of the instruction acceptance images, while keeping the size of each instruction acceptance image constant, and enlarges the characters in at least the largest instruction acceptance image in the center in accordance with the speed of change detected in the speed of change detection step.

6. The display control method according to claim 5, wherein, when enlarging the characters in the instruction acceptance image in accordance with the speed of change detected in the speed of change detection step, the display control step downsizes the enlarged characters in the instruction acceptance image in abbreviation form.

* * * * *